(12) United States Patent
Fieldman

(10) Patent No.: US 11,756,280 B2
(45) Date of Patent: *Sep. 12, 2023

(54) FLIPPABLE AND MULTI-FACED VR INFORMATION BOARDS

(71) Applicant: VR-EDU, Inc., Gainesville, FL (US)

(72) Inventor: Ethan Fieldman, Gainesville, FL (US)

(73) Assignee: VR-EDU, INC., Gainesville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/062,092

(22) Filed: Dec. 6, 2022

(65) Prior Publication Data

US 2023/0095198 A1  Mar. 30, 2023

Related U.S. Application Data

(63) Continuation of application No. 17/542,384, filed on Dec. 4, 2021, now Pat. No. 11,631,228.

(60) Provisional application No. 63/121,828, filed on Dec. 4, 2020.

(51) Int. Cl.
| | | |
|---|---|---|
| *G06T 19/20* | (2011.01) | |
| *G06F 3/04815* | (2022.01) | |
| *G06F 3/0482* | (2013.01) | |
| *G06T 13/20* | (2011.01) | |
| *G06F 3/01* | (2006.01) | |

(52) U.S. Cl.
CPC .............. *G06T 19/20* (2013.01); *G06F 3/017* (2013.01); *G06F 3/0482* (2013.01); *G06F 3/04815* (2013.01); *G06T 13/20* (2013.01); *G06F 2203/04803* (2013.01); *G06T 2219/024* (2013.01)

(58) Field of Classification Search
CPC ... G06T 19/20; G06T 13/20; G06T 2219/024; G06F 3/017; G06F 3/04815; G06F 3/0482; G06F 2203/04803
See application file for complete search history.

(56) References Cited

U.S. PATENT DOCUMENTS

| | | |
|---|---|---|
| 7,590,941 B2 | 9/2009 | Susie et al. |
| 8,232,989 B2 | 7/2012 | Hyndman |
| 8,806,354 B1 | 8/2014 | Hyndman et al. |
| 8,949,736 B2 | 2/2015 | Balko et al. |
| 10,386,931 B2 | 8/2019 | Stewart et al. |
| 2005/0160368 A1 | 7/2005 | Liu et al. |
| 2014/0089466 A1 | 3/2014 | Iver |
| 2015/0281649 A1 | 10/2015 | Ehmann et al. |
| 2017/0228130 A1 | 8/2017 | Palmaro |

(Continued)

FOREIGN PATENT DOCUMENTS

| | | |
|---|---|---|
| WO | 2019005499 | 1/2019 |
| WO | 2021061275 | 4/2021 |
| WO | 2022237072 A1 | 11/2022 |

OTHER PUBLICATIONS

International Search Report and the Written Opinion of the International Searching Authority dated Mar. 21, 2022 for PCT Application No. PCT/US2021/061922, 15 pages.

(Continued)

*Primary Examiner* — Chong Wu
(74) *Attorney, Agent, or Firm* — POLSINELLI PC

(57) ABSTRACT

A system and method for providing multiple faces of a discrete segment of an information board in virtual reality environments includes receiving a control input and displaying one or more added faces to the discrete segment of the information board at a virtual reality display device.

7 Claims, 38 Drawing Sheets

(56) References Cited

U.S. PATENT DOCUMENTS

| | | |
|---|---|---|
| 2017/0286384 A1 | 10/2017 | Dunne et al. |
| 2018/0096450 A1 | 4/2018 | Monk et al. |
| 2019/0019348 A1 | 1/2019 | Yamamoto et al. |
| 2019/0312742 A1 | 10/2019 | Albrecht et al. |
| 2021/0223941 A1 | 7/2021 | Shuster et al. |
| 2021/0286433 A1 | 9/2021 | Nickerson |
| 2021/0342785 A1 | 11/2021 | Mann et al. |
| 2022/0139056 A1* | 5/2022 | Fieldman ............... G06T 19/20 345/419 |

OTHER PUBLICATIONS

CollabHub. "CollabHub trailer 2019", YouTube, uploaded by Martin Turlej on Jan. 29, 2019, retrieved from https://www.youtube.com/watch?v=L2w6mhlXJms, entire video.

Krekhov, et al., "GulliVR: A Walking-Oriented Technique for Navigation in Virtual Reality Games Based on Virtual Body Resizing", Chi Play 2018, Oct. 28-31, 2018, Melbourne, Australia, 14 pages.

Silvr. "Dry Erase: Infinite VR Whiteboard", Steam, Nov. 18, 2020, retrieved from https://web.archive.org/web/20201118191521/https://store.steampowered.com/app/585040/Dry_Erase_lnfinite_VR_Whiteboard/ on Jul. 13, 2022, 4 pages.

Silvr. "Dry Erase: Infinite VR Whiteboard", YouTube, uploaded by The4thaggie on Aug. 20, 2017, retrieved from https://www.youtube.com/watch?v=wlf2HPdudyA on Jul. 27, 2022, entire video.

"Think Space VR—Whiteboarding (App Version 4)", YouTube, uploaded by Jason Ederle on Dec. 20, 2016, retrieved from www.youtube.com/watch?v=eHDxYS7RBt4 on Jul. 13, 2022, entire video.

* cited by examiner

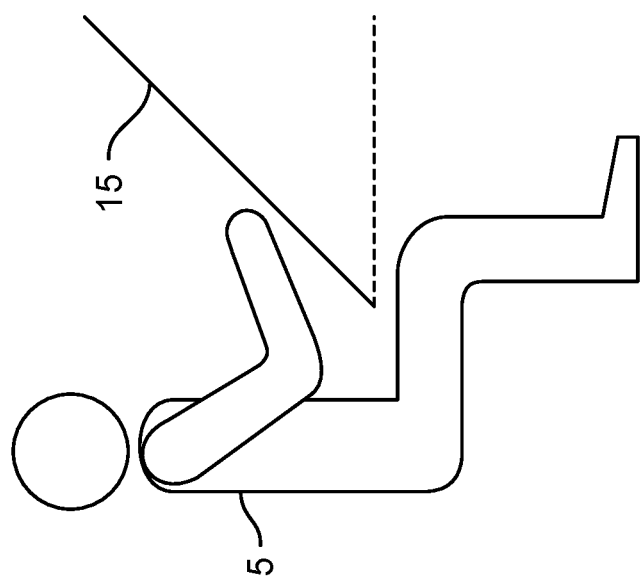

FLIPPABLE AND MULTI-FACED VR INFORMATION BOARDS

CROSS-REFERENCE TO RELATED APPLICATIONS

The present application is a Continuation of U.S. application Ser. No. 17/542,384, filed Dec. 4, 2021, titled, "VIRTUAL INFORMATION BOARD FOR COLLABORATIVE INFORMATION SHARING," which claims the benefit of priority of U.S. Provisional Application No. 63/121,828, filed Dec. 4, 2020, the contents of which are incorporated herein by reference in their entirety.

BACKGROUND OF THE INVENTION

Virtual reality (VR) environments have grown more realistic and immersive as VR headsets, processor speeds, data storage and data transfer technologies have continued to improve. However, unlike conventional physical reality, electronic VR environments present more opportunities for persons to collaborate and share information, including in work and education fields, in ways that are not possible in the physical constraints of the real-world.

One of the challenges to taking advantage of the these opportunities is combining two-dimensional (2D) and three-dimensional (3D) displays of virtual objects and information to enable users to see, use, store and manage collaborative activities, information, other users and the virtual objects optimally in the VR environment. Another challenge to working and learning in VR environments is adapting a user's real-world physical positions and motions to provide information inputs and corresponding VR experiences and VR views in the virtual reality world.

SUMMARY OF THE INVENTION

Embodiments of the invention address these challenges by providing methods and systems with improved display and functionality for using information boards in a VR environment. In embodiments, methods and systems of the invention are implemented through development tools for the Oculus/Meta Quest platform (Oculus Platform SDK) by Oculus VR (Irvine, Calif.) (parent company Meta). It will be appreciated that the systems and methods, including related displays, user interfaces, controls and functionalities, disclosed herein may be similarly implemented on other VR platforms with other VR SDKs and software development tools known to VR developers.

In one embodiment, a method for providing an information board in a virtual reality environment comprises displaying an information board including a first discrete segment viewable in a three-dimensional virtual reality environment; receiving a control input adding a second discrete segment to the information board; and displaying the second discrete segment adjacent to the first discrete segment in the virtual reality environment in response to receiving the control input.

In a further embodiment, a method of the invention further includes receiving first viewable information on the first discrete segment and second viewable information on the second discrete segment and storing in a database accessible by the virtual reality environment sequential ordering information for the information board that the first viewable information is linked to be displayed on the first discrete segment, the second viewable information is linked to the be displayed on the second discrete segment, and the second discrete segment was created after the first discrete segment.

In a further embodiment, the first discrete segment has a left side and right side from a user's perspective in the virtual reality environment and the second discrete segment is displayed after and to the right of the first discrete segment following receipt of the control input adding the second discrete segment.

In another embodiment, an inventive method further comprises receiving additional respective control inputs to add respective multiple discrete segments of the information board and displaying respective multiple discrete segments of the information board in the virtual reality environment in a sequential order following first and second discrete segments after the respective additional control inputs are received.

One embodiment of a method of the invention further comprises displaying the information board in a room with walls in the virtual reality environment and adjusting the size and display of the room when respective multiple discrete segments are displayed.

Another embodiment of a method of the invention includes displaying an animation of one or more discrete segments of the information board collapsing into the information board.

In embodiment of the invention, an information board may be a virtual representation of a variety of known physical boards or displays, and a segment of the information board may be displayed in the virtual environment as one of a whiteboard, chalkboard, grid with gridlines, and grid with dotted markers following receipt of control input selecting an information board segment type for a segment from a displayed graphical user interface.

In embodiments of the invention, a method for providing an information board in a virtual reality environment comprises displaying a graphical user interface for a user to select a first control input to add a discrete segment to an information board in a three-dimensional virtual reality environment; displaying a graphical user interface for a user to select a second control input corresponding to a type of information board segment when adding the discrete segment to an information board in a three-dimensional virtual reality environment; and receiving respective multiple first control inputs to add respective multiple discrete segments of the information board, receiving respective multiple second control inputs selecting a type of information board segment for each added respective discrete segment, and displaying respective multiple discrete segments of the information board in the virtual reality environment in a sequential order.

In a further embodiment of the invention, a method for providing an information board in a virtual reality environment further comprises storing in a database the sequential order of the display of the multiple discrete segments of the information board; and following receipt of a third control input requesting retrieval of the information board after a user has left and returned to the virtual reality environment, displaying a plurality of the multiple discrete segments in sequential order in the virtual reality environment.

In another further embodiment, a method of the invention further comprises displaying respective viewable information content associated with each respective discrete segment of the plurality of the multiple discrete segments displayed in sequential order.

In other embodiments, a method of the invention includes re-sizing of a room in which the information board is displayed in the virtual reality environment in connection with displaying the respective multiple discrete segments of the information board.

A system for displaying an information board in a three-dimensional virtual reality environment is provided in one embodiment that comprises a graphical user interface displayed in the virtual environment configured to receive control inputs to add display of discrete segments of the information board in the virtual reality environment in a sequential order; and a virtual room that is viewable together with the graphical user interface in the virtual reality environment, wherein the virtual room is configured to re-size when a number of discrete segments of the information board have been added to the information board that would result in the information board appearing to extend beyond the walls of the virtual room.

In a further embodiment, a system of the invention further comprises an information board that includes multiple discrete segments sequentially ordered from left to right based on the time of addition to the information board from the perspective of a user in the virtual room.

In a further embodiment, a system of the invention further comprises a database operatively linked to the information board that stores respective persistent two-dimensional information corresponding to each respective discrete segment of the information board.

In a further embodiment, a system of the invention further comprises a physical controller configured for the user to add the persistent two-dimensional information to corresponding discrete segments of the information board in the virtual reality environment.

BRIEF DESCRIPTION OF THE DRAWINGS

The invention will be more clearly understood from the following description given by way of example, in which:

FIG. 24 is a schematic diagram illustrating an information board in a virtual reality environment used at a 45 degree angle in an embodiment of the invention.

DETAILED DESCRIPTION

Figure 1:
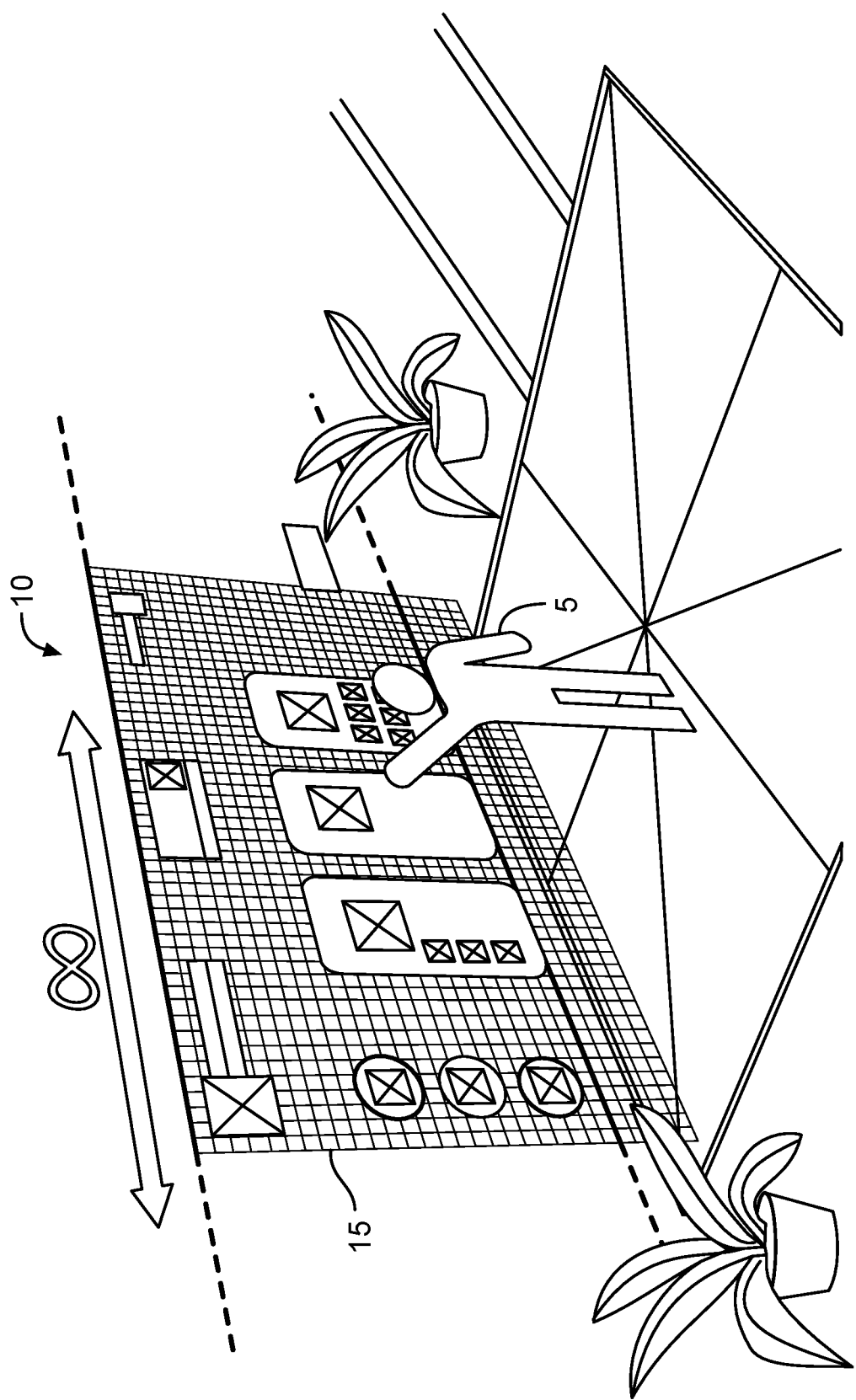
FIG. 1 is a schematic diagram illustrating a user with an information board in virtual reality environment in an embodiment of the invention.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

In various embodiments, methods and systems of the invention are preferably implemented through development tools for the Oculus/Meta Quest platform (Oculus Platform SDK) by Oculus VR (Irvine, Calif.) (parent company Meta). It will be appreciated that the systems and methods, including related displays, user interfaces, controls and functionalities, disclosed herein may be similarly implemented on other VR platforms with other VR SDKs and software development tools known to VR developers.

Virtual Reality (VR) Board & Classroom Ecosystem

Figure 2:
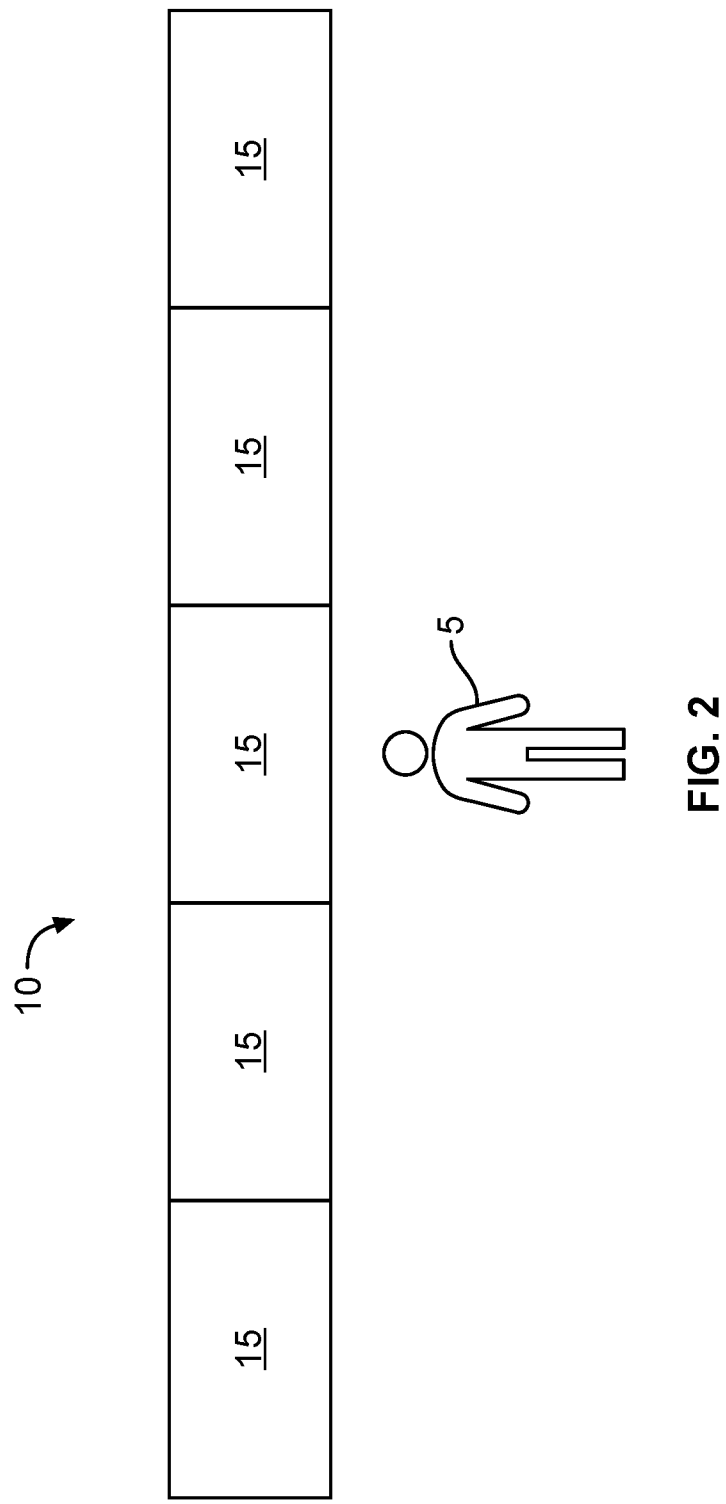
FIG. 2 is a schematic diagram illustrating an information board with multiple adjacent discrete segments in a virtual reality environment in an embodiment of the invention.

Referring to FIG. 1, in a programmed virtual reality software application in an embodiment of the invention, a virtual reality environment is a customizable room, such as a classroom, conference room, office and the like, with an information board 10 (whiteboard, chalkboard, smart board or a blackboard and the like) at the front of the room. When a new room is created and a user 5 is in the virtual reality environment, the whiteboard is a minimum size of 30 ft of board space across the front of the room, and this whiteboard is the focal point in the room. This 30 ft is the equivalent of five 6 ft discrete board segments 15, as shown in FIG. 2, where each discrete board segment 15 "joins" or is linked to the segments adjacent either side of such segment, to create one, continuous whiteboard 10. In this example there are five (5) discrete board segments 5 of the continuous information board 10, and various functionalities as to the board segments are subsequently disclosed, such as laser pointer triple functionality more fully explained herein.

The room itself is longer on each end than the whiteboard, with an extra 6 ft either side for example, but depending on the background, this room could feel significantly larger, for example if a user has chosen to be in space or underwater, then this background appears to extend infinitely into the distance on either side of (and behind) the whiteboard. This virtual whiteboard can be customized in many ways, for example to appear as a whiteboard, a chalkboard, a grey board with grid lines or dotted grid markers, among others. Each user can choose to view the virtual board and virtual room differently, but the content on the board will stay uniform for each user (if one user draws with a blue marker on a whiteboard, this drawing will appear in blue for any other user regardless of the kind of board they have selected to look at—it will appear as blue chalk on a chalkboard, or blue marker on a whiteboard). This uniformity of content is important for the purpose of tutoring, because a tutor must be able to refer to the content of the whiteboard by its color such as: "fill in the blanks in the blue text", and each person in the room can identify the blue text easily.

Preferably, an information board in a virtual reality environment in embodiments of the invention maintains persistent content, ordered chronologically over time. On the board itself, the content is stored in 2D, which creates a sense of linear chronology (this is rare in VR, where space is infinite in all directions). As a user comes back into the room/board at later times (such as perhaps week-on-week), all the information on the board persists, and the user can continue adding content to the board, and adding new board segments, and the content will persist (stored, e.g., in persistent storage of a remote computer server on a wide area network, but might also be locally stored in computer storage media). Since the content persists on the information board, users can continue working with it over time, either alone, or with others, such as a teacher, a tutor, peers, colleagues, or any other persons using or collaborating with the information board in the same virtual reality environment.

In some embodiments, hashtags can be used to index information associated with the board, and act an easy way for users to search for previous work that they have done or information that has been presented to the user. These hashtags can be accessed in certain embodiments in a user palette utilities page. This page will bring up a list of all the hashtags used in the virtual room, and when selected, the customization section of the palate will show all instances of that hashtag being used in the room. Even without hashtags, in alternative embodiments a user may execute a search on the board content through the search bar in the utilities section on their user palette, which would search the board for all instances of the searched word.

Extending Boards and Re-Sizing Rooms

Figure 3:
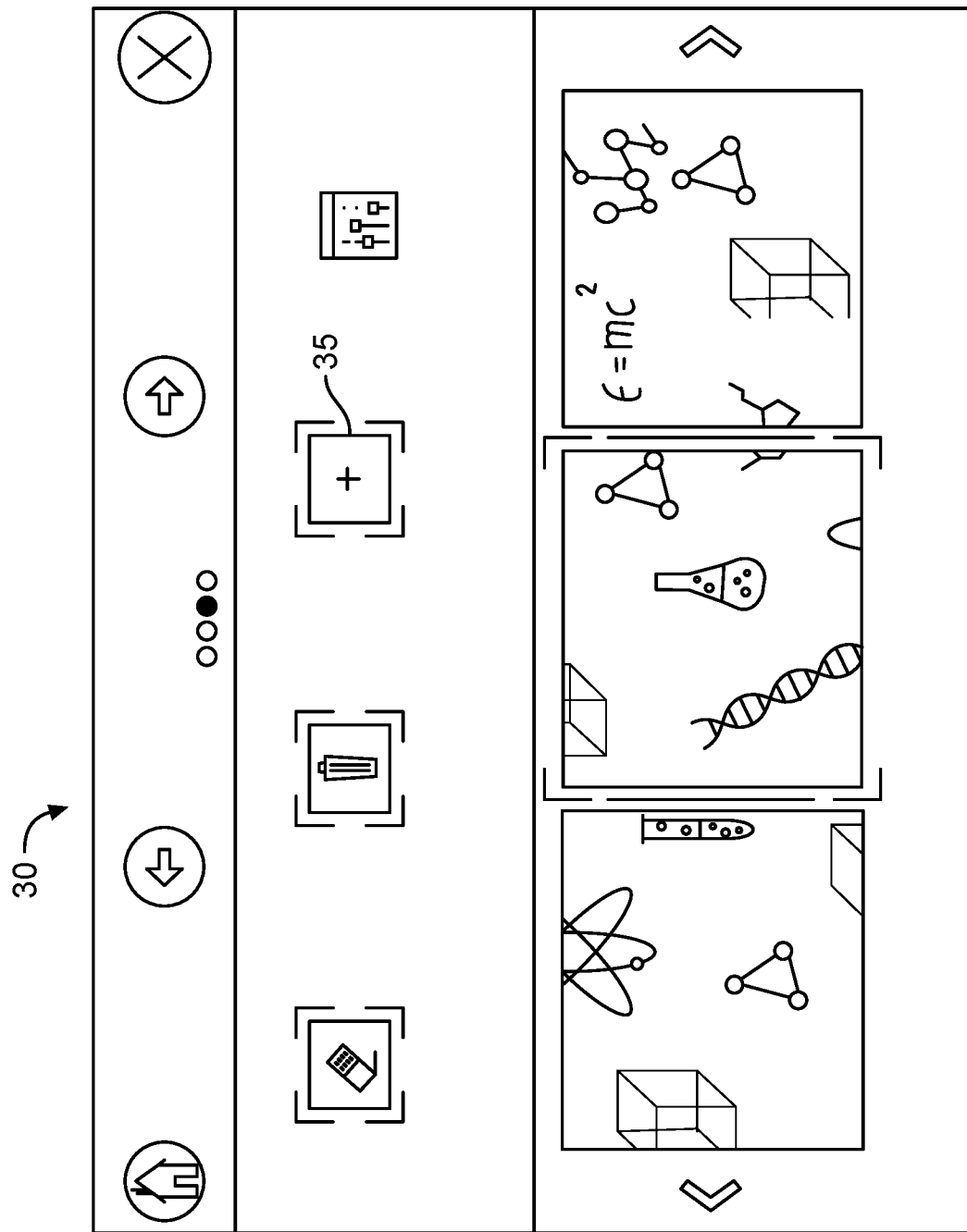
FIG. 3 is a schematic diagram illustrating an in-application information board tool palette in a virtual reality software application in an embodiment of the invention.
Figure 5:
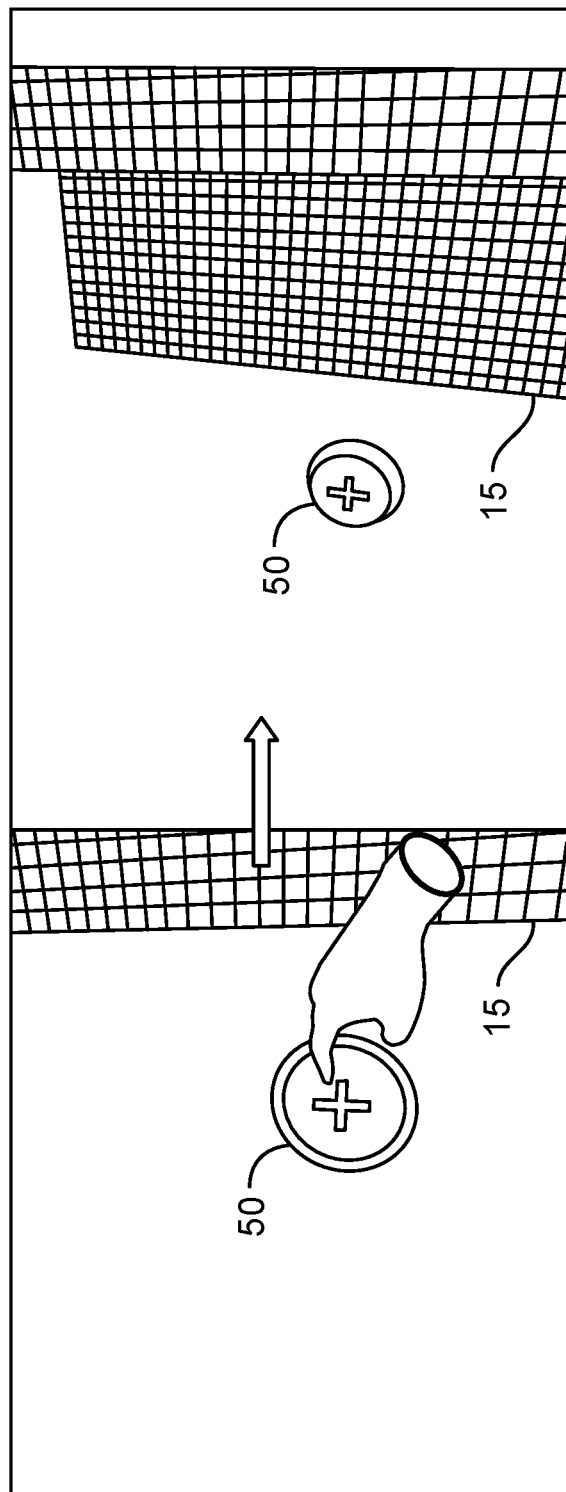
FIG. 5 is a schematic diagram illustrating a user pressing a three-dimensional button in a virtual reality environment that activates a board segment to slide out of an information board in the virtual reality environment in an embodiment of the invention.

In embodiments, an information board, e.g. whiteboard/ blackboard, can be extended by pressing a button 35 located on the users' in-app tool palette 30 as shown in FIG. 3. In embodiments, buttons may additionally be provided or in the alternative be provided at the ends of the board as shown in FIG. 5, such as a virtual button 50 that mimics a physical button and hovers in space where it can be pressed to extend a board segment. It will be appreciated, that numerous alternatives to buttons as control inputs to activate the "added board segment" function may also be implemented, such as pulling levers, sliding mechanisms, and the like.

Figure 4:
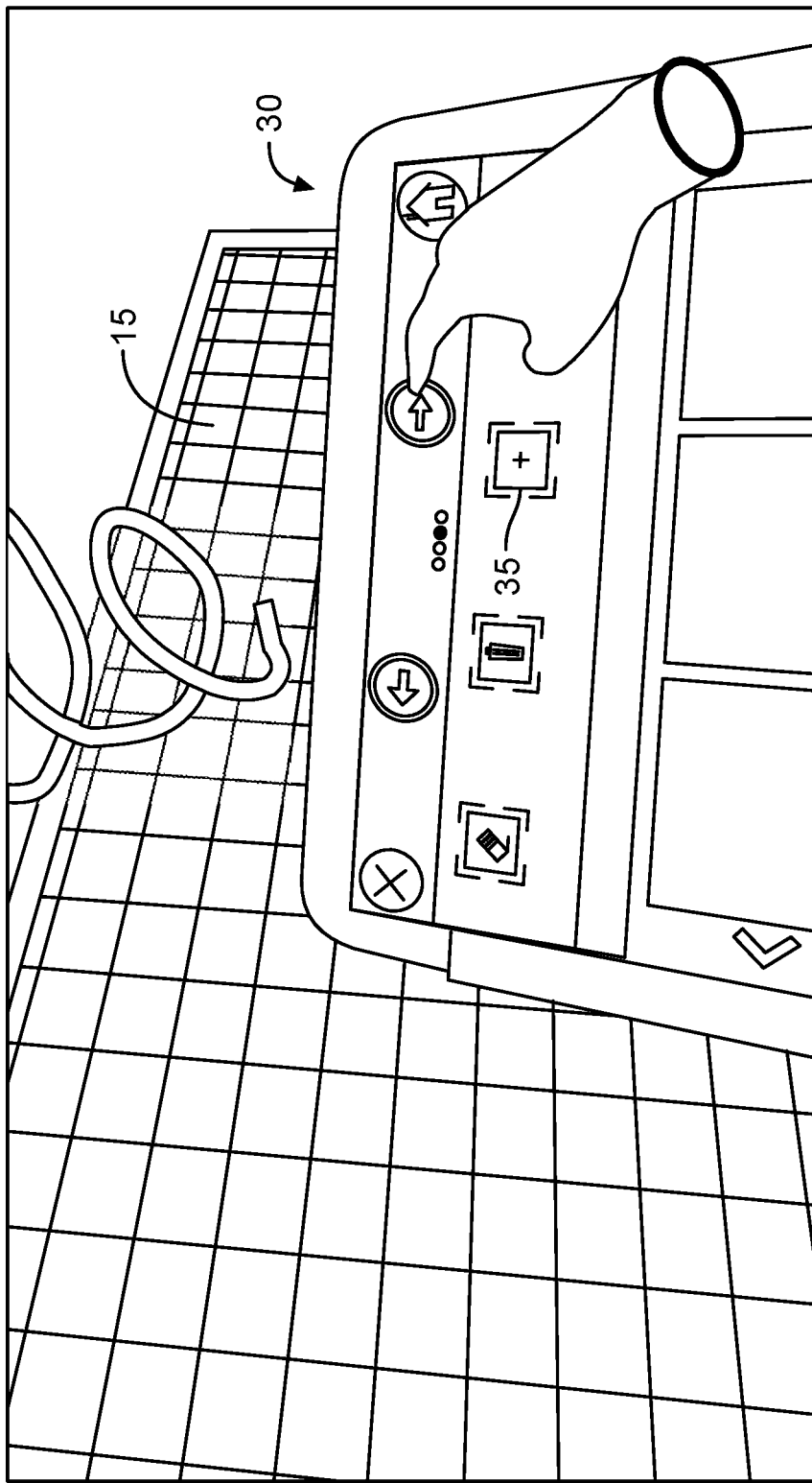
FIG. 4 is a schematic diagram illustrating a user interacting with a button in the in-application information board tool palette of FIG. 3 in an embodiment of the invention.

An example button 35 in the user palette 30 for added board segments may be as shown in FIG. 4. The palette itself is similar to a tablet, but hovers in the user's virtual room in the virtual environment. In this interface, the user can see a preview of their boards in the palette, and can select where on the board they would like to add a new board segment; whether that is at either end of the total board, or somewhere in between two existing board segments.

The user simply clicks a button 35 on their palette (FIG. 4), or the VR button 50 at the edge of the board if the user is standing next to it (FIG. 5) (such as if the user has used up existing board space), and the board extends itself, another six feet board segment 15, another six feet board segment 15, another six feet board segment 15, another six feet board segment 15, etc., for each press of the button. In embodiments, as the information board is extending, the whole classroom (or other VR environment walls defining the space where the board is located) is also extending in identical, proportionate increments (i.e. to maintain the ratio of the board taking up the majority of the room); up to one, two, ten miles long, and theoretically even infinitely.

The button at either end of the board looks and acts like a button in the physical world; but in VR, may be mapped on X-Y-Z coordinates. FIG. 5 shows a user pressing the button 50 in VR with hand tracking, as if they were pushing a button in the real-world. As the user presses the button, it depresses just like a button in the real-world would. When the user lifts their finger off the button, the board segment 15 begins to slide out, as seen in the second image. This board segment 15 slides out 6 ft and then slots into place in line with the board segment it has extended from as part of the continuous information board 10 (FIG. 2). The button 50 remains at the end of the newly added board segment so that the user can continue to extend the board if they wish.

In another embodiment, the room doesn't increase in size every time the board increases in size. Instead, the room increases in size only when the board would otherwise go through the walls of the room. At that point where the board would reach the walls of the VR environment, the room then extends, preferably at the same rate and ratio as the board.

Deleting Boards and Room Re-Sizing

Users can also choose to delete board sections. As a user deletes segments of the board, the room may be programmed to shrink, such as to maintain the same proportions of information board to room walls as previously described. In other words, the board remains the main focal point of the room and the room is slightly larger than the board, and that proportional display in the VR environment is maintained whether the board is expanded or reduced in size.

In embodiments, it can be important that a VR room is programmed to shrink as the boards are deleted. For example there might be five lectures leading up to an exam, and the teacher indicates one of the lectures will not be covered by the upcoming exam; then one of the five boards could be deleted and the 30 ft board turns into a 24 ft board, with the room shrinking accordingly. Otherwise the user will end up with a room that is proportioned for a 30 ft board, but the board is now much shorter than 24 ft, and there would be excess space at the edges of the board. Essentially the concept here is that the board is a two-dimensional representative of the three-dimensional space; the board maintains chronology of work over time and the room expands and retracts in accordance with the size of the board.

The user interface and prior explanation of controls for deleting a board segment is similar functionally with using a control input, such as button pressing, pulling a lever, sliding a control and the like, as for extending a board segment.

Persistence of Content

In an illustrative scenario, every week a student and a tutor may meet together in VR and keep adding more and more board space and keep working linearly down the board as they add more content. For example, a user may be learning math, and each week the user meets with the user's tutor to go over more math content. In the first week the user might study Algebra chapter 1, so the user will import the theory from chapter 1 of the user's textbook onto the board, and then the user will extend the board to work on definitions, extend the board again to write out practice problems, and extend the board once more to write a summary of the user's chapter 1 lesson. Then, the following week when the user meets with the user's tutor again, the user will extend the board by however many segments the user need to continue working with chapter 2, but the user's work on chapter 1 persists; that is, it stays in the VR room and on the board, waiting for the user to go back to it. Every unique room of a student and tutor is automatically saved so that all information persists. As the user are continually making the board bigger, the room is getting bigger automatically too, on the same axis as the board, horizontally. The room continues to stretch without looking disproportionately stretched.

Connection to GoBoard (Study Edge, LLC, Gainesville, Fla.)

In embodiments, an information board in a VR embodiment may be connected to an external, existing, website-based platform providing 2-dimensional interactive canvases called GoBoard.com (see www.goboard.com). A GoBoard is a vertically scrolling drawing canvas for people to collaborate for online tutoring. While the VR information boards of the invention preferably extend from West to East, GoBoard extends North to South. Accordingly, in embodiment of the invention the content displayed both on a GoBoard and in a VR information board of embodiments of the invention is re-oriented as necessary to facilitate integration between the VR environment and the GoBoard platform. A user can't just turn an entirety of a VR document file from West to East to North to South all at once, because if the user just rotates the file from one position, all of the pages would be disoriented by 90 degrees as the user scroll down on GoBoard.

Figure 6:
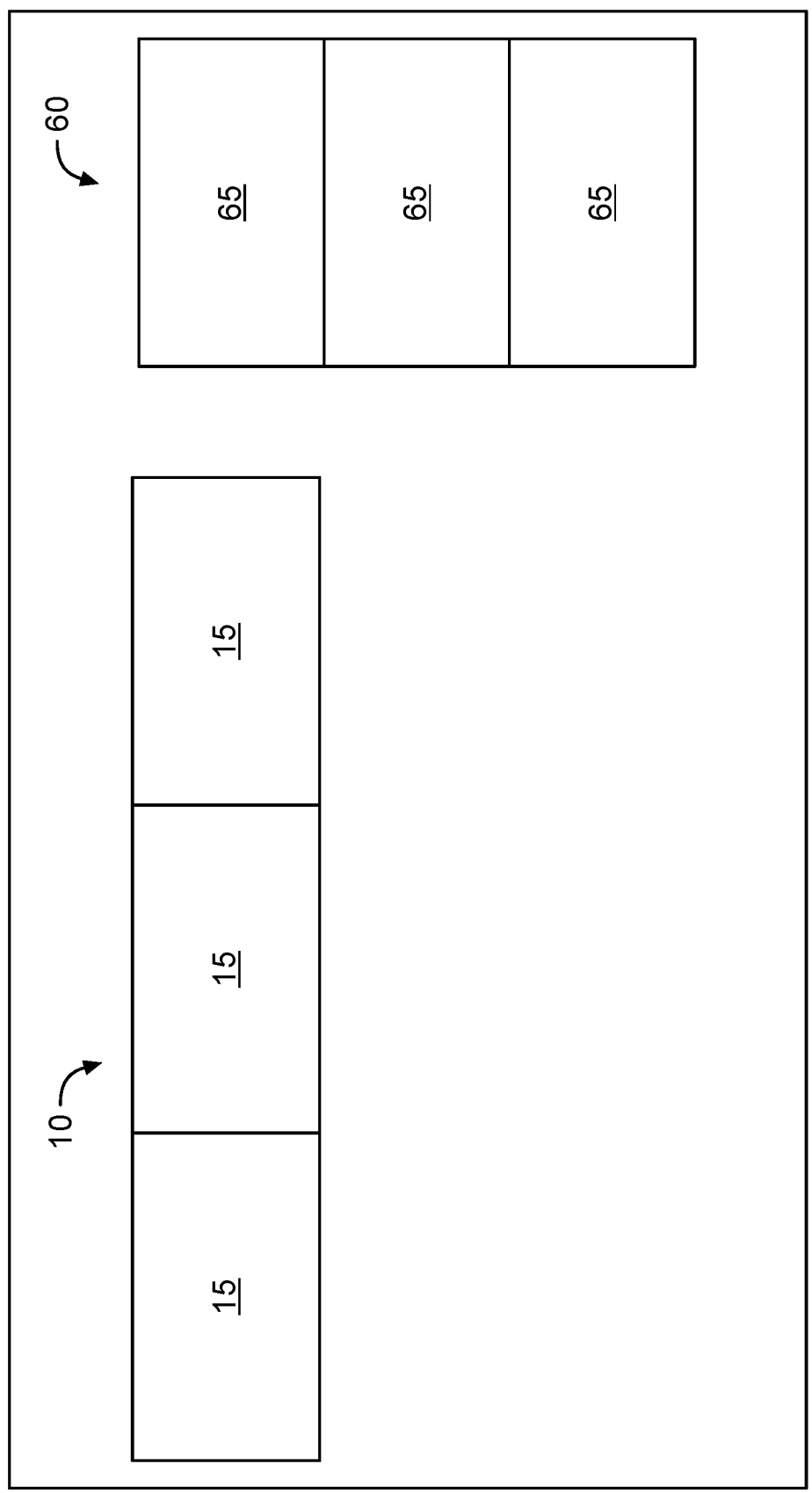
FIG. 6 is a schematic diagram illustrating an information board with multiple segments in which information is added and/or displayed west-to-east in a virtual reality environment platform and re-oriented to information board segments in which information is added and/or displayed north-to-south in a another platform, such as GoBoard.com. in an embodiment of the invention.

Referring to FIG. 6, each board segment 15 of the information board 10 in VR is programmed to rotate individually, so that it works most effectively for display content with a GoBoard whiteboard 60 and GoBoard board segments g5. This style of rotation would also be compatible with a Google sheet or Google document, in other embodiments. In still further embodiments, it will be appreciated that similar re-orientation of West to East content for display in North to South content environments can be similarly implemented between a VR environment with an information board and other information sharing applications and platforms. In embodiments, each individual VR board segment is reoriented from horizontal to vertical. So when the information board content from VR is to displayed in GoBoard, or Google docs, or printing to a physical printer, each of the VR board segments, which are horizontal (East to West) are now vertical (North to South). Each of the 6 ft boards which are oriented East to West in the VR room, are also segmented by the board lines at each 6 ft segment. So when the VR board segment content is to be displayed to GoBoard, each individual VR board segment will rotate its orientation as per the boardlines, and then be realigned in the North to South orientation for GoBoard web browser formatting. When the content of the board segments are displayed back into a VR environment, such as after editing the content in the GoBoard 2D application, the VR board segments will reorient back to West to East content display according to the board segmentation again. Accordingly, continuity of the content on each of the board segments is preserved when the content is exchanged from VR to GoBoard and back again.

Figure 7:
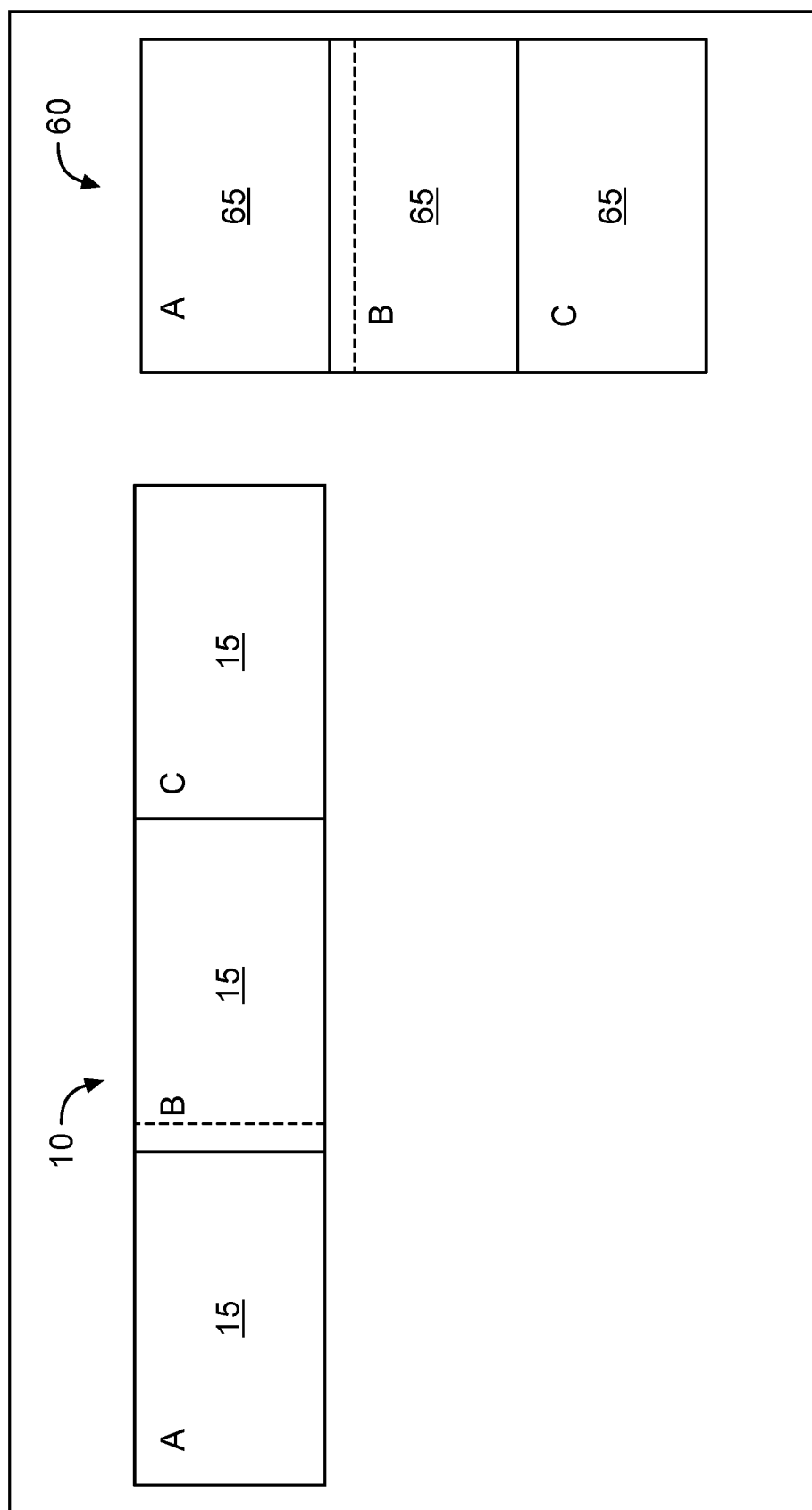
FIG. 7 is a schematic diagram illustrating cropping of information across segments of the west-to-east information board for display on the north-to-south information board segments of FIG. 6 in an embodiment of the invention.

Another embodiment by which the content is re-oriented from West-to-East (VR) to North-to-South (GoBoard), is to crop the VR board segments to the nearest possible VR board segment, without allowing a VR board segment to disrupt content which extends over more than one VR board segment. Referring to FIG. 7, instead of being re-oriented at the end of Board A, the board content is instead cropped at the location of the dotted line 70 (illustrated to show location example), and then shrunk down (the content is smaller in the North-to-South re-orientation) to fit on Board A segment in the North-to-South orientation of GoBoard. The board size is detected, and the content is reduced by the ratio necessary to fit the VR board size. The ratio can be determined either by the width or height limitation. For purposes of illustration, this is similar to taking a screenshot or image, and resizing all aspects of the image so that the image retains proportion. The break between VR boards may also be based on the detection of whitespace (e.g. a departure from content that is based on image and text recognition.)

Users Making Multiple Rooms

Figure 8:
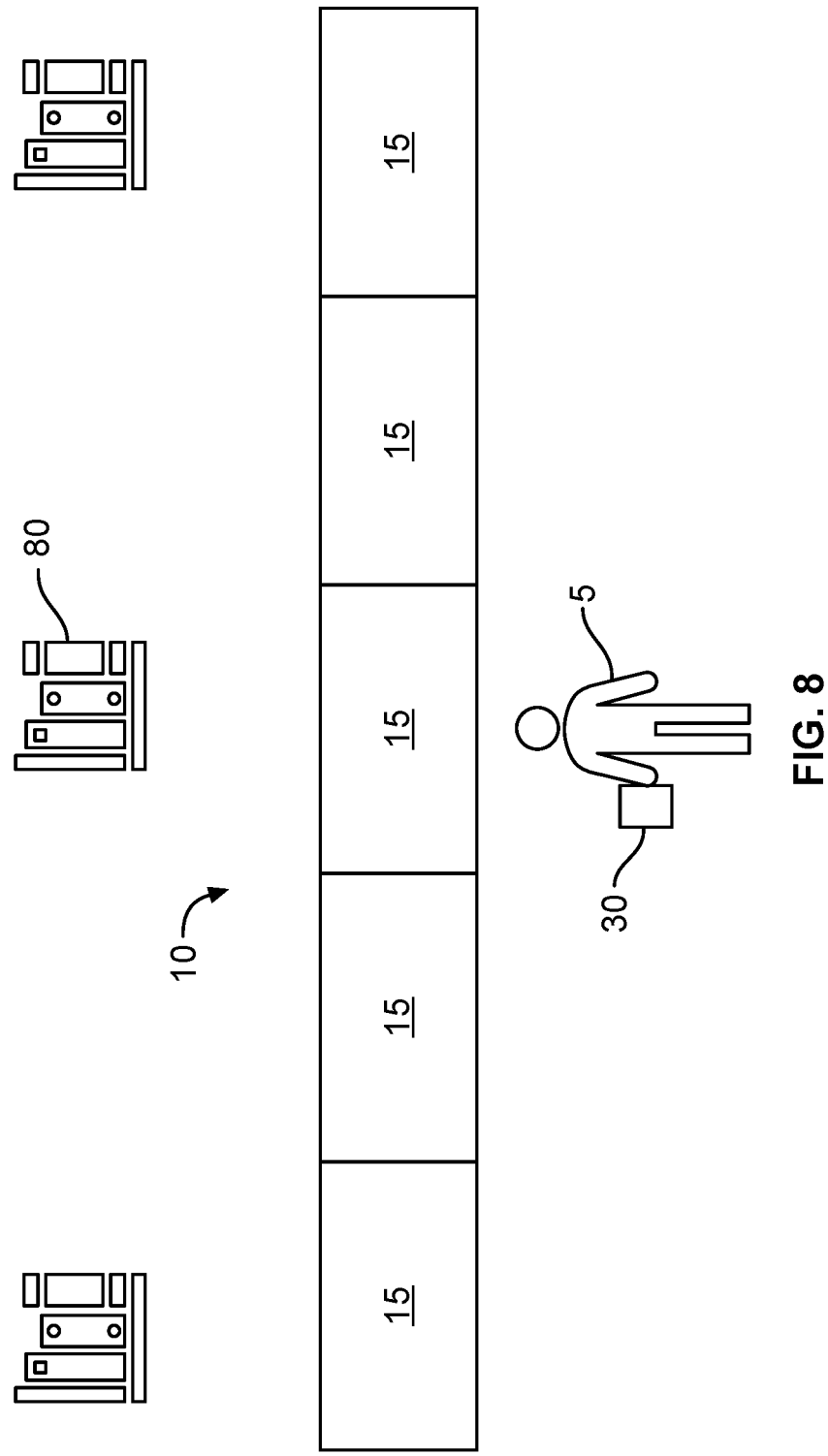
FIG. 8 is a schematic diagram illustrating an information board of a user's physics' room having a library background environment setting in a virtual reality environment in an embodiment of the invention.
Figure 9:
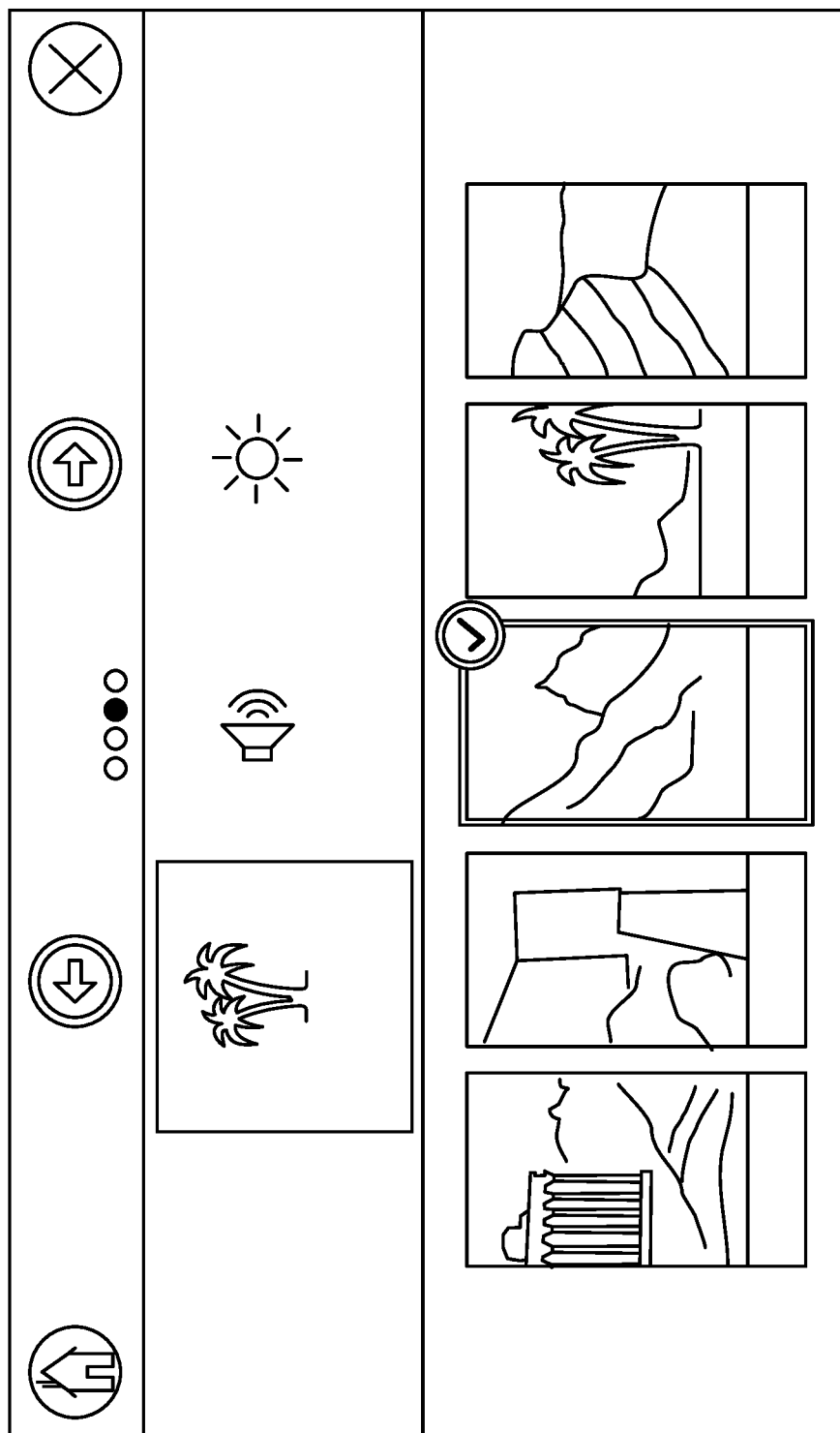
FIG. 9 is a schematic diagram illustrating an in-application tool palette for selecting a background environment setting in a virtual reality environment in an embodiment of the invention.

In embodiments, the VR environment is programmed so that users can make multiple rooms (each with a VR information board) and there are several different conventions for the creation and persistence of content of these rooms. Information on the board preferably should persist, but also information relating to the selected background, brightness, spatial audio, the avatars of each user, their selected tools, resources in use; all need to change between rooms and persist depending on who is in the room. This information does not need to be saved by the user between each session, but instead it automatically persists in the room in which the user made the changes. The purpose for this functionality is that if User A spends time setting up "User A's Physics Room", for example, User A wants those settings to remain when he or she goes back into that room later. Similarly, he or she wants to be able to create a different room, for example "User A's History Room" and have different settings to the Physics Room. User A may want to be at the beach in the History Room, but feels more focused when in a library as experienced by implementing background 80 with library display elements as part of the Physics Room (as shown in FIG. 8). User A's room settings can be changed in his or her user palette 30 (as shown in FIG. 9), which is also where all User A's tools and resources are kept.

Further Embodiments of this Concept are as Follows:

i. The rooms may all have a unique identifier (e.g., a 7-digit alphanumeric code) to identify them. The user can then assign a vanity name according to the subject studied in that room: for example "User A's Physics Room" "User A's Chemistry Room". The people given access to that room are people associated with each subject: e.g. User A, his or her tutor, maybe his or her teacher in each subject area. Whenever users re-enter that 7-digit coded room (or the associated vanity name) from their "recent rooms" section in the VR application, all information from that room persists accordingly.

ii. Another embodiment is that the room settings are created based on the people in the room; not the room number. For example, if User A and User B have met previously, and changed their room settings, then when the same two people, User A and User B, meet again, the same settings that they applied last time they met together would automatically be enabled. This applies to the tools used, their avatar appearance, the board content, and the room settings, among other customizable toggle on/off features. This also means that all of their previously shared files are available, their chat history, and everything else that has previously been shared between those two users.

iii. Different embodiment for when the users have the same tutor-student combo across two different subjects, for example User A is User B's Math tutor, but also her Chemistry tutor. In this case there will be different setting configurations for the same people combos, and when those two users join, they can switch easily between their two rooms/boards. The users are able to automatically retrieve a previous session (including its settings, files, controls) when the same people are in the room. The user can also retrieve manually, for example if User A and User B start up a session, the VR application in an embodiment of the invention identifies the users, and it searches through all the sessions that User A and User B had both been in, to provide them with a selection of sessions by name or date. User A and User B can then pick a session, or a whiteboard that they want to talk to in that session. They can bring up that old session, along with all the settings and files associated with it when it was previously established.

iv. When an additional user is added to the room at a later point; i.e. User B adds her friend User C to her Math Room for one session, the room/board host has the option to allow the other user to see all previous content in the room and on the board, or provide restricted access to the new user. User B also has the option to erase this content for the extra user once they leave again (that is, User C can see the room/board for that one meeting only) or User B can choose to add User C to the board's "key users" indefinitely.

v. Another embodiment is that the "peer" or "hierarchical" relationship (i.e. typically tutor-student) is used in establishing settings, permissions, tools and functions. That is, if the session is between a tutor and a student, who are signed into the VR application (and therefore recognized) as such, the tutor automatically holds the rights to set the settings for that session. This could be done ahead of time, when the tutor is preparing for a lesson, or it could be done during the lesson, in the tutor's user palette.

Each user can access their different rooms in several ways in various embodiments:

The first way is that users can select their room from the landing page when they first enter the VR application in an embodiment of the invention. The user is able to create a new room, join a friends' room (by entering the 7-digit code that their friend provided them with) or enter a saved room. All rooms previously created are automatically saved until deleted. So the user can select their room from a list in the landing page. All rooms have a 7-digit code assigned to them upon creation, but users are also able to assign a vanity name to the rooms, which they can do at the point of creation, when they leave the room at the end (A pop up asks "do the user want to name this room for next time?") or at any point in time through the room settings in the user palette.

The other way that a user would navigate to different rooms while in the VR application in an embodiment of the invention, without having to navigate back through the landing page, is to access their rooms list in the user palette. From here, the user can see all of their previously created rooms (listed by their 7-digit codes and also by their vanity name, if applicable) and the user is able to navigate directly there from their app.

Board as 2D in 3D Space

In this embodiment, the focal point of the VR room is a 2D board which is linear, persistent and organized. Virtual reality is generally making use of a 3D display environment, but when the user is teaching or sharing information with other, it's often better to do things in two dimensions on a board, in a consistent direction (i.e. West to East, just like how the user would teach or share information on a physical board). By artificially limiting people to not drawing in 3D space, a VR information board of embodiments of the invention make information sharing more organized. However, the key benefit to being in VR is that the user can also work in 3D for a variety of purposes, for example to build molecules in chemistry, or to build electrical circuits in physics, or to visit the pyramids in Egypt. So what is advantageous about VR information boards of the invention, compared to other apps in VR, is that the entire, ongoing, persistent experience is focused to a 2D VR information board, where even the 3D components (modules, models, drawings, shapes, etc.) get stored back on a respective board segment in 2D to maintain order and organization over time.

There are several key ways for utilizing 3D space associated to a 2D VR information board: (i) flippable board segments and (ii) modules built into the board. An additional feature is that in other embodiments of an application programmed to provide VR information boards of the invention, users are not limited to one side of the board segment, or that they could "pull the whiteboard out", as if out of a flagpole, and the whiteboard could continue to wrap around the user, theoretically of up to 360 degrees all around the user.

Two-Dimensional Representation of Three-Dimensional Objects

Reducing an object's dimensions is similar to converting a color object to grayscale or B&W or compressing music—information is lost in the process. It is important to underscore that the goal in both of these examples is to present a minimum possible amount of data to the information consumer and still be able to relate with sufficient certainty the meaning of the original data.

There are two components involved in such conversion processes: the producer (a compression algorithm or encoder) and the consumer (decompression algorithm or decoder). If the case where both producer and consumer are machines, there are a number of well-known approaches that are extensively used in communications etc. They can be roughly divided into two categories: lossless and lossy. The former can mathematically ensure the ability to reproduce the original encoded signal after decoding, while the latter can only reproduce information that is of sufficient quality to convey the meaning of the encoded original.

Lossy compression is used when the consumer does not need the original data granularity in order to perform optimally or has some innate abilities to fill in the missing bits of information and reproduce a sufficiently accurate representation of the encoded original by the decoded copy.

The human brain is a prime example of such an innate ability, and this is why machine image recognition—although making enormous steps in the right direction—still can't compare even with the abilities of a human brain.

There are two subclasses of objects: known and unknown. The former can be stored in a parameterized vector format (i.e. known formula for deriving the object and storing the parameters that fully define it such as size, etc.) and hence there will be no loss of information.

The latter can be approached in two ways: (a) artificial intelligence (AI)—an AI can be taught what representation the human brain would expect to see from a certain shape to define it with minimum loss of meaning, and (b) digital holography—an object can be fully defined by taking two images (front and back for example).

Regarding the "vector images", an alternative approach (as the number of shapes that can be vectorized is limited) is creating a "lookup table". An example for this approach includes storing the color of each in pixel resource-constrained devices where memory is limited. Instead of storing the 3-bit color of each pixel, the image is pre-processed and all possible colors are stored in a lookup table. Then, each pixel only contains a small pointer to the lookup table instead of the color itself. The less colors in an image, the more data storage space is saved.

Similarly, the more 3D shapes that are identified (or predefined), the more a lookup table can be used to store the original 3D meaning. Known AI-techniques can be used to facilitate the process of identifying 3D shapes and storing/retrieving original 3D shape information from a lookup table.

In the particular case of 3D to 2D conversion, there are two types of objects that need to be converted:

1. Known Objects

Known objects are easier to work with as in some cases it is fair to expect an information consumer (human brain) to already to be in possession of readily available symbols (e.g. circle with proper tint/tone/shade for the sphere, etc.)

a. Known to the information producer: In this case the information producer has a ready-made representation of the 3D shape and would only need to adjust parameters such as size, color, etc.

i. Producer has sufficiently high expectations the consumer would recognize the shape/symbol. In this case the producer has previously communicated this 3D shape to the consumer or it is a simple or well-known symbol.

ii. Producer does not have sufficiently high expectations the consumer would recognize the shape/symbol. In this case, if there are more than one possible variation of the representation, the producer would need to guess which may be the most optimal to the consumer or simply send the one available, if this is the only option.

b. Known to the consumer

2. Unknown Objects a. Unknown to the producer: This means that the producer doesn't have any previous data for the object, which implicitly means that the producer also has no knowledge of the consumer ability to recognize the 2D object. In these cases, the producer will need to create the 2D representation on-the-fly.

b. Unknown to the consumer: Although the previous case covers almost 100% of the possible cases, depending on the algorithms (see below), there may be a case where an object does not exist in the producer's "arsenal", but the producer may have sufficient information that the consumer would recognize a certain symbol, shape or projection.

Based on the foregoing, there are 3 implementation approaches:

i. Library of predefined objects: There will be a library of 3D shapes used in the VR which will have a 2D representation. Participants will be encouraged to use these inside the VR as 2D conversion will be trivial.

ii. Producer frameworks: In case a known 3D/2D shape pair was used inside the VR, a software framework will produce a 2D shape based on existing projection algorithms.

iii. AI: It is similar to the Producer framework approach, but the AI will be taught by means of supervised learning what the consumer expects to see in case an object is unknown.

Flippable Boards

One of the user settings associated with the board in embodiments of a VR application providing an information board and board segments is that the user can choose to "flip" the board, just like the user would see in a real-life whiteboard on wheels in a school. By board "flipping" this means that the user can turn the board 180 degrees so that the blank face/side of the board, which was previously on the back side of the whiteboard, is now showing on the user-facing side. This is an optional setting, so the user can either set the board to stay stationary (one face/side), or they can choose the number of sides/faces associated with each board segment.

This feature transitions users efficiently from the physical world to the virtual world without giving them cognitive dissonance, by maintaining the important things that they need in an information sharing environment that are in the physical world, but reducing or improving the components of the physical world that they don't necessarily need in the virtual world.

The board flipping feature is useful in many instances, such as:

The tutor can write theory on one side of the board, and then flip the board to work on practice problems associated with that theory.

The tutor could write words on one side of the board, and then flip the board to write their definitions (just like flashcards)

The tutor could assign homework for the student on the flip side of the board.

In embodiments, each board segment has a little grey oval, although other control inputs visible to user will be appreciated as capable of being provided in alternative embodiments, on the top and bottom which acts as the users' handle to flip the board. The action is generated with hand tracking, by the user reaching out to the handle and using their hands like they would in real life to flip a real board. Users can flip by pulling down on the handle; but this can flip back again—that is, if the user doesn't pull the board segment the whole way around, then the board will flip back the way it came as if with real-world physics. If the user pulls the board, but not all the way, and then the user lets go, the board drops and swings back and forth a little bit, and then stops. But if the user flips it all the way over, the transition is smooth and the flipped board stops quickly so the user can proceed to writing more content and more quickly.

The user is able to choose to keep the board stationary (one-side), or make it flippable (two sides), or the user can choose any number of sides that they want. For example the board is able to have 5 sides, like a big 6-foot long, turnable pentagon. To understand this concept, if the user were to look at the cross section of the board, the user would see a pentagon board that the user could flip and have five different sides of the board. Essentially the information board is a rotatable wheel with 5 discrete board segments in the VR environment. The user is able to add as many sides to the flippable board as they want, to continue adding space in that board segment without extending the room. For example, if a student found one chapter section in their algebra textbook particularly difficult, the tutor could continue adding flippable board sections up to 5, 10, 20 segments etc. (creating corresponding flappable "wheels" with such number of board segments), for the student to keep working on that type of algebra problem, without taking up any additional West-East space in the room, while keeping all of their practice problems grouped together conveniently.

Figure 10:
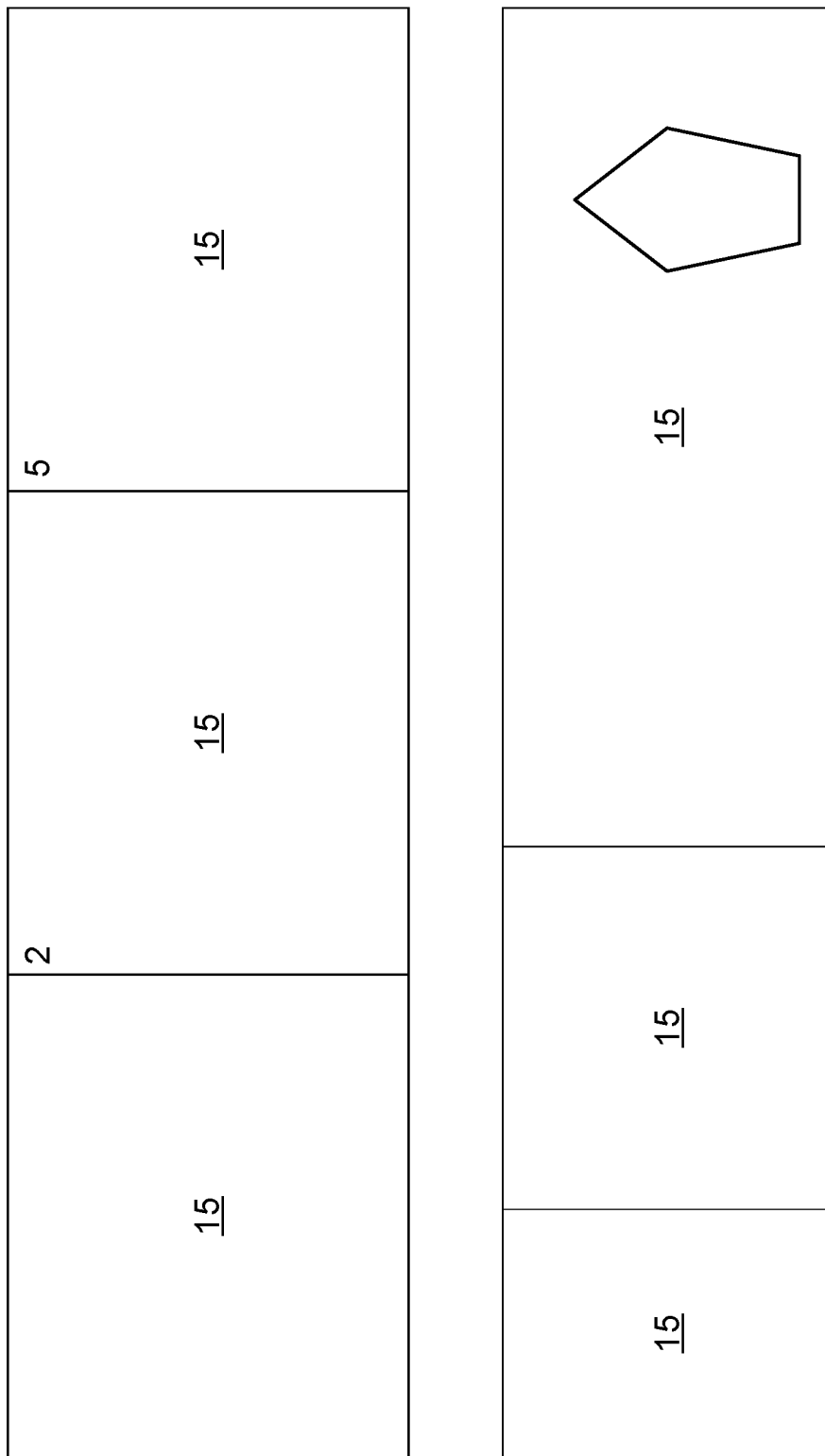
FIG. 10 is a schematic diagram illustrating side-by-side examples of a one-sided, two-sided and 5-sided in virtual information board in a virtual reality environment in an embodiment of the invention.

Referring to FIG. 10, examples of a one-sided, two-sided and 5-sided information board 10 all side-by-side are shown. What is also important to note, is that the thumbnail icon on the top left-hand corner of any board segment indicates the number of faces of the board behind the face that the user can see. This prevents the user from losing any content, as they can always see that there is more content on the other side of the board.

Modules Built into the Board

When a user does wish to draw something in 3D, like a 3D cube, or a sphere, or a cone, instead of just drawing randomly in space, they draw it in 3D in space associated with a particular board segment, so that when they are finished with that 3D item, they store it back on the board in the correct chronological order. This happens automatically, as the room is proportioned to be focused around the board; that is, every 3D space in the room can be associated with a 2D segment of the board.

For example, User A (the tutor) decides, "I want to explain cubes." User A is standing in front of one of the board segments (in VR avatar form). So everything that User A does in 3D is connected to one board segment; the board segment right in front of User A. So each board segment (or in another embodiment, a marker on the floor where the user's feet are) there is a parallel, or associated board segment. This means that every 3D activity that the user creates, or session that the user have, is collapsible into the 2D board, and it is identified with, or connected to a board segment. So there's a chronology to both the 2D and the 3D components to every lesson or session. Everything is on the timeline, everything is connected to a board; but this is not necessarily chronological according to when the user created the item with the timestamp, but instead it is associated with which board segment the user decides to connect it to; specifically which one the user is standing in front of at the time of doing the activity. This is important as users are able to teleport around in the room, and jump back and forth to different board segments, to add additional content. For example, a user could be working on the 44th board segment, but then teleport back to board segment number "20", to add a piece of 3D content which would then be stored in 2D on the board segment number "20." The user could then teleport forward again to board segment "44" and continue working there.

How this works in practice, to continue the example: User A draws a range of different cubes in 3D space. When User A is finished with that drawing, the first way that he or she can immediately send the drawing to the 2D board is by clicking a button on his or her tool palette.

Figure 11:
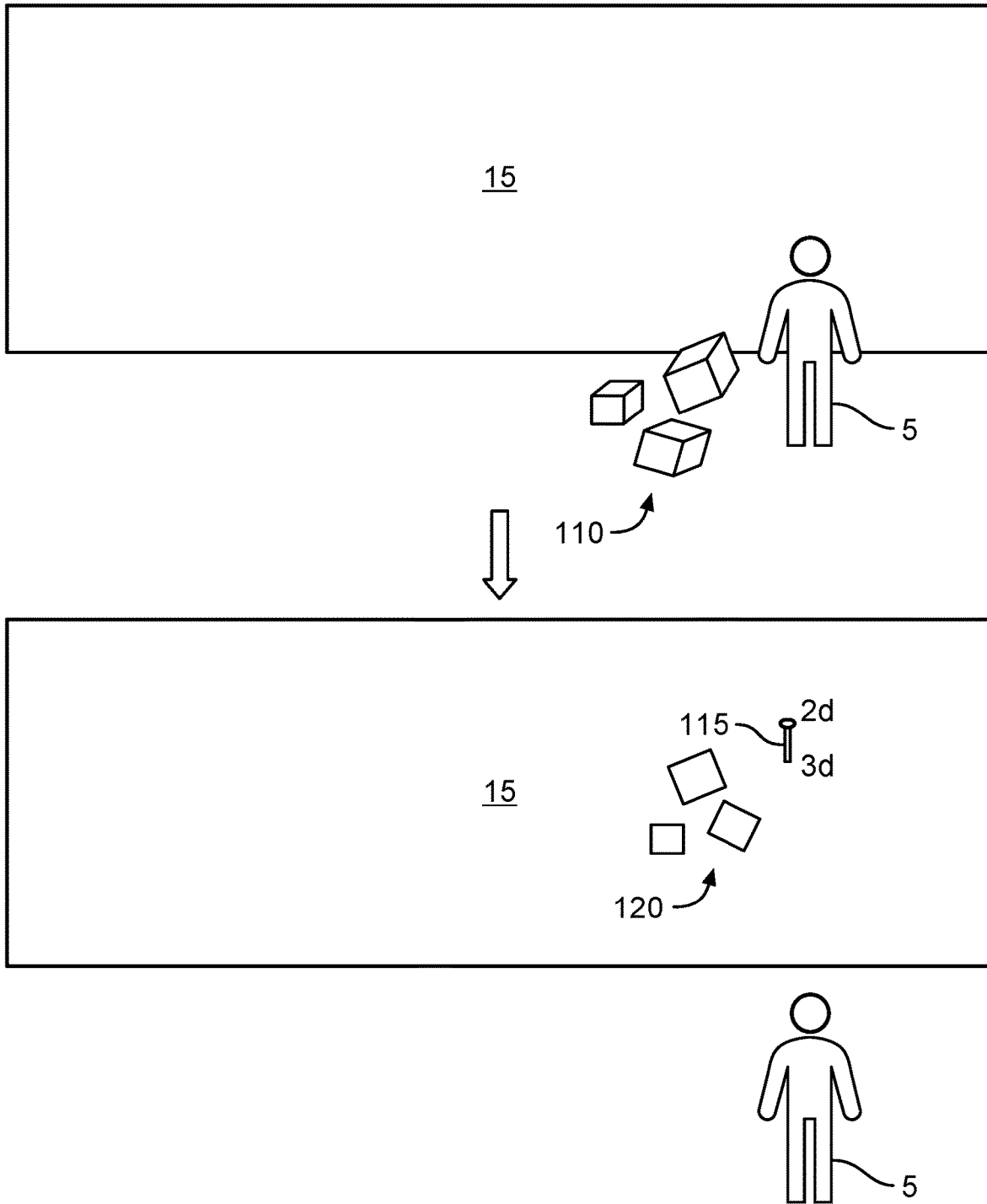
FIG. 11 is a schematic diagram illustrating three-dimensional displayed information converting to two-dimensional displayed information for storage on an information board in a virtual reality environment in an embodiment of the invention.

Referring to FIG. 11, the second embodiment is that User A 5 can just walk away, and just by walking away, the VR application folds the 3D drawing 110 into the board segment 15. This occurs such that nothing is ever lost in 3D space; as soon as the user is not working with the 3D object (indicated by them walking away), the system stores the 3D content in 2D drawing 120 on the board. When a 3D object is stored on the board, the system puts a little bookmark 115, which looks like a little lever sticking out of that board segment in three-dimensional space, that is a visual cue: "There's more to it than just this two-dimensional board segment, there's a 3D drawing the user can pull out and push back in."

The third embodiment is that User A can pick up the 3D object (because 3D objects can be picked up and interacted with in VR as if they are real objects) and hold it against the board. When it is being held against the board it flashes to indicate that it is about to turn 2D, and then the 3D object is replaced with a 2D "sticker" representing the 3D image, which is then "stuck" to the board in 2D. The user is then able to tap this sticker to cause it to pop back into 3D in front of the board. The object will otherwise remain as a 2D sticker on the board where it was placed until brought back into 3D by the user.

Beyond the obvious and unique benefit of storing all VR content chronologically, this feature has two additional benefits.

The first is that storing content in 2D saves bandwidth because the user's device cannot support having all of that 3D stuff always loaded. So it basically offloads the 3D objects to not be loaded unless the user is in front of that board or near the front of that board.

The second benefit it has is that: when the user is trying to navigate down the line, the user can go down the board segments, the user can go down the board on the wall and not have all of the 3D objects, modules, games, etc. in the user's way as the user is walking through it.

Two Sides to the Board

In a typical VR environment of the invention, users are only going to stand on one side of the board. However, in other embodiments, users can move to, see and use both sides of the board. In the primary embodiment of the VR application, people are generally kept on one side of the virtual 3D information board, so that it makes it simpler to follow what's going on in a linear fashion. The user could flip the board and see the other side, but the user (in the user's VR avatar form) stays on one side of the board. In one scenario the user is on the South side, the user is looking North at the board, the user cannot go to the North side of the board, the user remains on the South side of the board and the user just flips the board if the user wants to see what is on the other side, and work with what is on the other side.

However, in another embodiment of programming a virtual reality environment with an information board, users could "step through" the board and then work on the opposite side of the board from the opposite side—essentially doubling their working space.

Wrap Around a Whiteboard which can be Pulled out of a "Flagpole"

Figure 12:
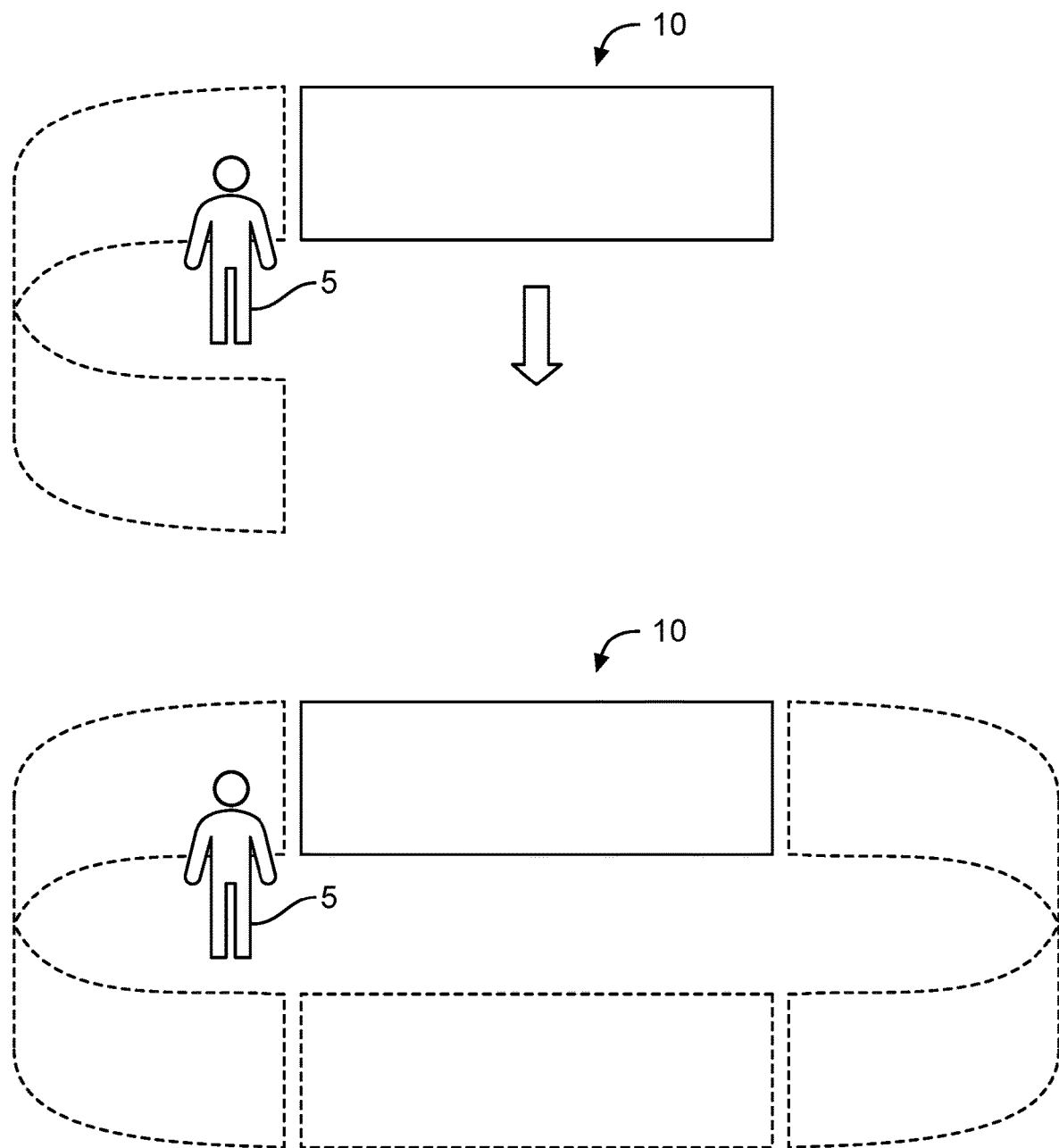
FIG. 12 is a schematic diagram illustrating a user pulling an information board around the user in a virtual reality environment in an embodiment of the invention.
Figure 13:
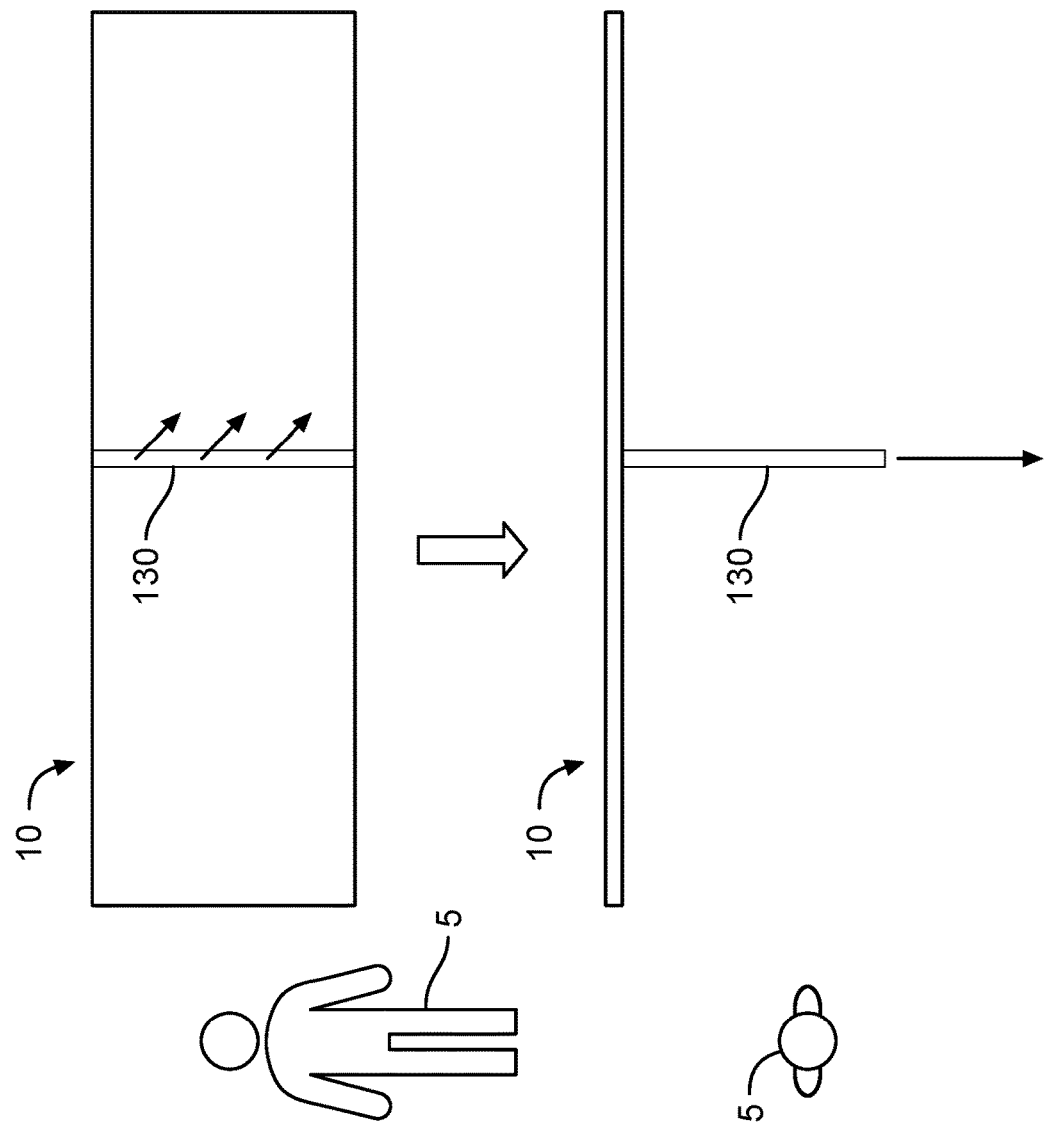
FIG. 13 is a schematic diagram illustrating a user pulling a perpendicular segment from an information board in a virtual reality environment in an embodiment of the invention.

Another embodiment of the virtual reality environment, such as a VR classroom, is that of a "wrap around" information board 10, which is pulled out of a flagpole-type structure by the user. The user can, for example, pull a whiteboard out of a flagpole-like structure and the whiteboard itself is flexible, but then it snaps to being flat, so the user can actually draw on it, and the user can pull it out, pull it out some more, pull it out some more, and then the user can pull it out even for a full mile or more if the user 5 wants that long of an information board, and the user can later put the board back in to the flagpole-like structure to save space. There are several embodiments that this technology can be implements:

i. A flagpole whiteboard for extending the information board 10 is shown in FIG. 12. The main way for the user 5 to extend the information board 10 is to grab on to the end of it, for example at the far West side of the board, on the end, and to pull on it to continue extending the board. The board can even be pulled around the user in a full circle (360 degrees) if the user continues to pull the board around them as illustrated. In embodiments, a "Curved UI" Unity Asset Store plugin (published by Chisley) is used in order to enable a curved user interface and prevent distortion of the content on the whiteboard.

ii. Flagpole whiteboards that are pull-out, flexible, snap-to-position whiteboards are also able to be used as another way to get more board space without adding additional segments from East to West as shown in FIG. 13.

For example, a tutor as a user 5 could say "I've got a big concept I want to talk about with a student today, but I don't want to mess up our chronological, organized board segments of the main information board 10 while I explain the details of this concept. I'm going to stick a flagpole between these two board segments (or alternatively, just pull horizontally out of the East, West board)." In this example, the tutor can pull a flagpole board 130 from the main information board 10 out towards them, i.e. towards the users or perpendicular to the main East-West board. Then when the tutor and student are done with that additional content, they can slide the additional board 130 back into the main board 10. While the main board runs horizontal from East-West, when the user pulls a flagpole board segment 130 out South, towards the user, it should preferably be a horizontal board as well.

Some embodiments of use-cases where tutors and students benefit from this tool include:

Users can practice problems without taking up a huge amount of space on the VR information board. This is important because users have to be able to teleport or travel down the length of the board over time to be able to review content. Users want to be able to do this efficiently, so any repetitive or messy tasks which would use a lot of space (such as practice problems) could be put on a horizontal board so as not to take up too much space in the timeline of the whiteboard. They can be stored for easy access if the users want to access them again in the future, but otherwise they are out of the way.

Users are able to bring in a homework PDF or a worksheet and they often don't want to interrupt the flow of the content on the board with these additional worksheets. Instead, they are able to put the additional content on a flagpole or perpendicular board segment, to be used and then stored for later.

When a user comes back to a board section some time later when revising the user's work, the user may want to add additional notes, or link to another theory, or draw an additional diagram to explain a concept now that they now understand better, or insert a module. They might want to do this without interrupting the flow of the main board, so they could set up a flagpole or a pull out or a perpendicular board here.

If a user thinks of something they need to study later, but don't have time to do in the current session, or if the tutor sets homework for the student to go back to, they would set that up as a perpendicular board as a placeholder for when the user come back to that in the future.

iii. Another embodiment is that the main landing page for a VR environment application is able to be designed as a series of information board "flagpoles" with the name of the room on them, such as the vanity name that the user has created to recognize that room when they go back to it over time. And when the user chooses that flagpole it unwinds to create the user's board of the designated length that the user has either created, or to the default minimum length if it's a new room, and when the user is done with it and when the user exit the room, it zips back into a flagpole and then the user sees all the user's flagpoles again in series again in the landing page.

Augmented Reality (AR) Infinite Circular Room:

Another embodiment provides an extension of a 2D-wraparound whiteboard for Augmented Reality (AR). When using Augmented Reality (AR), the user can't extend the board out infinitely, because the user's house or building where the user is using the AR has walls, and the augmentation in AR is simply overlaid over the physical world.

In embodiments, the AR boards are able to be wrapped around in a full circle, that the user is standing in the middle of. The board wraps around the user in a circle and the user can then just grab or pinch the whiteboard around them (using hand tracking or controllers) to move to all the boards around them in space; that is, the circle spins around the user as they manipulate the board with their gestures and controls. For example, the user can spin the circle to go back to chapter 1 or forward to chapter 10, and the content will spin around constantly, like it is unfurling.

This occurs with the use of a seam where the new content enters, which is positioned directly behind the user in the circle, to give the impression of infinite content spinning around the user in a circle.

Spotlight Board Segments Above the Users Head

Figure 14:
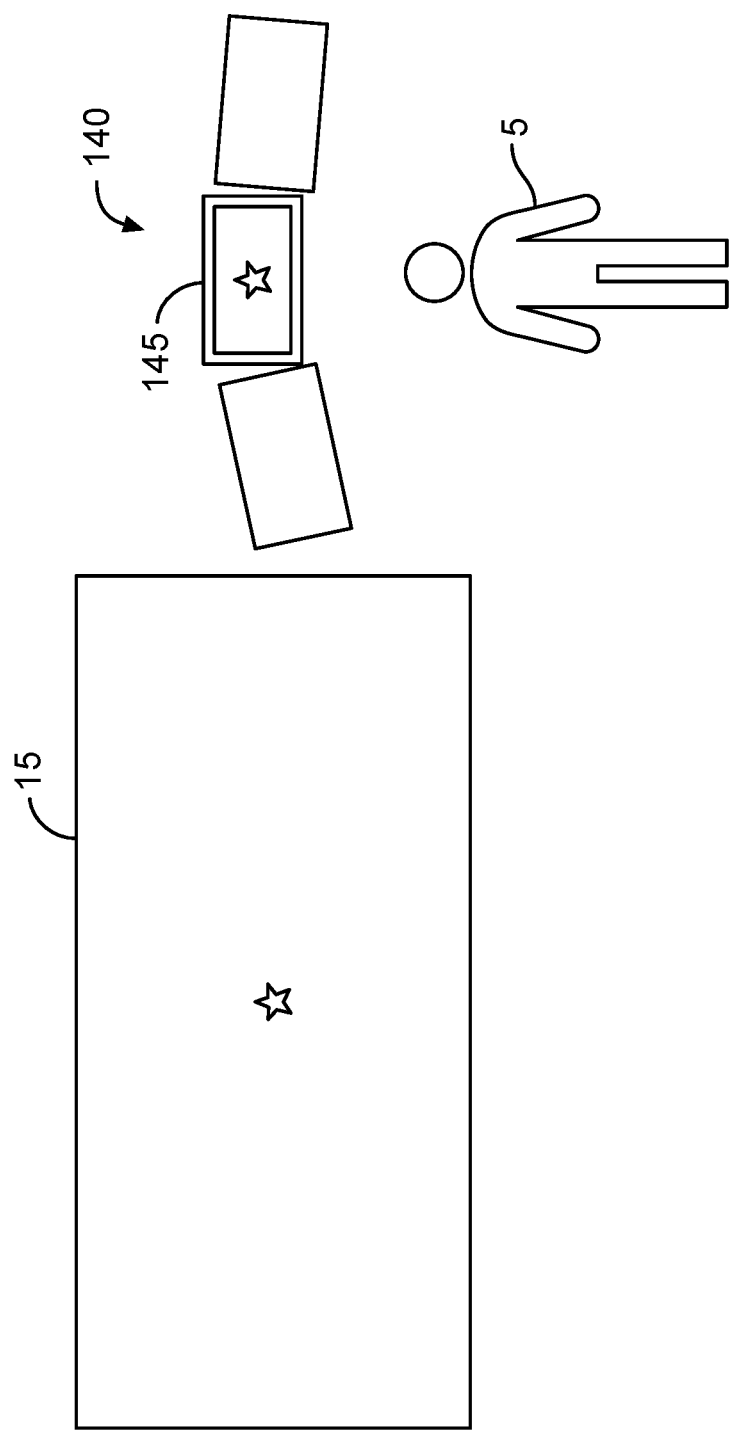
FIG. 14 is a schematic diagram illustrating a user viewing multiple information board segments from an information board above the user's head in a virtual reality environment and the segment that is highlighted or marked is displayed in front of the user in an embodiment of the invention.
Figure 15:
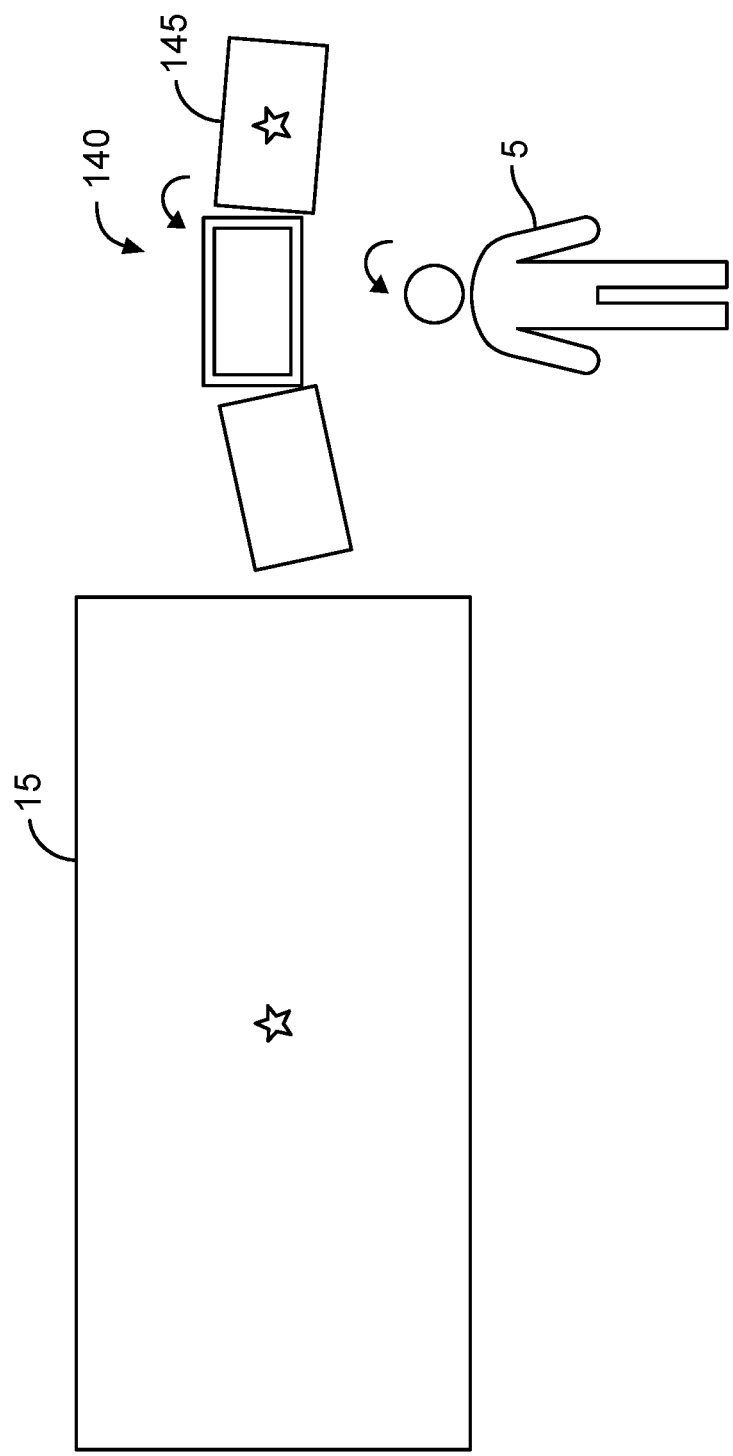
FIG. 15 is a schematic diagram illustrating a user turning counterclockwise and moving or rotating multiple information board segments from an information board above the user's head in a virtual reality environment and the segment that is highlighted or marked is subsequently displayed in front of the user in an embodiment of the invention.

Referring to FIG. 14, when using a virtual whiteboard, in embodiments the user 5 can look up at any time and above their head is a circle 140 of board segments, preferably as "thumbnail"-type board segments for providing information board navigation for the user 5. When the user looks up, one of the board segments is highlighted: this will be the board segment 145 directly above the user's head, which will correspond to the board segment 15 the user is standing in front of in the VR environment. Referring to FIG. 15, when user 5 spins their body, different board segments highlight, since the head-mounted display knows that the user's orientation on the ground corresponds to a board segment in the circle 140 of thumbnail segments above their head, and so the spotlight section changes depending on the way the users body spins. When a thumbnail board segment 145 spotlights, it is preferably made larger so the user can see that particular board segment more clearly. As the user just spins the user's body, or in another embodiment, the user could also reach up and use the user's hands to spin that little circle 140 of thumbnail board segments and a different board segment is spotlighted.

Figure 16:
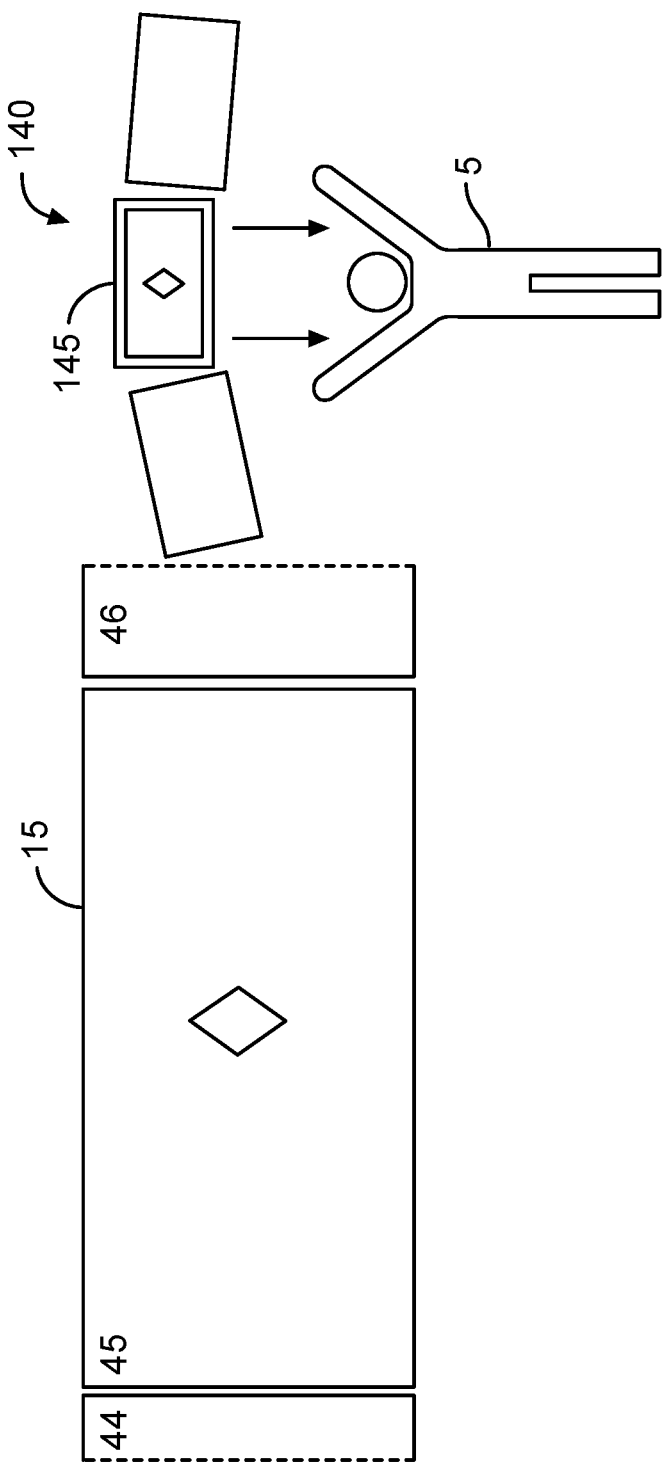
FIG. 16 is a schematic diagram illustrating a user selecting a segment from multiple information board segments from an information board above the user's head in a virtual reality environment and the segment that is highlighted or marked is subsequently displayed in front of the user with adjacent board segments in an embodiment of the invention.

Referring to FIG. 16, once the user has found and spotlighted the board segment 145 that they want to jump/teleport to, the user can reach up with their hands and pull that spotlighted board segment 145 down, from where it is floating above the user's head. The pulled board segment will then be right in front of the user. For example, a board segment may be pulled down, and extend all around the user (e.g. in the circle around the user, or in another embodiment the linear board around the user extending infinitely) and also with adjacent board segments. For example, a board segment 15 of interest along with the other adjacent board segments (ordered before or after the segment of interest such as illustrated as board segments "44" (before), "45" (segment of interest) and "46" (after)) in the continuous information board 10 are all displayed around the user and all of these segments ready to be interacted with by the user.

The key benefit of such embodiments is that the user can see many more mini thumbnail board segments when they are in a small circle above the user's head, and the user can scroll through them more quickly, because they are much smaller and more compact than the full-size board segments around the user at chest level. The spotlight circle above the user may have 5× or more as many board segments than if in full-sized board segments around a user, since they are tiny thumbnails that only open when in the spotlight region so the user can see them better as the user spins the user's body around.

Spotlight Board Segments with Additional Features and Pages

Another embodiment of the foregoing technology includes adding pages components to in VR environment with the information board segments that are not information board segments. For example, a circle of pages may be displayed above user's head that can be a combination of information board segments as well as non-board segments, such as document files, applications and application windows, and the like.

The non-board pages may be open for productivity, such as Excel windows (Microsoft Corporation, Redmond, Wash.) or Chrome tabs (Google LLC, Mountain View, Calif.), when the user is multitasking the user's windows. The user looks up and the spotlight circle overhead spotlights pages and then the user use the user's hand to reach up and pull down a respective page that the user want in front of the user, in the manner as described with respect to board segments above a user's head.

If a user, for example, has twenty things open on his or her computer, he or she may want to have access to all of them in VR or AR, and also wants to be able to pull the important ones (primary items) around her. In embodiments, the VR environment is programmed so that the user is presented a graphical user interface to set up his or her 'primary items' in the VR environment. The user can then look up, spin his or her body or hands t and find the pages/items/files, and then pull them down.

Another embodiment of this concept, is that instead of looking up, the user looks down, and the VR environment is programmed to display the pages/items circle down around the user's feet, and the user would reach down or drag/swipe things up into their primary items.

Figure 17:
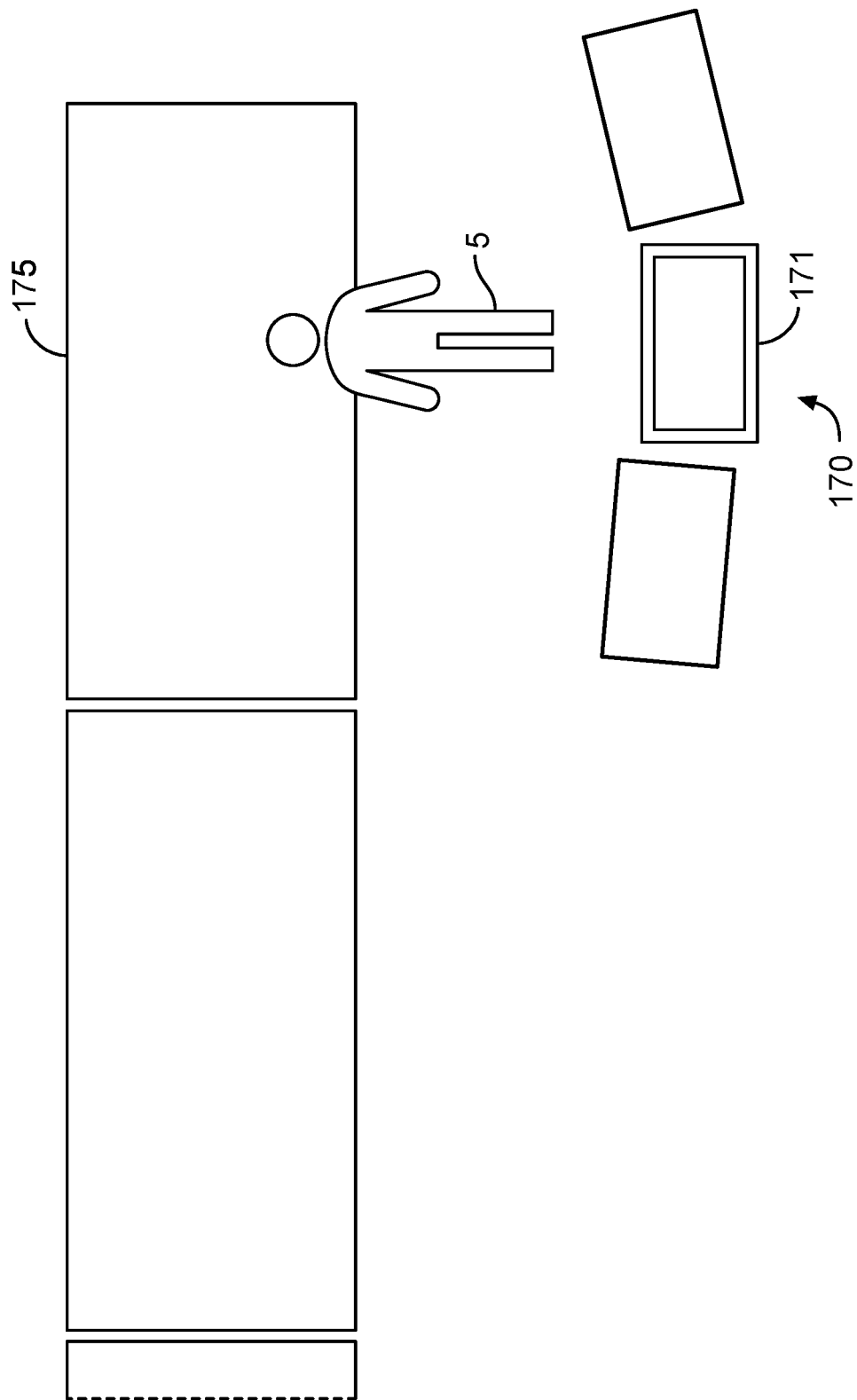
FIG. 17 is a schematic diagram illustrating multiple types of information board segments to be primary items in an information board that displayed as user looks downward, such as at the user's feet, in a virtual reality environment and an information board segment will include the type of primary item selected by the user in an embodiment of the invention.

Referring to FIG. 17, an Excel sheet is the primary board page 175 in front of the user 5, and can also be seen as a thumbnail page 171 in the circle 170 at the user's feet.

Figure 18:
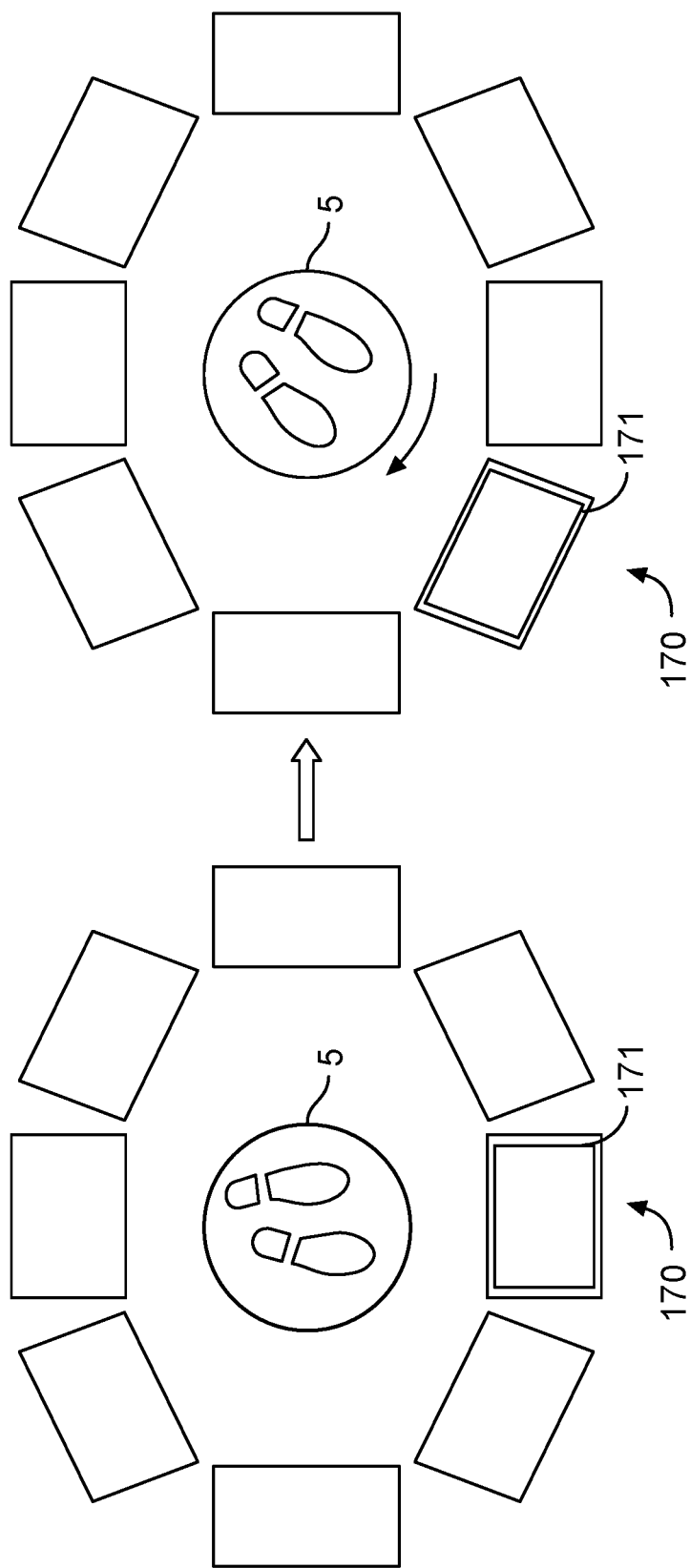
FIG. 18 is a schematic diagram illustrating a user turning to face a type of information board segment to be a primary item in an information board in a virtual reality environment in an embodiment of the invention.

Referring to FIG. 18, when the user 5 turns their body clockwise (as depicted in the image below), the next most clockwise board segment (or non-board page in this case), is highlighted. In this example, it is an image file.

Figure 19:
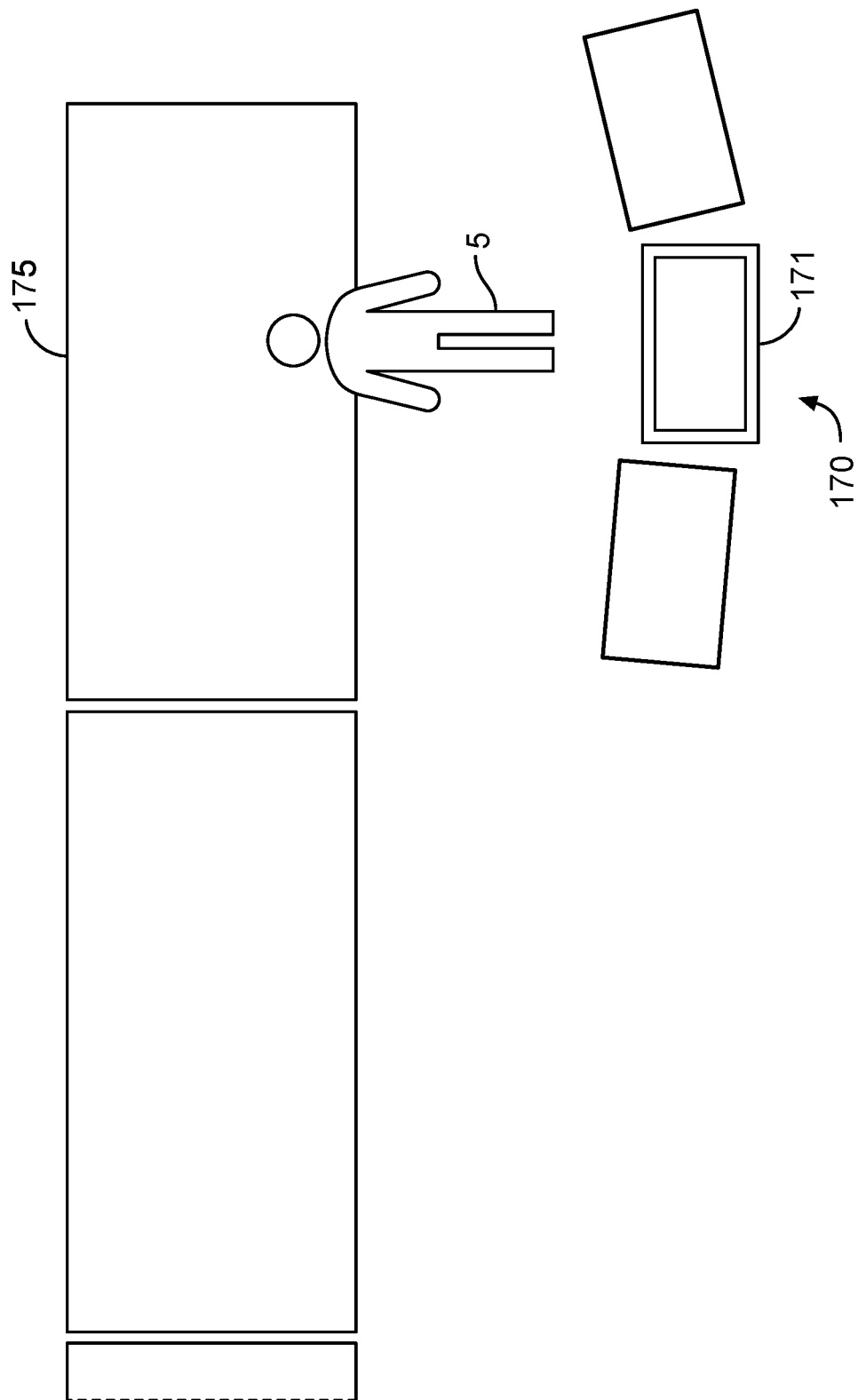
FIG. 19 is a schematic diagram illustrating a user's selection of a primary item for an information board segment in a virtual reality environment and an information board segment and the type of primary item selected by the user is inserted in the information board while the prior primary item and segment is move out of sight of the user in an embodiment of the invention.

Referring to FIG. 19, after turning their body and highlighting the image file, the user then chooses to pull up this image file to their main primary board, moving the excel sheet to the next board segment (out of view).

The primary circle is highly important items that the user can interact with (the normal, full-size board segments described earlier), and this occurs typically at chest level. The secondary circle of smaller spotlight board segments is above the user or below the user, or both above the head and the feet, if the user has lots of tabs and pages and chooses to set both up. These secondary pages look similar to the 'dock' on the bottom of a laptop operating system screen, where icons on the dock become bigger when the user hover over them. Except in embodiments of the invention in a VR environment, a circle above the user or below the user is displayed and the user can flick/swipe/grab things and pull in from the circle (or similar VR docking mechanism) or put them back in the circle (or similar VR docking mechanism).

Board Segments Projected on a Physical Wall

Figure 20:
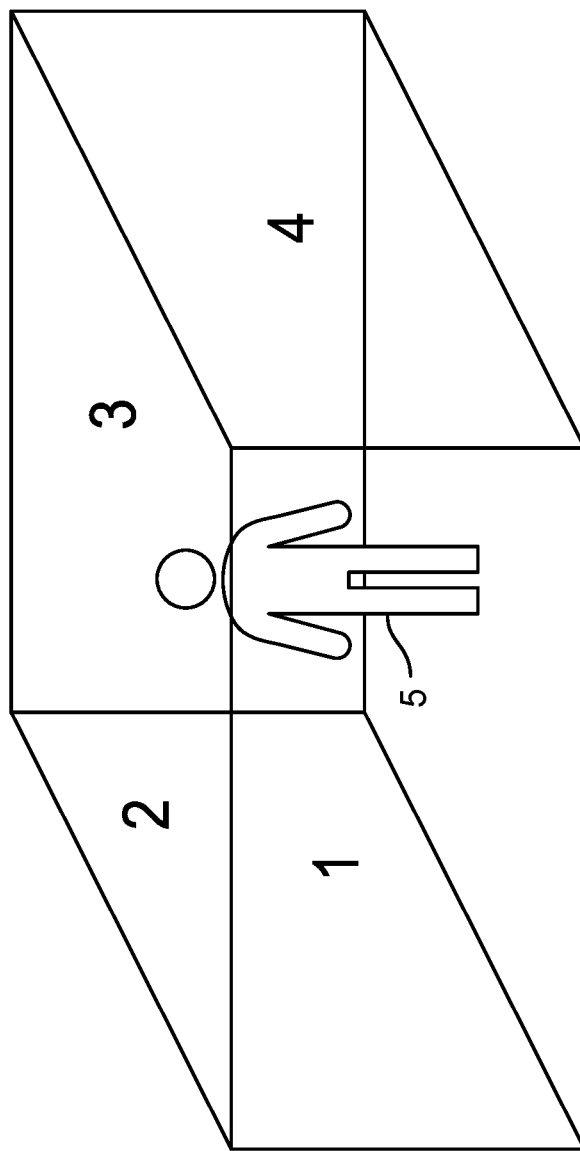
FIG. 20 is a schematic diagram illustrating a user using information board segments of an information board as walls in a virtual reality environment that correspond to physical walls of the user's physical reality in an embodiment of the invention.

Referring to FIG. 20, in some instances, a user 5 may want to use an actual wall in their house to write up against as if it were an information board, or they may want to use the wall as the orientation of their board in the VR room, like a physical whiteboard.

This is also helpful if there are multiple users, either physically together or virtually, who all want to collaborate together on the board. For example, there may be a situation where there are 5 students together in the physical room, and another 15 students who want to work with them virtually in the same virtual room. A board can be projected on to the wall for the 5 students in the physical room for them to see when they have their VR headset on. So the 5 students in the room with headsets on would see the board taking up one whole wall of the room, and they would understand the spatial boundaries of the physical space that they are standing in.

With the projected board, two additional embodiments can be implemented. One is in the VR environment where the students are fully immersed in the VR world, and another is in an AR environment, where the students can still see the physical room around them, but they can also see the VR room and everything in it at the same time. The additional 15 students who are meeting with them virtually wouldn't see the physical room boundaries, as they are not in the same physical room, but they would see the same board projected in VR that the 5 students in the room are seeing in either VR or AR.

In the physical room (or in the virtual room for the other students), the students can change the content showing on the projected whiteboard screen in multiple ways:
- by flipping the board, as explained in the section describing Flippable Boards
- by using the Spotlight method disclosed previously
- by swiping the scrolling bar on the bottom of the board, which would swipe the board across to the next board segment, which is now 'projected' on the wall. The users can flick the board to the side using their hand tracking gestures (or controllers, in another embodiment), and the board changes to the neighboring board segment.

by grabbing the board to move it. In this gesture, the ground stays where it is, but the board itself can be slid left and right and up and down. This allows the user to access more blank space on the board to continue writing, or to access previously written content, by grabbing the board with hand tracking and pulling the previous content into view. In embodiments, the board cannot be moved closer to the user through this method, as it is locked onto the axis of the physical wall. If the user tries to move the board closer to the user, the system will bring the user closer to the board, but the board remains stationary and is not moving. In this instance, the other user will see the user slide the board left and right and up and down, but the other user would not ever see the user pull the board closer to the user (and thus closer to them) because that's not allowed within the constraints of the navigation controls. Instead, the other user would just see the user move closer to the board or farther from the board.

Another embodiment is that the student can walk up to the physical wall and there would be a left and right arrow projected on the actual wall through AR or VR. When the user then touches the actual physical wall with their fingers, which are tracked with hand tracking, the headset knows the user want to press left or right (which are forward or back buttons) to change the board segment to the neighboring segment. This is much like the buttons used to extend the board segment as described previously.

The key difference in this embodiment, as compared to the infinite whiteboard embodiments above, is that the students are enabled to use AR as an option, as well as VR, and that at any time, there are only a limited selection of board segments projected in the room, compared to in VR when the room appears to be infinite. This means that instead of the board going through the user's wall somehow, outside the user's house, which does not make sense when in AR, the students can stand next to a physical wall together in a room, and see each other through AR and all see the same board projected on the wall.

This means that there would be no need for a physical whiteboard, if a board could be projected straight on the user's wall (which the user could see when the user has a headset on).

Another embodiment includes multiple students working together in one physical room, and each student could have their own board segment projected onto a different wall in the room. For example, Student 1 takes the north wall, Student 2 takes the south wall, Student 3 takes the east wall and Student 4 takes the west wall. Each student can work individually on their own board segment, while in the same space as the other students. The students could also walk to each of the other student's parts of the room and read what they have each written on their boards, and interact with them. Users therefore could use all 4 sides of a 6 ft×6 ft (or other dimensioned) room (see FIG. 20). And all 4 students can see all 4 boards. Another embodiment of this technology is to use however many walls are available in any given room. If the room is an unconventional shape, like a triangle for example, with three walls, this doesn't matter, the user can simply place the board segments all over the walls that the user does have, so the user can see more than 1 board at a time and walk around the room to the different boards.

3. Room Customization & Selective Parity

By nature of being in virtual reality, many components of the room are able to be customized and changed. This includes but is not limited to, the background of the room, the board itself, the floor/ceiling/walls (if any selected), and any furniture in the room. Currently, VR spaces allow individuals to experience different worlds and scenarios, but the experience is wholly singular. Technology created a situation where an individual is able to access many worlds, but the individual is simultaneously isolated. There is not a known conventional solution that makes VR simultaneously individualized, yet collaborative. This is a crucial missing link, made especially evident in any arena of learning or training.

Improvements offered by embodiments of a programmed VR environment of the invention, include creating a VR space "classroom" that incorporates human knowledge of the individual to create an individualized room experience that can also be collaborative with others (e.g. an instructor and/or other students) in the VR "classroom" or space. A teacher, for instance, can set up certain sequences of environments, customized for each student (as he or she knows is needed for individual needs of students), that addresses students' needs. An instructor can adapt the virtual space for each student/user (this can be done for job training) as well. The VR experience is being moved from a purely individual to a collaborative experience. The teacher can be with the student in the same virtual reality world, or one teacher can be with multiple students, manipulating the world to best suit each student's preferences and needs. These different worlds could be based primarily on personal preferences, or they could be more specifically tailored to a student as required for their learning styles, skill levels, health or learning difficulties. For example, some students who are easily distracted might be suited to a more simple background and no spatial/background audio, which would not cause as much distraction. Students with reading troubles may benefit from the font size being larger on all textbook files being imported into the room, which the teacher could set for all sessions with that student, ahead of time. Students who have hearing difficulties could have real-time closed captions automatically on by default for each session. A student who is color-blind, for instance, may have certain colors automatically changed for them (e.g., a red-green color-blind student will always see red-color notes in blue instead), or have patterns built into colors.

Different Adaptable Spaces

Figure 21:
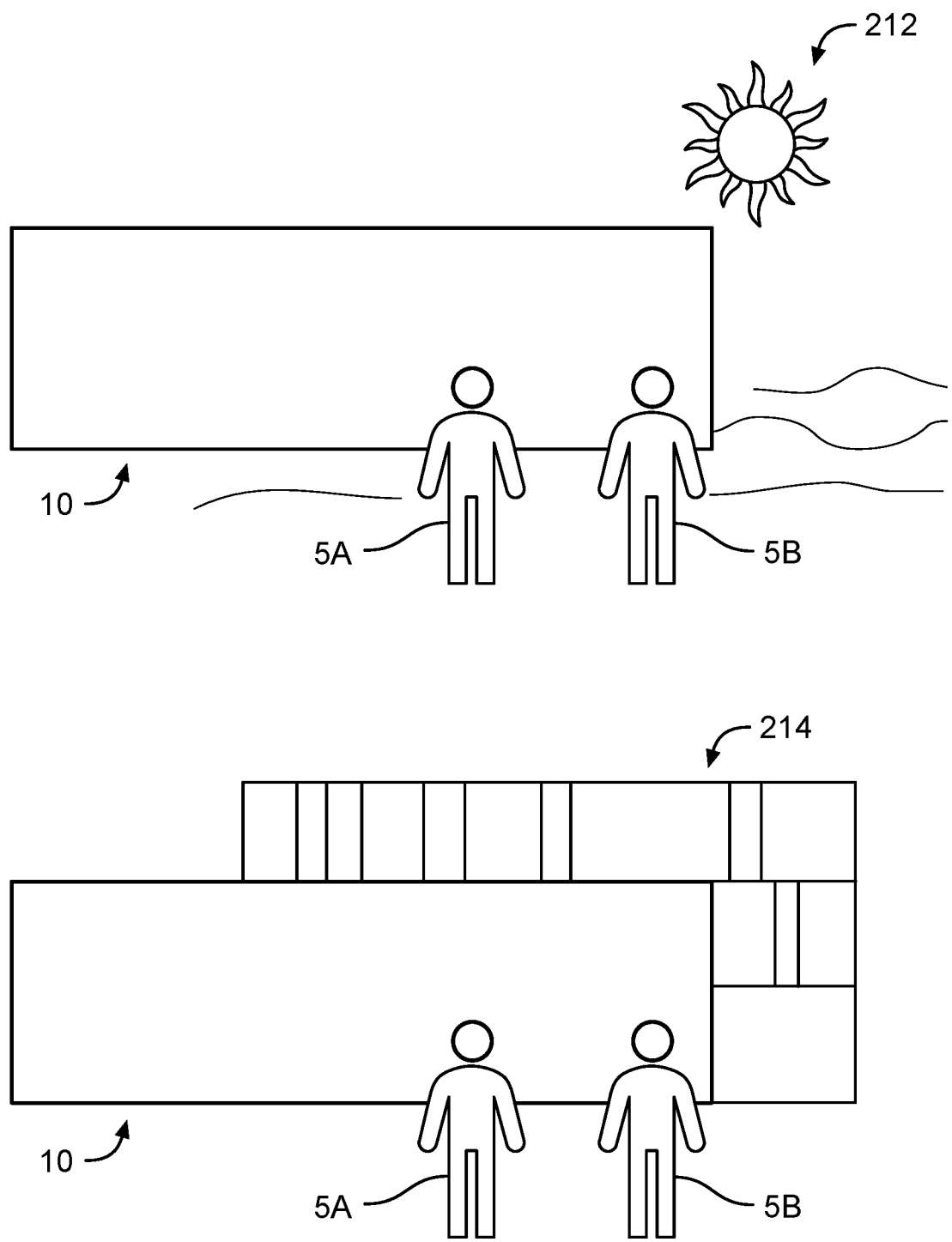
FIG. 21 is a schematic diagram illustrating users collaborating to share information on an information board in respective virtual reality environments wherein each user has a different background environment settings in their respective VR environments while the information on the board remains the same for each user in an embodiment of the invention.

Some contextual factors of the virtual room (e.g. background, floor, furniture, whiteboard/blackboard) can be changed in embodiments. These changes can occur in VR for one user but not the other. For example, as shown in FIG. 21, two users 5A and 5B are able to customize their backgrounds differently: e.g. user 1 (5A) can set their background 512 to the room as if they at the beach, while user 2 can set their background 514 as if they are in a classroom. These two users can collaborate while each experiencing different backgrounds simultaneously. For other factors, the two (or more) users must experience the same information on the information board 10 simultaneously, such as the content on the information board, the color of the content on the board, and the color of the pens each user is using. In general, the rule is that the content must be consistent between users, but the context in which they experience this may change. This is integral for tutoring because when referring to content on the board or content of the lesson, there cannot be any confusion between users. For example:

User 1 is in a classroom, while user 2 is at the beach, but the whiteboard and everything on it, including the practice problems they are working through, are consistent between users User 1 chooses to change their classroom background to a forest and change the color of the pen in their hand from blue to red. User 2 stays on the beach, but also see's user 1's pen change from blue to red.

Both users are working on the whiteboard as the information board. User 1 decides she would prefer to work on a chalkboard instead. The board experienced by user 2 remains as a whiteboard, while the board experienced by user 1 changes from a whiteboard to a chalkboard. All of the writing and files, etc. on the board retain their color, size & all other features, and user 1 is able to continue collaborating on the board. User 1 will now see the board as a chalkboard, while user 2 continues to see the board as a whiteboard.

While working at a table, user 1 prefers a wooden desk while user 2 prefers a glass desk. Everything on the desk remains consistent for both users These customizations are also able to be personalized based on a dynamic input which comes from a source external to the VR headsets, application and VR server computers:

One example of dynamic input is weather input: a user could have their settings such that they appear to be on the beach, and the beach scene changes based on the weather. If the weather is raining in the real-world, then their beach scene will also appear as raining; or sunny if it is sunny etc. The weather input comes from an external weather Web site, Web page, weather station hardware and software, etc.

Another example is that the user's background setting could be variable based on the time of the day. If it is the morning, the sun could be rising in the distance, with the sound of birds chirping. In the evening, the moon could rise and the audio would be more silent.

These customizations can also be used according to research and particular student's needs. For example, changing the color of walls to be blue is supported by research that it's more calming, and there is research to show that people remember more when they are in a green space. The benefits of VR are that each student can have a different color of wall in the classroom, and additionally, this can be trialed and experimented much more quickly as compared to assessing in the real-world (no need to actually buy paint and re-paint to determine results in VR). These customizations provide and are based on personalized feedback, as the VR application will learn, through commercially available AI, which environments are most effective on a per-user basis (e.g. by the results of peer users, or by the current user's results (such as test scores, attention assessments, and other results) using different environments).

Environments and Specialized Environments

In addition to the basic environments, there are also specialist environments which are custom purpose environments for completing different tasks. A programmed VR application of the invention can have several specialist environments and will continue to develop more specialist environments with specialist partners, universities & colleges. Example specialist environments include but are not limited to:

tutoring room—like a breakout room or private room for a tutor and student classroom—for multiple (more than 2) people to collaborate together electricity room for physics—circuits room where the user can see a circuit completed in 3D, while the equation is being shown at the same time.

molecule room—a chemistry-based room with molecules or processes (like the Kreb cycle), where users can have an activity and/or a matching game or something other little simulation or visual aid library—where the user can read all the Openstax (Rice University) books and sit quietly. This library room has a beautiful, modern library aesthetic, with all textbooks the user needs are accessible right there (through Openstax integration), also public domain books may be kept here too. In this room, users take voice memos, highlight content & take notes which they export to their computer or store in the VR app to revise later. This room is the ultimate in immersive reading, with page flipping in zero gravity, and definitions on words in textbooks can be experienced, but in VR when there is a recognized place or object, the user can bring that element up in 3D to interact with it or explore it.

accounting statements room—users can select from various public companies and the balance sheet an income statement and cash flow statement pop up;

and then the user can select the next company and then those statements pop up instead.

Modules in Adaptable Spaces

The classroom itself is to be a very foundational space (infinite whiteboard with a user palette to access all necessary tools for learning) but the users can alter this space to teach specific applications. Examples:

A mirror room or space for chemistry to be able used:

With the molecular bonds, being able to flip them and draw vectors to show dipole moments.

Ability to show mirror images for isomerism. Letting the student look on one side of the glass then walk over and show the other side of the glass. Then shrink the molecules to show they are not superimposable Ability to go to job sites like construction and show how cranes work for physics and test track to show velocity Ability to dive into problems to see the conductibility of solutions for chemistry Show how attractions (IMFs) work on the compounds studied.

Virtual car where instructor shows student user how to change the parts

These tools can be integrated as APIs, SDKs, or raw source code as needed.

Sit/Stand Customizations:

In embodiments, a VR environment of the invention is programmed so that users can use the VR environment and information boards while both sitting and standing. The transitions between these positions and the multi-user components of the feature are smoothed through several unique settings outlined in the subsequent description.

Sitting/Standing Transition and User Interface and Settings

When a user's headset detects that they are sitting down, (such detection occurs automatically), the virtual whiteboard rotates from being vertical, at 180 degrees (like a normal wall/whiteboard), to being horizontal at 90 degrees, as if it's like a desk.

In order to capture a baseline height of each user, this is often captured by most head mounted VR displays upon set up, however, this is also verified in a programmed VR application of the invention by asking the user at the start of the first session of application set up: "Is the user sitting or standing right now?" in order to determine the height of the user at standing, and use this as the baseline to then make automatic assumptions later in the VR application in an embodiment of the invention. Other alternatives to detect the height the first time:

Sitting and standing behaviors: if a user is moving around a lot then it is most likely that they are standing, and can be treated as such.

The external cameras in a head-mounted display (HMD) can see the floor, or other surroundings around a user, providing information on the user's stance. For example, if the headset detects that a user's headset is 5 ft off the ground or the closest surface, then that user is assumed to be standing.

For example, a user is holding a marker in their hand and is standing up by a whiteboard, and the orientation of the whiteboard is 180 degrees vertical (compared to the user's desk which is a 90-degree, horizontal orientation). The user then gets tired after standing for a while during tutoring, so the user chooses to sit down. As the user sits down at their desk, their headset measures this change in height and positioning.

There are several options once the user has sat down, as to whether the board reminds vertical, automatically transitions to horizontal, or settles somewhere in between horizontal and vertical. These settings are offered to the user the first time they transition from standing to sitting in the VR application in an embodiment of the invention, and they can choose to save their preferences, or re-select them each time. Once they have set their preferences, the user can also change their master settings in their user settings. The different embodiments of this feature are outlined as follows:

i. One embodiment is that the user has sat down, but they still use the board vertically at 180 degrees (or approximately thereto in vertical orientation). They can sit down in the chair or on the floor and hold their arm up and continue to just draw in the sky or against a physical wall in their house, at 180 degrees vertical.

ii. Another embodiment is that once the user has sat down, they are able to change the board from vertical to horizontal by manually 'pulling' the board to the horizontal plane. This action is done by virtual "handles" in VR which are always visible in one embodiment, or only visible when transitioning between sitting and standing in another embodiment. These handles allow the user to actually grab the board and pull the board to vertical, horizontal, or anywhere in between, in 5 or 10 degree increments, to choose where they want the board to be set.

iii. Another embodiment is that the interface automatically recognizes that a user has changed orientation, triggering a pop-up which says: "We see that the user has sat down. Would the user like to reset the user's board orientation?" At this point in time, the user can select "remember my settings for next time" in which case that will become their default setting for the next time they transition between sitting and standing.

Figure 22:
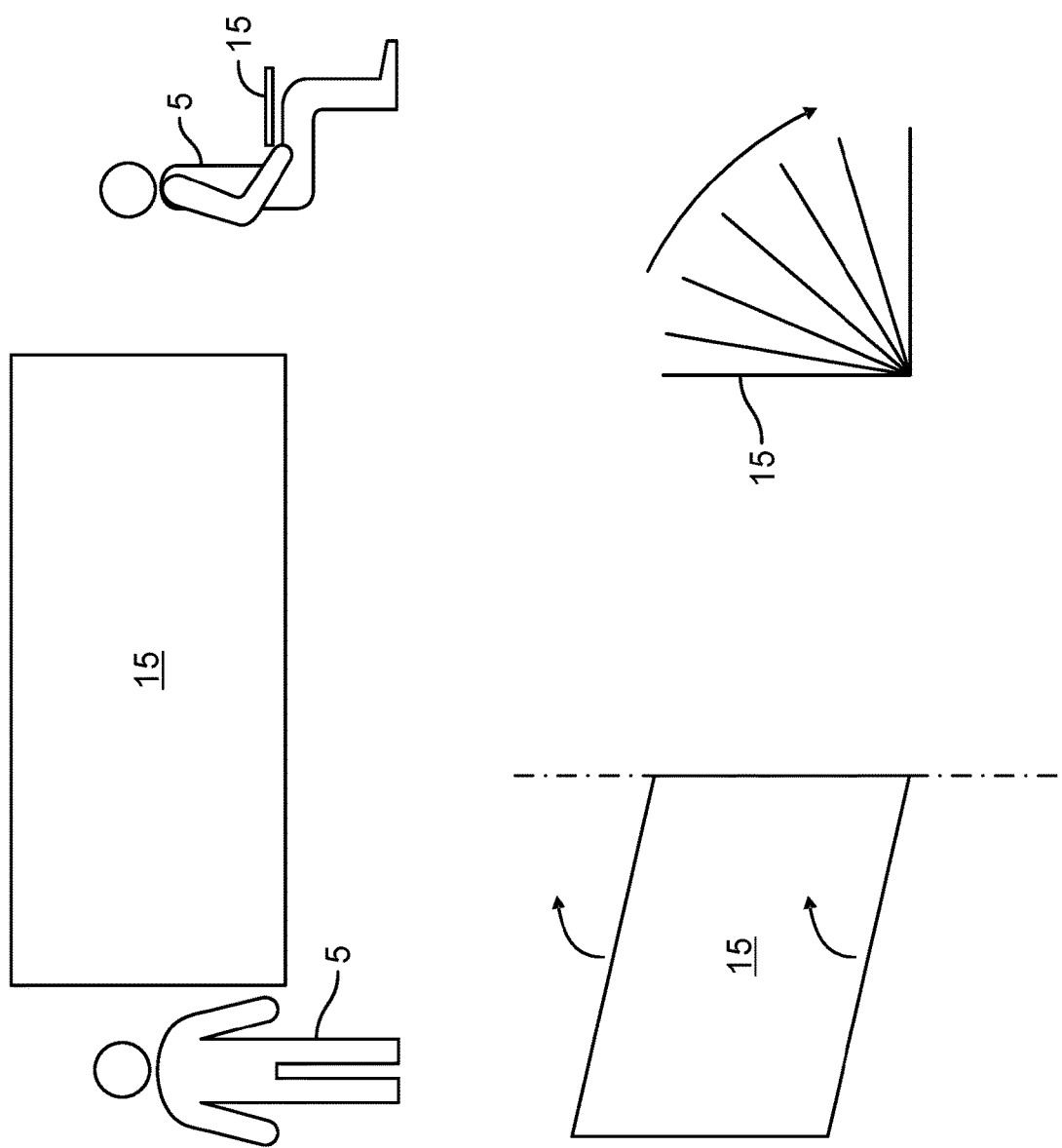
FIG. 22 is a schematic diagram illustrating the transition of a segment of an information board in a virtual reality environment between horizontal and vertical orientations in an embodiment of the invention.

The difference between a vertical and horizontal board and the way it transitions between these two orientations is demonstrated as shown in FIG. 22.

Different Horizontal Board Options

When the user chooses to bring the board onto the horizontal plane, there are also several options that they can choose from. Preferably, proportions are maintained between the height and width of each board segment. Whether the user chooses horizontal or vertical, the horizontal board will maintain the same proportions as the vertical board. That is, if the board is two miles long before it is rotated to horizontal, it remains two miles long after it is rotated, and the board width remains equal before and after the rotation, to keep proportions maintained. If the user chooses to make the horizontal board half the height (which is an option in the user palette, to allow the user to reach across the board more easily), this also readjusts the width of the board (shrinking the content proportionally) to maintain the proportions and therefore readability of the content on the board. An example is that a board may initially be 18 ft long by 3 ft high. When the user brings it onto the horizontal board orientation, this is adjusted to 6 ft by 1 ft, by shrinking all the content (and the board itself) by %, in the horizontal embodiment of the board.

Movement along the Horizontal Desk

The user can grab the board (which holds all the board content that was previously vertical, which is now sitting either horizontally in space, or on the virtual "table") with their hands and they can execute a "grab and pull" motion in VR, which will slide the board (with its content) across the desk (horizontal space in front of the user) in the direction the user pull it. The user themselves wont slide or move, but the board and its content will slide relative to the user in VR.

The grab motion requires the user to touch and squeeze the board content. In more detail, this gesture sees the user reach through the board; close their fists around the board, which will activate a visible glow to the user's VR hands, indicating that the board has been successfully grabbed; finally the user is able to pull the board in any direction they please.

The board itself is fixed to the horizontal (or angular, if set on an angle) plane, and thus can't be pulled completely upwards or off the desk/plane by the user. It can only be slide side-to-side to enable the user to see more content. In order to change the angle of the board itself (i.e. from horizontal to vertical orientation, or somewhere in between), the user will need to use the process outlined in 4A above (sitting/standing transitions and user interface).

Different Embodiments of the Vertical Table

If the table becomes horizontal, there are different ways that this can be experienced by the user, which is selected through the customization section in the user palette:

i. In one embodiment, the board simply transitions from vertical to horizontal, turning into a floating, horizontal board. This board is not placed on a table, but instead is just floating in space, just like when vertical, except now flipped onto the horizontal plane.

ii. Another embodiment is that a desk, a wood or metal or glass (or any other type of customizable desk, which can be brought into the VR application through 3D modelling integrations such as Google Poly), can be enabled. This gives the user the experience of sitting at a desk, with the board running along the desk as if it were a whiteboard laid out on a desk. The desk is placed automatically underneath the horizontal board, and the board is on top of that desk, like a huge roll of paper that's been unrolled down the middle of the desk.

Figure 23A:
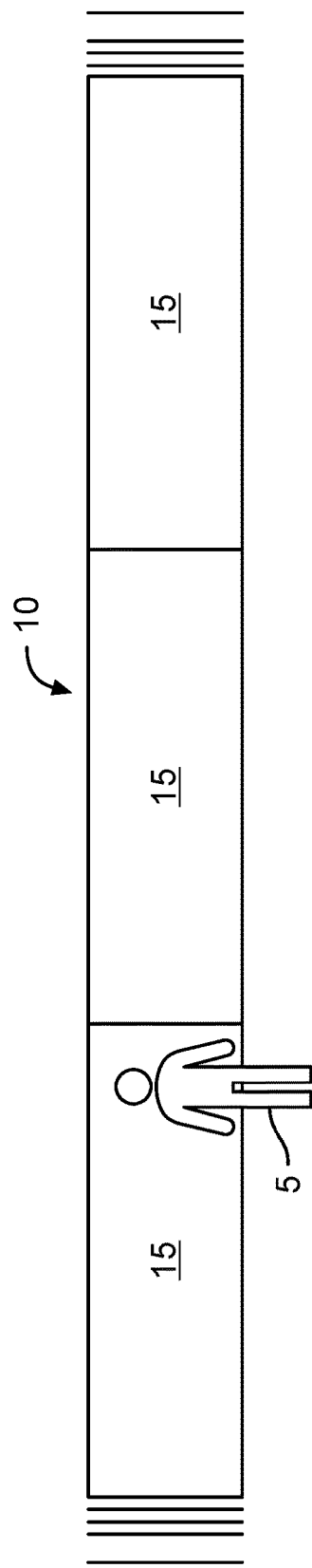
FIG. 23A is a schematic diagram illustrating an information board in a virtual reality environment in which a virtual desk appears to extend the same length as the information board in an embodiment of the invention.
Figure 23B:
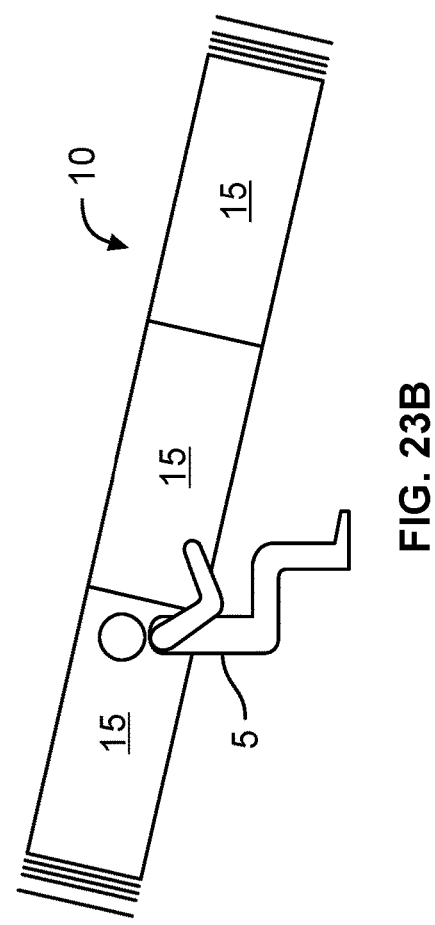
FIG. 23B is a schematic diagram illustrating an information board in a virtual reality environment in which a virtual desk appears to be a set size while the information board appears to extend as long as the information board holds in an embodiment of the invention.

Referring to FIGS. 23A and 23B, there are two different embodiments of this virtual desk which are available in a programmed VR environment application of the invention, which the user can toggle between based on their preferences for the style. The two options include:

In FIG. 23A, the desk is automatically the same distance long as the board itself, which means that in the instance of a very long board, the desk would be seen to extend into the distance.

In FIG. 23B, the board is as long as the content that it holds, but the desk/table remains a set size (which is able to be specified by the user in their tool palette if they wish to customize it, otherwise 12 ft long by default). The board is seen to fade into a gradient at the end of the desk, indicating that there is more content but the user must scroll to see it. The user can scroll by grabbing the board with both hands (reach through and squeeze gesture) and then pulling the board to either side.

Setting the Height of the Vertical Table

The table (or the horizontal board without a table) can be set to a variety of heights, which the user can specify. There are several ways which this setting can be edited, which includes the following options:

i. If using controllers, the user can put the user's controller on the table and the controller will set the height of the table, such as occurs in an Oculus headset (or may be implements in similar headset hardware device) to set the height of the floor. If using hand tracking, then the user can rest the user's hands on the table and this will set automatically. This occurs due to the external cameras on a HMD which are able to detect the nearest flat surface.

ii. If the table is set at the correct height automatically, the user can access this setting in their user settings and reset the table height. When they choose to do this, they receive a popup message which reads: "Please rest the user's hand on the table." This allows the user to manually reset the height.

iii. The VR program can detect the height of a table based on where a user is writing with hand tracking. As the user is writing, on an invisible horizontal plane, the system can detect where the user desires the height to be by the angle, height and positioning of the user's writing. The height of the table is automatically set to respond to a user's hand positioning.

iv. One embodiment designed to merge the real-world with the virtual world is a standing desk in virtual reality where the user uses a hand crank on the edge of the table. That is, the user is able to walk over and crank the handle to raise and lower the desk, up and down to adjust the height. The hand crank is operated with hand tracking, and also with controllers if preferred.

v. Or there is also a setting in the user palette in system preferences to adjust the height, emphasize the height, up and down.

vi. Using hand tracking, there is a gesture, such as raising and lowering fingers with the palm facing upwards, held out in front of the user, which moves the board up and down slowly. These gesture preferences may also be altered in the user palette system preference settings.

Angle of the Board

The angle of the board, whether it is vertical or horizontal or somewhere in between, can be adjusted by the user. There can be many different iterations of the user's board or table beyond just vertical (180 degrees) and horizontal (90 degrees). A board segment 15 at 45 degrees is shown in FIG. 24. Some of the implementations for this feature are:

Using the table like a drafting table, which is not a flat table, but instead on a slight angle.

If the user wants to lie on the ground, or if the user wants to lie on the user's back on the floor with the user's hand, no marker in the user's hand or a marker in the user's hand, doesn't matter. It's just tracking the user's hand. The user could literally lie on the user's back for somebody who's incapacitated or has a bad back problem, and the board could be either directly above the user, or on a slight angle, whatever the user prefers.

The options for how the table angle can be adjusted in the VR application include:

i. The user manually adjusts the angle in virtual reality, for example by pulling a handle out of the board and using that handle to turn the board on an angle, which is detected automatically in 5-degree increments.

ii. The board constantly gets smarter and better based on how the users are drawing, the position of their heads and controllers or tracked hands, and their user settings from the last time they used the VR application in an embodiment of the invention to draw.

iii. There is an interface which allows the user to type in the orientation (in degrees) that they want the board to be positioned at, in the user settings on the tools palette. So the user could type "65 degrees" and the board automatically shifts to that position.

When the user first enters the room, the board is pre-set as a whiteboard, oriented at 90 degrees vertical. This is the default position whenever a new user enters the VR application in an embodiment of the invention, or a new room is created. This default position can be altered by the user. Once set by the user, this preference is maintained until adjusted again by manual input by the user.

Customizing Avatars and Avatars in Multiuser Mode

Users Can Customize Own Avatars

Users can customize their avatars and how their avatars appear and interact with other user avatars too. Some of the changes one might choose to make to their avatar are as follows:

i. Change clothing ii. Change skin color iii. Change height (for example, if User A is a 6 foot 2 tutor, and User B is a 5 foot 4 student, User A might choose to shrink his or her avatar down to her size to make User B more comfortable. This may be pre-set by User A (as the tutor), that he or she is always automatically updated to the same height as whichever student is in the room with him, or this may be done manually as soon as another user enters the room iv. Age: students or tutors may choose to change the age of their avatar if it makes them more comfortable.

v. Pitch of voice to make other users more comfortable.

vi. Ability to change size (the person themselves) both to make other users more comfortable, but also for practical purposes relating to different modules, such as to explore large and small spaces. For example, if the user is working in a module where the user is exploring termite hills, the user can choose to make the user's avatar shrink down so that the user is tiny compared to the scale of what the user had previously seen in actual size, and then the user can walk through the termite hill to get a better understanding. Another example is traveling through a blood vessel.

vi. Change the gender—e.g. if User A is tutoring User B and User B feels more comfortable with a female tutor avatar, User A makes his or her avatar appear as female instead Users Can Customize How They View Other User's Avatars Editing the user's own avatar in VR is possible, but what is also unique to our application is that users are able to choose to customize how other users' avatars appear to them as well. This is helpful in the context of tutoring because students can learn better when they are comfortable with their tutor, which includes the importance of the tutor's appearance.

Changes in the appearance of other user's avatars will only occur from the perspective of the user who has made the changes. That is, if there are three users in the multiuser room (one tutor and two students, for example) and Student One changes the appearance of the Tutor, the Student Two will not see these changes, and instead will still see the tutor in their original/default appearance setting.

The tutor will also be able to see in their user palette how each student has chosen to view each user's avatars, which may help the tutor to set their default avatar appearance in the future. For example, a tutor user may prefer to set an older appearance for their avatar when tutoring mature students.

Users are able to change several settings relating to the other users' avatars through the settings that are found in the users tool palette. Some of these settings are as follows:

i. Avatar transparency: if the other avatars are obstructing the user's view of the board, the user can toggle their avatar transparency on or off so that the obstructing users just appear as an outline, as depicted in the drawing below. In other embodiments, the user could appear as a shadow, or a light orb, or another non-obstructive representation.

ii. Ability to change the age of the instructor. This setting is helpful in the context that older learners tend to have preferences for instructors who are their age group or older. Therefore, users can choose to change the age of both their avatars, but also of the other avatars they are working with.

iii. Ability to change the voice of the instructor, specifically the pitch and tone of the tutor's voice, to a voice that the user prefers to listen to. Accents might also be changed.

iv. Users can change the skin tone of their own avatar, or of the other person (typically not before the user has even seen them in that session). These settings can also be edited at any time during the session, after it has begun, but also can be set beforehand to streamline the initial introduction between users. These settings can be set manually, or the user can click a box that says, "change the skin of the teacher, to be the same color as the skin I have selected for my own avatar'. An alternative embodiment might provide the option to: "Check the skin of all the people in the room to the same color as my skin."

Avatar Height Parity

Figure 25:
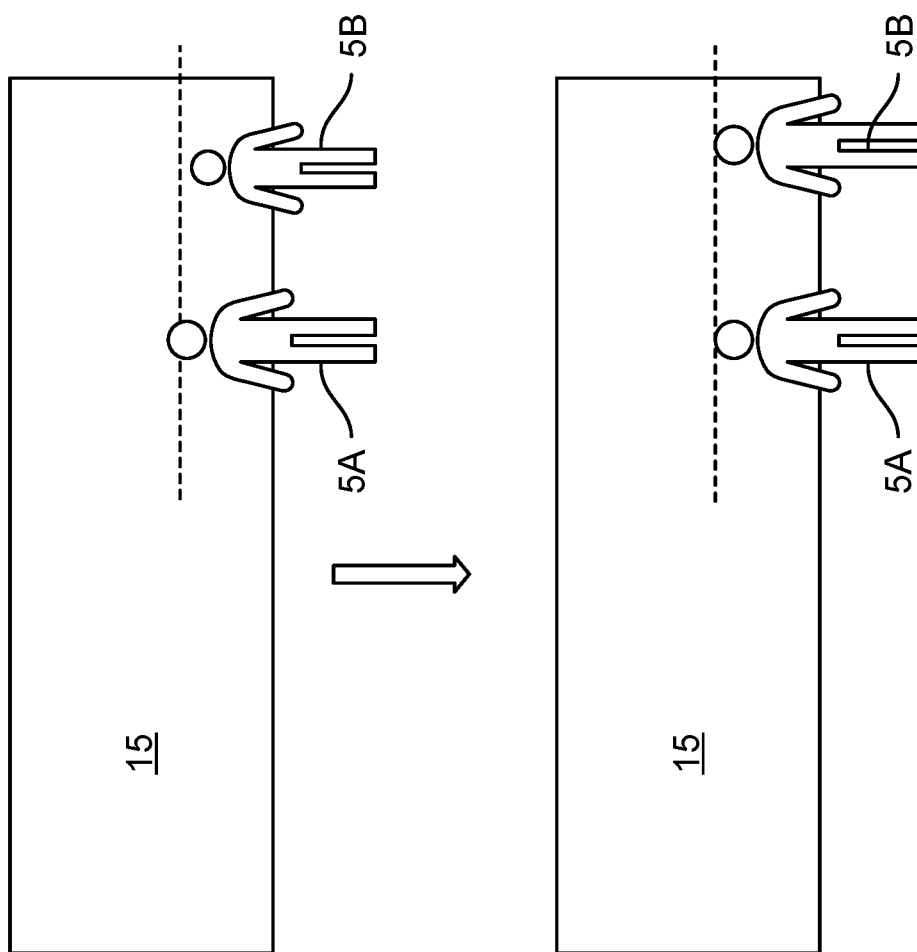
FIG. 25 is a schematic diagram illustrating automatic adjustment of display of an information board based on different heights of users in an embodiment of the invention.

In another embodiment of the VR application, and with reference to FIG. 25, instead of users choosing to customize the height of their own, or other user's, avatars; the application automatically senses the height of each user and sets the board, room and other user positions relative to this to make it more comfortable for both users. Three options for how this height can be set:

i. Based on the height of the tallest user; that is that the taller user sees the world as normal, but the shorter user has their experience adjusted upwards (they are now seeing as though they are as tall as the taller user).

ii. Based on the height of the smallest user; that is the smaller user sees the world as normal, but the taller user has their experience adjusted downwards (they are now seeing as though they are as short as the shorter user).

iii. An average of the users' heights: both users' 5A and 5B experience is adjusted proportionally in each required direction such as to put both users on the same plane for viewing and experiencing an information board segment 15 in VR. That is, the taller user experiences the virtual room as if they are slightly shorter, and the shorter user experiences the room as if they are slightly taller.

When these adjustments take place, the relative height of the board and distance between the board and the users must be accounted for and kept proportionate. Furthermore, the user's relative arm lengths for using the board must remain persistent, as the user needs to be able to expect their arm to be the correct distance away from the board at any given time. In order to adjust for this, taller users are positioned ever-so-slightly further back from the board by default, so that their longer arms still feel proportionate when they reach up to write on the board, but they appear to be the same height as the users around them in the VR room.

Another way that this can be built, in another embodiment, is that the board (and the entire room) ratio-scales based on the height of the user; which means that shorter users would just have slightly fewer pixels in their display than taller users.

Avatar Sit/Stand Parity

Avatar sit/stand parity is a setting which can be toggled on or off in the user palette of the VR application in an embodiment, which enables the orientation of all other avatars in the VR room with the user to appear as though they are in the same sit/stand position as the user's avatar.

When avatar sit/stand parity is turned off, then everyone in the room is displayed in the position they actually are in (that is, if user 1 is sitting and user 2 is standing, for example, then both users appear as such). If the setting is turned on to create parity between users' positions, then the different embodiments of this are explained below:

If user one chooses to sit down, then everyone else in the room also appears to be sitting down, whether they are actually sitting down or not. That is, the other users' avatars are adjusted in virtual space to appear to be at the same height, from the perspective of each user. This means that in the example of User A as the tutor & User B as the student, that if User A is sitting and User B is standing, User A sees both himself/herself and User B as sitting avatars, while User B sees both her own avatar and User A's as standing. The actual positioning of each avatar doesn't matter because the virtual board is unchanged and is showing to each user, so input can be edited regardless of avatar positioning.

Figure 26:
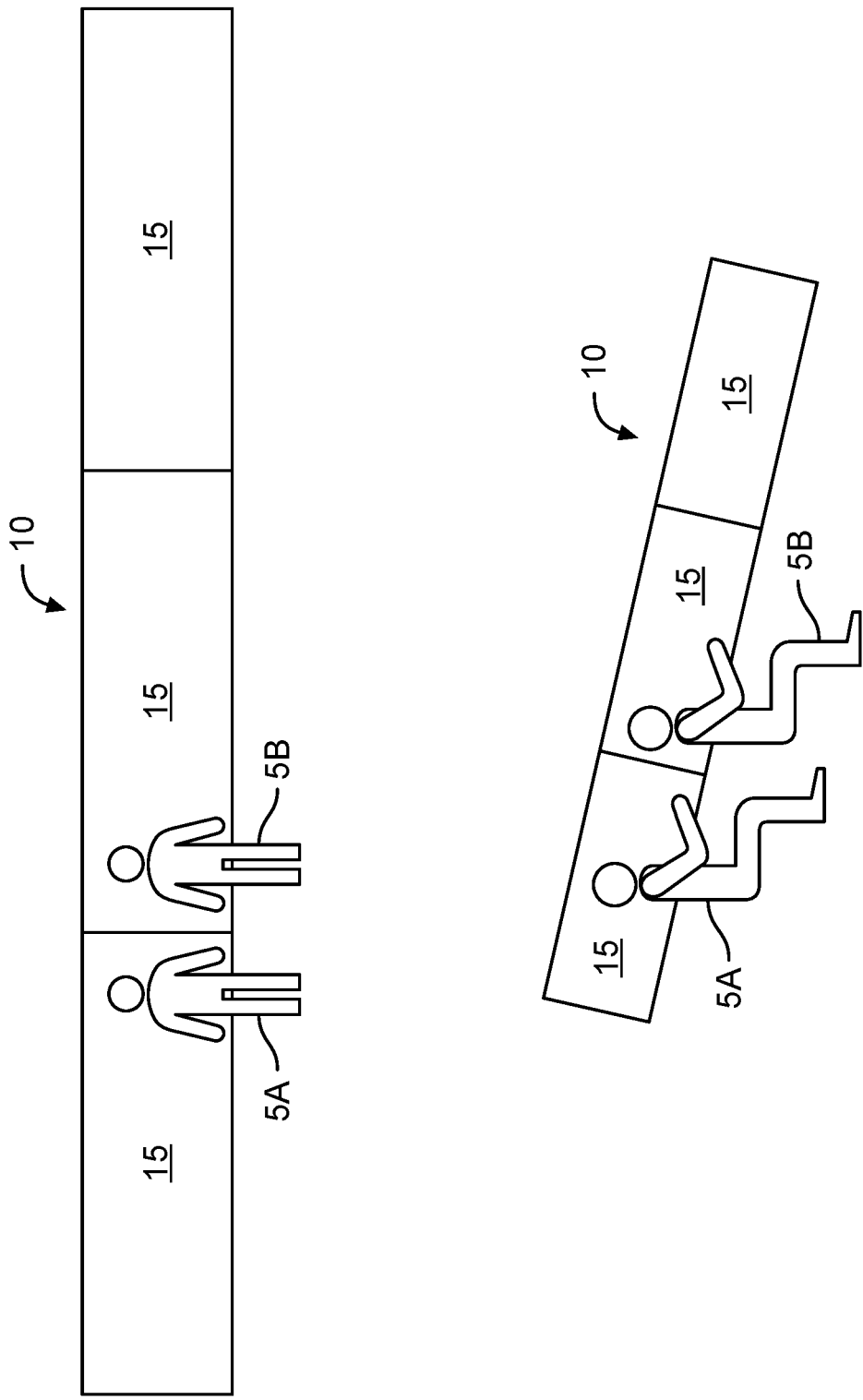
FIG. 26 is a schematic diagram illustrating automatic adjustment of display of an information board and users to each respective users' perspective in a virtual reality environment based on different real-world body positions of users in an embodiment of the invention.

Referring to FIG. 26, from both User A's (5A) perspective (while he or she is sitting) and User B's (5B) perspective (while he or she is standing) they appear at the same position on the board segments 15. They are working together on the same board segments, with the same content on the board for both User B and User A.

User A is lying on his or her back, User B would appear to be lying on her back too. If User A's lying on his or her back, because his or her back hurts and he or she's writing up above them in the sky, one option is that the virtual world appears to User A so that User B is also lying next to him doing the exact same thing. But for User B standing up or sitting, User A looks like he or she's standing up or sitting respectively, as each user's unique perspective determines the positioning of the other avatars in the room.

Avatar Interactions in VR

Figure 27:
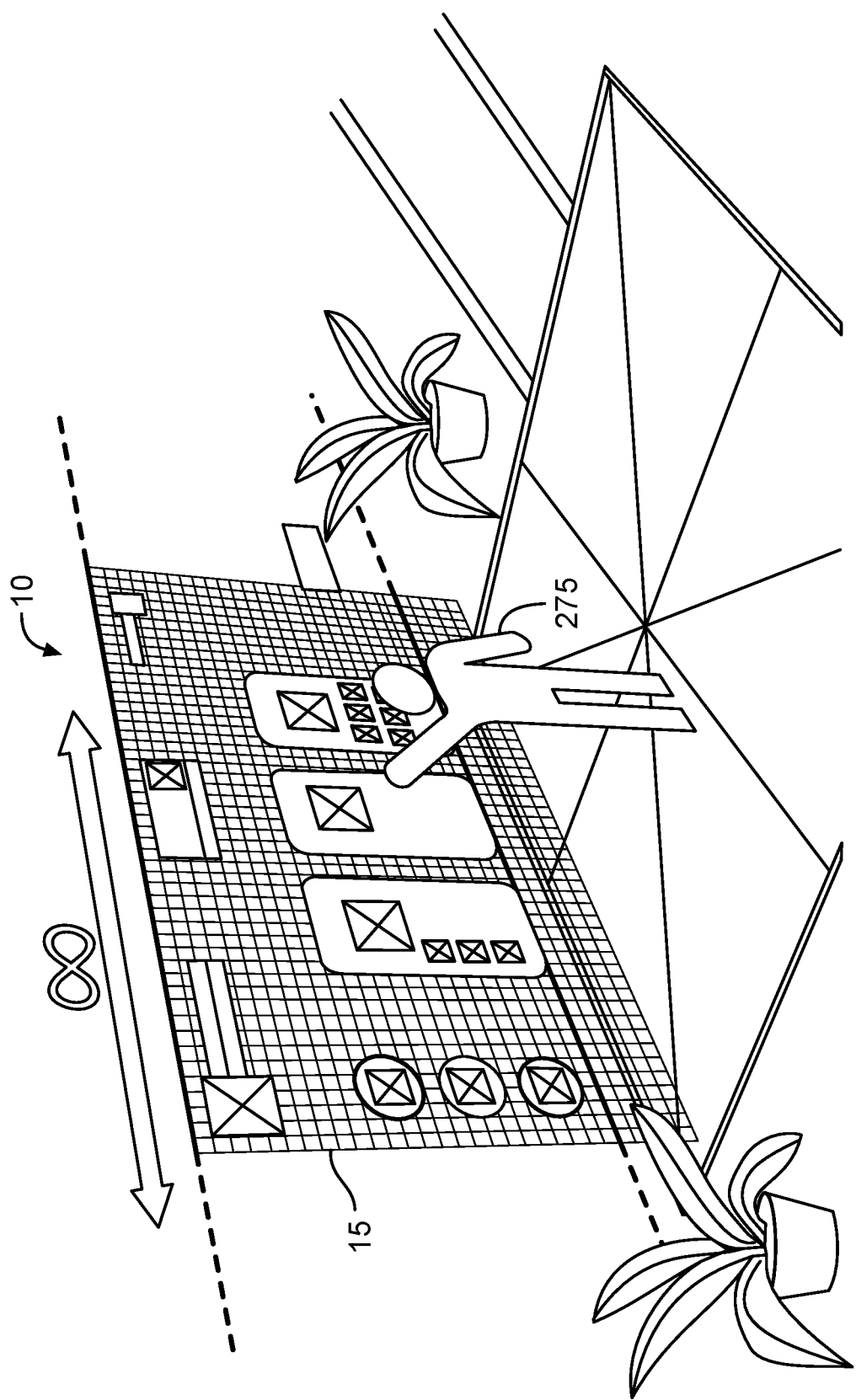
FIG. 27 is a schematic diagram illustrating a user seeing a first-person realistic view of self together with an information board in a virtual reality environment in an embodiment of the invention.

Referring to FIG. 27, a user's avatar 275 is experienced by the user as if it is their own body, in real-life, in real-time. That is, they can see the parts of their avatar's body that they would normally see in real life (i.e., they can see their lower body, and can put their hands in front of their face, but they can't see their face or their neck, or their whole body, meaning there is no out-of-body experience). There are also situations where a user might watch a previously recorded VR experience again, in which case they will observe the recorded session as if they were a third person in the room, watching their previous avatar as if it were an out-of-body experience.

Multiuser VR lends itself to many interactive opportunities between users, which are much more personable and "real" feeling than video calls. For example, because each user has a physical representation in an avatar, these avatars can interact with each other like two people would. A programmed VR application of the invention can implement this in a tutoring specific sense:

i. Tutors and students can high-five in VR, using hand tracking, so that when their hands come together in space there is a sense of haptic feedback, to make the experience like a high-five in real life. This virtual enactment of a physical connection relies on the intersection of the virtual avatar interactions on the X-Y-Z planes. This is tracked in real time for both users to ensure realistic-feeling interactions for both users. The acceleration and velocities of both users' movements is also tracked and communicated in the gesture—i.e. a high velocity high-five will result in a louder clap, and more generated haptic feedback (e.g. stars flying off the users hands), when compared to a lower velocity clap which would generate a quieter audio and visual response.

Some, but not all, of the ways this feedback can be received are as follows:

The sound of a high-five "clap" when the hands come together

Both users see an outline light up around their hands, or their whole hands light up briefly Both users see sparks fly off their hands around the high-five The hands "lock together" when they are high-fiving, just for a second, to give stability around the gesture and prevent the hands from floating through each other Both users' hands enlarge momentarily as they clap together ii. Another gesture that will cause a similar experience with hand tracking is a handshake, with the key here being that when the two users lock hands in a handshake, their hands don't float through each other, but instead each user's hand is experienced like a solid object in VR. This means that when two users bring their hands together in VR, the same feedback as above for the high-five can occur, and the hands will remain locked together until one user draws their hand away, which will also be recognized by hand tracking.

Other Users Become Transparent to Avoid Obstructed Views

Even in the physical world, an instructor sends 10 kids up to a board, they can't all stand where they want to stand in front of the board because they take up too much physical space and block views; which is why teachers have one student at a time come up at a time. But also even if a teacher puts five students shoulder-to-shoulder in front of a whiteboard, even then, if a teacher is in the classroom, looking at the students, the teacher sees the back of the heads of the students; the teacher does not see the eyes of where the student is actually looking; so they can't tell if the student is looking off to the side, or looking confused, or copying their friends work. In VR, A programmed VR application of the invention can know exactly where each user is looking based off of the head tracking that is built into each headset, so if one user 1 is at the whiteboard, in front of user 2, then user 1 becomes transparent from the perspective of user 2, so that user 2 can see the board behind (or through) user 1. This transparent representation of user 1 might display in VR as a little border of their avatar body so that user 2 can still see where user 1 is (or where their avatar is) in space, but user 1 is mostly transparent so that user 2 can see the board completely unobstructed through the body of user 1. Then, when user 2 turns their head farther, such that user 1 is longer blocking their view, then user 1's body, (or their avatar) automatically comes back. So only when one user is obstructing the other user's view of the board, do they actually get transparent, and this is triggered automatically. Alternatively, users may also choose to turn this option off in settings.

Figure 28:
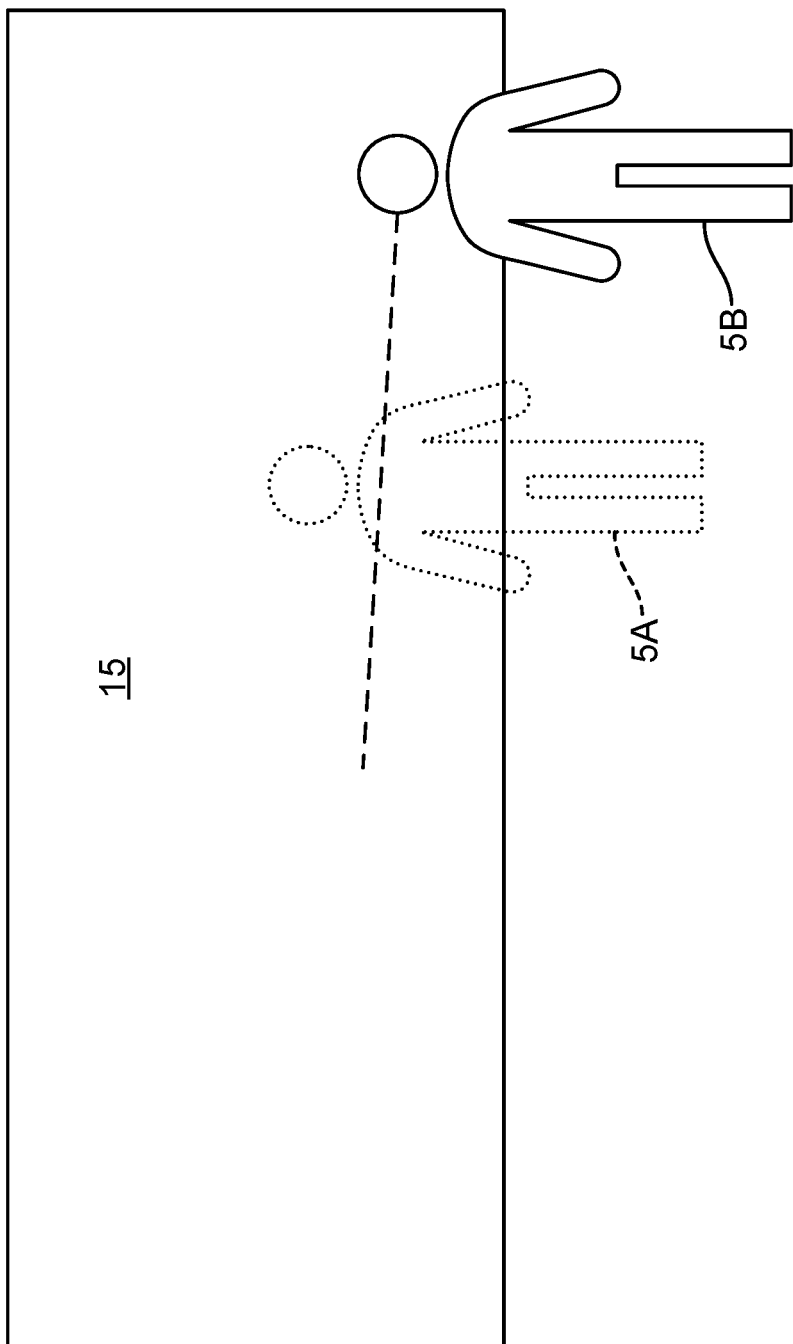
FIG. 28 is a schematic diagram illustrating a user otherwise blocking another user's view of an information board in a virtual reality environment being displayed as transparent in an embodiment of the invention.

The default here is that an outline remains of a transparent user A (5A), as this allows user B (5B) to still see where the users are pointing when they are pointing in front of the board segment 15 as shown in FIG. 28.

Win embodiments, a programmed VR application of the invention is able to determine the coordinates of everything in the VR space (X-Y-Z coordinates), from all users' perspectives at all times. This coordinate information of where each user appears to be, in conjunction with the coordinate information of the orientation of the board in space, means that the VR application of the invention can determine when a user is blocking the board. This feature can also be applied when users are blocking content in the open space in VR too. For example, if User 2 is drawing in 3D in space (not necessarily on information board), and User 1 walks between User 2 and his or her drawing (not necessarily on information board), then User 1 would automatically become transparent too.

Web-User Avatar Controls Via Mouse, Keys and Webcam

Another way that users can access a VR application of the invention is via a web browser or desktop application and not a head-set device. This means that they can appear to other users as an avatar as if they were also in VR, but they are actually accessing the application through their web browser or a desktop application, instead of VR. The user accessing through the web browser or desktop application would still see the board and all the other users in the room. The user accessing the application from their web browser is able to use their mouse or their keys on their desktop or laptop computer, or even use their webcam on the user's computer, to control the user's avatar in VR, so that the user's avatar movement mimics the movement that the user is generating from the user's mouse or keypad or actual face. For example using directional keys to make an avatar walk through the virtual room, or using my mouse to turn the direction that my avatar is facing.

If a user is using a webcam on a computer, instead of showing a video of the user brought into the VR world, other users are seeing that webcam user's face translated into an emoji or an avatar, which will be moved by that user's facial expression as seen in the webcam. This is known technology and can be utilized it in the context of tutoring in a VR environment of the present invention.

So whether the user logs in through a virtual reality headset, or whether the user logs in through a website, either way, a user can have an avatar that exists for the user and for the other users of the virtual reality environment in the same VR room, and the user treated equally whether entering from a VR headset or web browser or desktop application.

Tutor Controls

There are benefits to the tutor having control over some settings in a multi-user scenario. Whoever is the host (or tutor) of the room, is able to hide tools on the palette of the other person; to disable tools of the other person that they wont need for that session. For example, if a math tutorial is in process, then the chemistry tools can be hidden as they won't be needed.

There are several ways which the tutor control setting can be allocated inside the application, which can be toggled on/off inside the user palette.

First to room: Whoever gets to room first is set by default to be the room "host". This is typically the tutor, however the host rights can be handed to another user if necessary. If a student has created their own room, then they will be the default host of the room. This is helpful because they will have admin control of the room when they are studying without the tutor. However, when they invite their tutor to the room, the tutor automatically is given admin control of the room for the duration of their time in the room. When the tutor leaves, the admin control automatically is reassigned to the student.

Based on hierarchy: the users have their positions allocated (tutor or student) prior to a session. Therefore the tutor is given admin/host rights, regardless of who enters into the room first.

Switchable mid-session: The host authority is able to be handed to a different user mid-session. This would be helpful if the tutor needed to give the student authority to make changes for some reason, or if someone outside of the usual tutor-student relationship was added to the room who needed to have admin control settings.

Temporary control: The tutor (or existing host) is able to hand over temporary control to another user in the admin panel of the user palette. This changes the host control to another user for a pre-set period of time, before defaulting back to the original host. It can also be overridden by the original host at any time, who can take back control of the room if they desire.

Multiple hosts: Multiple hosts can be established by the tutor or original room host, which would be helpful if the student wanted to remain host of the room that they have created to study in over time, but they wanted to give dual control to the tutor for the duration of their tutoring session together.

Information/Content Management in VR Ecosystem

Multiple Ways to Input Files & Data into the VR Application

There are many ways that users can bring data and files into the VR application in an embodiment of the invention. These files may be from all different types of image or document file types, and they can be brought in by any user to be used alone in their VR whiteboard room, or they can be collaborated on with other users. That is, any file that I upload onto the virtual reality whiteboard in a multiuser room will also be visible and available to any other user in that room. The files can be drawn on top of and saved or exported again to be used in the real-world, or they can be saved in the VR application in an embodiment of the invention for users to come back to at a later date. There are many ways that users can bring files into the room, including but not limited to textbook import from OpenStax integration, Tutoring company Videos, text in from the user's cell phone, upload from external websites, Google Drive and Dropbox integrations, or accessing the user's local drive through hardware. In addition to these approaches is a novel idea as explained below:

File Import Via Oculus Cameras

Use Oculus cameras to take photos of what the user is working on to add it to the user's virtual room. Background information: The Oculus is the company that makes VR hardware. The Quest is one of the devices they have right now, the Rift is another one. Oculus Quest has a feature called Pass Through where the user can tap the user's headset twice with the user's finger, or the user can click a button inside of the virtual reality game that the user is playing and it will pause the game the user is in and activate the external device cameras, so that the user can see what's around the user. This feature is often set to activate automatically when a user gets too close to the edge of their designated playing area, to prevent injuries and tripping hazards. Many different VR devices have external cameras on the front, and they are becoming increasingly common. These external cameras are also now used for hand tracking, so that users can use their hands instead of having to hold controllers, due to the external cameras tracking the motion of the user's hands and translating this into VR.

Our application uses the front facing cameras to enable users to take a photo of the material they are wanting to bring into the virtual room, and upload it directly into the room or into their user palette in-app, or straight onto the virtual whiteboard. Each of those are different iterations and are a setting which can be selected by the user. The following is an example of how this would be used: a student (User B, let's say) based in LA is accessing the VR tutoring room from their home through the Oculus Quest 2. They are meeting with their tutor, User A, who is based in Florida. User A says to User B, "Hey, what have the user been working on?" And she says, "Well, I've got some homework." And he or she says, "Okay, well let me see it." She says, "Okay." User B can then press a button with her finger or the controller, or with a gesture if she's using hand tracking, which chooses the option from her tool menu. This option is "Take a photo" for file import, and this option is shown to User B in virtual reality, through the UI tool menu. What happens next is that the VR headset's external facing cameras turn on and User B sees what's in her surroundings using the cameras with the headset, while the headset is still over her eyes. This shows User B a view of the world around her, so she can see her bedroom, and her desk, or wherever she is, and the device shows the room with a "frame" or a "box" to guide and demonstrate to User B the dimensions or the area of the photo of the file she is about to bring in. This is just like the guide box the user get when posting banking cheques, how the guidelines show the user whether or not the cheque is in frame. User B is able to see her homework on her desk, through the external cameras, line it up within the augmented reality frame. She can move her head up and down and side to side to make sure that the homework is correctly in the frame. User B can then take a photo using a controller button or hand gesture, or in another embodiment this could take automatically when focused on an image or a file for two sections; the headset then captures this content. As soon as the photo has been taken, it is shown to User B, with a dialogue box asking, "Is this a good photo?" User B selects, "Yes." which then saves the photo to User B's device, such that it can be brought into VR through her virtual tool kit, in-app in VR. A programmed VR application of the invention is using augmented reality here in this way, by showing a virtual frame on top of the physical world as seen through the external cameras on the device. (Note: Virtual reality meaning that the user is in a closed ecosystem of just being a different world. Augmented reality means it layers virtual components on top of the user's current reality, the actual real-world). A programmed VR application of the invention is using augmented reality as a feature within our virtual reality app to get educational content or any content using cameras on a device, into virtual reality.

Tutoring Company Videos Generally and Writing on Top of Videos

A unique feature for videos, available both on Tutoring company videos, but also for The usertube and other videos available online, is that the user is able to write on the video as it plays, and the writing is stored as it is overlaid on the videos in real time so that a user can play the video back and their writing will remain overlaid on it at the right moment.

This means that a user can bring in a video from The userTube or Tutoring company or anywhere, into VR, as a two dimensional video. It's in 2D but then the user can draw on top of it, as it is being played on the whiteboard, which is interactive in VR. The user would simply draw on the board as they usually would, in VR, with hand tracking and their virtual tool kit, and the drawing would be overlaid on the video for the next time the video was watched. For example, in one scenario consider that five minutes into the video, the user chose to draw on the video. Well, when the user gets to five minutes into the video, the next time they watch the video, the writing automatically starts being re-drawn on top of the video exactly as the user had done it originally. And then wherever the user moves that video around (i.e. on the whiteboard, as the user can move the video screen to different placement on the whiteboard) the drawing sticks to it. The drawing (as a vector) is just stuck to the frames of the video, for all subsequent watches of the video.

How Tutors can Make Money when not in the VR Application

Background information: The problem with private tutoring as a business model is that income potential for the tutor is intrinsically tied to the time that the tutor can spend in private tutoring sessions. For example, if the user makes $50 an hour, and in one scenario consider the user can work 40 hours a week, then there are 2000 hours in a year which the user can spend tutoring, and the user is charging $50 an hour, so the user makes $100,000 a year. The problem is there's no way to make that increase without working more chargeable hours, because time is finite. So what the user have to do is that the user have to create more time. The way to create more time is to have more students, but not necessarily groups, which reduces the effectiveness and personal feel of a lesson, and also reduces the charge out rate the user are able to charge.

There are several different ways that tutors can use our virtual reality app to make more income by leveraging their time. Some of these examples are listed below:

Pre-Set Classrooms/Stations

Tutors can leverage the time by creating preset classrooms, which they can create prior to going into a tutoring session with the student, or provide them to a student asynchronously, and not actually attend the session at all. Using our application, tutors are able to create these pre-set classrooms or stations in the VR app, either through the web browser access or in virtual reality, whichever they prefer. They can set up the room or the board with the content for a full lesson for the student. So if the tutor is teaching chemistry, for example, they start with the textbook chapter for that day's lesson, and they write up a summary of the key pieces of the theory. Then they put in some interactive flashcards for the student to revise the theory. They walk through a worked example of a practice question, where the student can hit play and watch the tutor actually work through this example in virtual reality, as if in real time. On the next board section, there is an empty worked example, which has gaps for the student to fill in answers as they go. And this also includes some kind of artificial intelligence or even just a simple preset way for the board to let the student know immediately that they have got the answer to question right, particularly for simple answers, like numerical answers in math, or an economics questions where the user are just sliding equilibrium points around on a graph. The board automatically tells the student if they'd got this correct. Essentially the tutors set up these preset rooms and make them available to students to access without them through an asynchronous method. The tutor provides these lessons in a reference library of different lessons. So a student goes through and selects from a list that they wanted to study "chapter five chemistry" and go through and do an hour long preset lesson where the tutor isn't required; fully asynchronously.

There are different ways that the student gets assistance from the tutor in embodiments of the invention:

i. One is that the student is able to get asynchronous assistance. The student can leave notes for the tutor and a particular color on the board so that the tutor could come back later, answer the questions and leave feedback for the student again, to come back to.

ii. The second option requires the tutor being available, or "on-call" to be able to assist the students when they need it. The student, in virtual reality, could raise their hand and if the tutor is available, the tutor will get a notification that the student has a question that they can then answer for that student. The tutor can then quickly see where the student is up to in the lesson by viewing the room recording through webview, or in VR, depending on whether they are on their computer or wearing their headset when the student raises their hand, and can then answer the student's question as an avatar in-app. This means that the student gets the experience that the tutor is working independently with them, but in reality, the tutor is supervising multiple students at once.

iii. In addition to that, another option is that once a student has asked a question, the next student who goes through that same asynchronous class also has access to the question and the tutor's response as recorded by the tutor. That is, if one student has already been through the room and asked a question, then the next student who goes through the pre-set class will see an icon on the point in the board where the question was asked, and they can choose to watch the question & the tutor working through that question with the student if they want to, or they can skip it and carry on if they don't have that same question. So as they are going through the board and they recognize they have the same question, they can watch the question being answered by the tutor, which prevents the tutor from having to record that same response to the same question again.

This means that any tutor is able to create a library of 10 or 20 or 100 preset rooms that they've set up that are available for students to purchase and to go and work through asynchronously in virtual reality. And the tutor can essentially be earning income off all 100 preset rooms where there may be an infinite number of students in each of these at any time. These rooms can also be used for synchronous tutoring, by the tutor simply meeting the student in the room.

By collecting feedback from users a programmed VR application of the invention then can use this feedback in combination with AI to generate value-add, such as providing users with popular or trending lessons or frequently asked questions (within the lesson), or even the matching of a teacher's classroom to a user's learning style/pace/ability. For example, a teacher may have different versions of the same course that apply to different students (e.g. one lesson may be more hands on/3D interactive for some students vs a more lecture-based approach for other students). Tailoring a teaching or tutoring style can continue to evolve and improve over time as the VR application obtains more feedback from users and the AI improves over time.

Students Able to Review and Record Certain Parts of a VR Lesson:

Students might want to review and record just particular parts of lessons, either the asynchronous lessons or actual real time lessons with a tutor. Within the virtual reality application programmed in embodiments in the invention, potentially on the user's tool palette or through the user settings, a user is able to hit record and take a video recording of exactly what is happening in the room and on the board at that time. There are several ways that hitting record works:

If one is immersed in a lesson and after 10 seconds the student believes the current segment to be valuable, there is a one-click option to record the past 10 or 30 seconds (or 2, 5 or 10 minutes or other preferable time increment) which prevents the users from having to scroll back to the starting point of that section and then indicate the ending point to save.

There is an intelligent breakdown of the lesson that can automatically segment aspects where it is a one click save—the student can hit "record" at any time, and the system will automatically save that entire "segment" of the lesson plan.

Each board segment can be captured as a recording, as a tutor is likely to use each board segment as a section of the lesson, so the user could use their user palette to set the recording from a particular board segment which they can see the preview of on their boards.

Natural language processing may be used if the user knows what topic they want to record the segment of, A user can use natural language processing to say "record from the first time "hydrogen" is mentioned" and the recording function is triggered when an instructor says "hydrogen."

Another option is if a user wants a complete clip, is that the user can hit rewind and go back in time to the exact point where the user wants to begin the recording. It will be appreciated that the virtual information sharing environment is being recorded in such instances so that the user can control a rewind function to initiate a recording at a prior moment in time.

Figure 29:
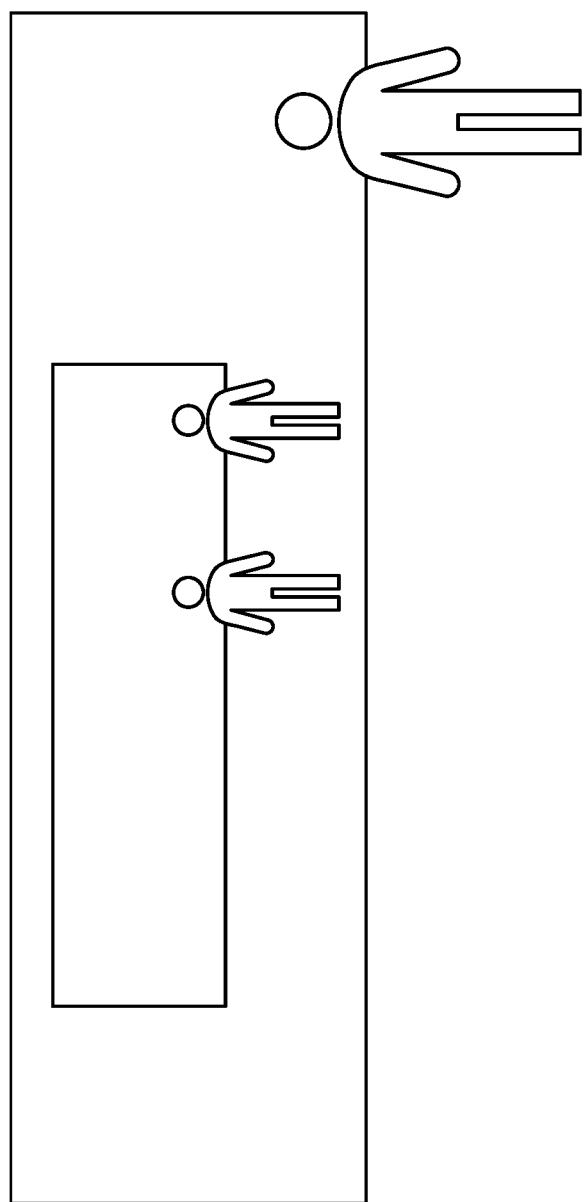
FIG. 29 is a schematic diagram illustrating a user watching a two-dimensional video replay of that user's interaction or collaboration with an information board in a virtual reality environment from a third parson and two-dimensional perspective in an embodiment of the invention.
Figure 30:
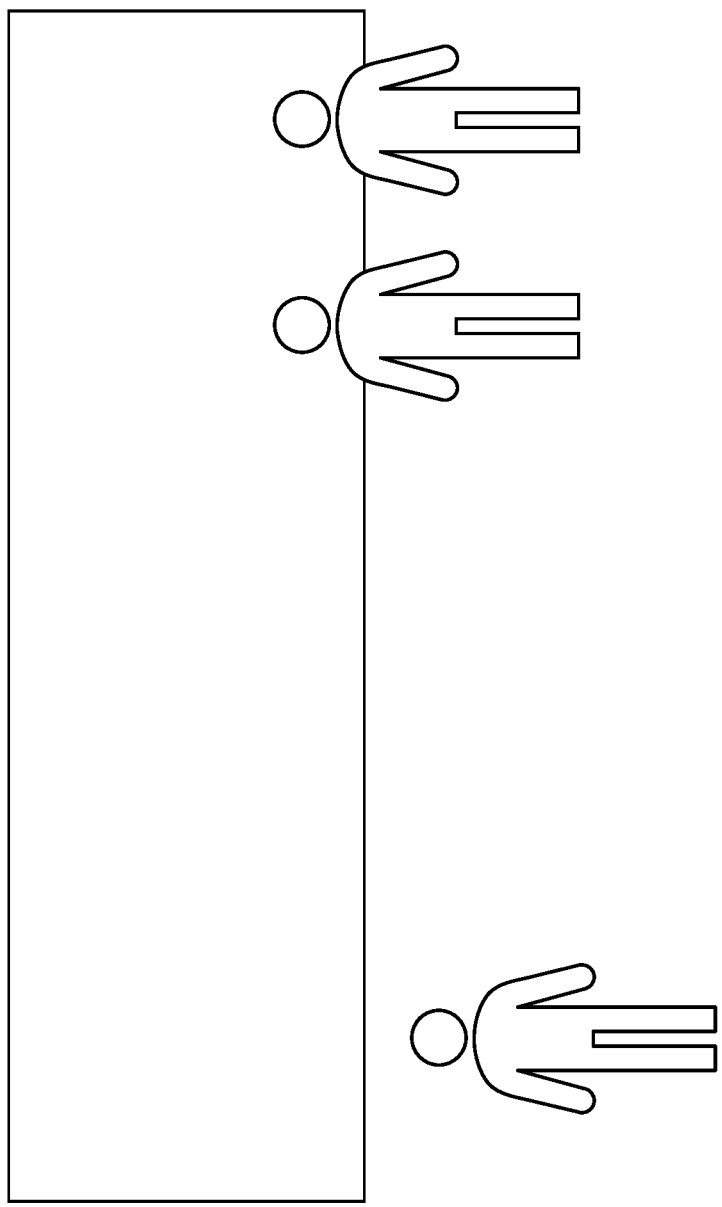
FIG. 30 is a schematic diagram illustrating a user watching an immersive and three-dimensional replay of that user's interaction or collaboration with an information board in a virtual reality environment from a third parson and three-dimensional perspective in an embodiment of the invention.

In embodiments, a user's recording is stored on the board as a bookmark or a quick clip that the student can then go back and hit play and relive that section of the lesson or that section of the board when they're reviewing it in their own time later on. There are at least two embodiments for how this functionality is implemented:

i. Referring to FIG. 29, the student sees the recording like a video recording that sits on the board. It would be 2D video like conventional video clips and be focused on the tutor and the board.

ii. With reference to FIG. 30, a student can alternatively choose to "step through" into the video and relive it. This would bring that recording in 3D into virtual reality around them and relive it as an onlooking additional user in the room, in addition to their tutor's avatar and also their own avatar from the time of the recording.

Another optional feature is forcing the pause button in the VR environment application in an embodiment of the invention. A tutor can choose to set-up a particular pre-recorded lesson. The pause feature is enabled at a certain point in a pre-set room, and automatically pauses the lesson at particular point in the lesson and then the user has to actively unpause to continue watching. Another option, is that instead of forcing the pause to turn on, the system instead prompts a user asking if the user would like to pause? This enables the user to take a micro-break to ensure that they have learnt the applicable content, and can also be accompanied by a mini-quiz question that the tutor can choose to set.

User Controls

In embodiments of the invention, when reviewing recorded content, students have the ability to control the speed that things are moving—both the things they see on the board and also the tutoring/teaching speed. Users also have the ability to pause/freeze/stop the instruction. In addition, users can also choose to make the avatars disappear so they have an unobstructed view of the board, or they could keep the avatar's head but make the hands disappear so they don't block the board content.

Some other customizations for recorded lessons are listed below:

Users are able to 'save' notes in a file to print, or if 'teaching' on a virtual board, then save those boards as well.

Users are able to save the video for future review, either in VR or in a web-browser.

Ability to pick up where users left off or reference items/topics gone over in previous sessions in a later session.

Ability to have a reference function built in so if for some reason the student needs to look something up, they can do that in the VR setting.

Ability to write formulas/text/math in space as an object and have objects be able to be manipulated in the space around the user. For example, a user may move the drawing of a normal vector on a surface the user has drawn.

Tutor can mark certain things that change for others/students and mark other things that do not change.

Time Warp and Multi-User Permissions

In certain embodiments:

i. A VR server is always recording a VR session/conference between multiple users, but the users may not be aware.

ii. During the session, if User A says, "darn, I wish I had been recording this!" He or she just clicks the 'record' button and the video server prompts with "do the user want to record going forward or do the user also want some recording from before right this second?" If he or she picks the latter, it asks him to drag a slider on a timeline bar, back to where he or she wants the video to start.

iii. At this point, up pops up a message to all the people in the VR conference. It says, "here is a video user and a slider, go skim through the recording selected by User A; does User A have the user's permission to save what happened in the past?'.

iv. If everyone clicks 'yes', then the recording from the past is saved in the cloud for User A or to User A's hard drive.

v. If anyone says 'no', then either (1) the recording is not saved at all or (2) the recording is saved, But the avatar and voice of the person who said 'no' is not saved. So the user have a recording of a group of people but the user just don't hear the one person or see them.

vi. Note that if someone has left already, the user must get their permission to show their audio/avatar video stream. So, an e-mail is sent to their e-mail address on file (or their VR account) to ask permission, and everything is on hold as far as saving that recording of that one person until that one person clicks 'yes' in their e-mail. The recording is available to everyone, But the person who left early just isn't shown in the video (or audio).

vii. That is, if that one person who left earlier doesn't click yes or hasn't clicked yes on the permission e-mail, a recording is still saved. The recording simply doesn't show the audio or avatar video of the person who hasn't approved the video.

viii. If and when the person does approve it, the recording is changed to be a nice full recording (that is, unhide the audio and video of the person that hadn't granted permission previously . . . but now has).

ix. Again, if someone leaves early, their audio/avatar video will be hidden. But realize that that person left early, so there is ALSO some recent time where that person wasn't on the VR conference. And therefore, the user does get some full recording (with everyone). For example, in one scenario consider it's 20 minutes into the meeting, and person Z left at the 15 minute mark. Right now (20 minute mark) the user decides the user should have recorded some of the meeting . . . the user wants to record from the 10 minute mark until now (the 20 min mark). If the person Z (who left at the 15 min mark) has not yet said 'permission granted', then the user have a missing-one-person-recording for minute marker 10 to minute market 15, and then from minute marker 15 to minute marker 20 the user have a 'full recording' (since person Z had already left at the 15 minute mark).

3. Email/Notification Screen with Audio & Hand Tracking

The board displays all the user's emails or notifications as a grid of tiles in front of the user (on the board, or curving around the user in a semicircle), with an image of the sender as the title, and their name and the subject line of the email overlaid over the tile. How this works is outlined below:

- Each tile also has a number on it, left to right for example 1-12 so the user can use audio to SAY the number and that will bring up the email of that number in front of the user, bigger than the others.
- The user can then say close, or delete, or reply, or reply all, and control the email with the user's voice. The user could even say "reply: Hi User A, thank the user for the user's message, I will follow up, Cheers, Portia" and then say "Send" and it will send.
- Over time a programmed VR application of the invention can apply AI to make important emails show as bigger emails, or the user can arrange the tiles into columns for importance (i.e. most important notifications on the left, and then less important moving right)
- The user may also use hand tracking to point and select or click.
- The user may use the user's hands to swipe through notifications; swipe left to delete, swipe right to reply
- News ticker: people messaging the user while the user is working show up at the bottom. Or news events or the weather.
- For tutors, when they get a new booking or a TMS notification, they can see it here while in VR.

Interfaces for email services may be done in several different ways:

- One option is that the user can sign in through a web-connected VR headset, straight into the user's mail integration
- Device has an email client installed on the device which synchronizes between the headset and the desktop
- Pop3 which pops the user's VR device to the user's laptop
- If the user's email client is installed on the user's headset, the user use IMAP server to sync in real time all the time
- The user's computer serves the information through the user's headset, so the user's headset becomes an external monitor, mouse and external keyboard Syncing Data in Low Bandwidth Situations During 1:1 tutoring, the only thing that gets streamed is the location of the new writing on the whiteboard. The tutee's local app on their headset already has all the marker graphics and everything else, so the only new content is when a programmed VR application of the invention will have to send the coordinates of the marker/pen and 1 or 0 to represent whether the pen is writing or not. The local device stores all of the coordinate information that comes in, so it is adding to the whiteboard at all times. All of the data is stored in the flash memory on the device—can be loaded via SD card, USB, or downloaded from the internet.

Pre-Loading Boards to Reduce Buffering:

As users navigate through the boards together, or when a user navigates alone, then the boards around them are preloaded.

E.G. If user one is on board 10 and user two is on board 50, then a programmed VR application of the invention would pre-load boards 9,10,11 and also boards 49,50,51 for both users. A programmed VR application of the invention can pre-load these boards for both users because even though the users are in one place, they are likely to teleport between each other's points too.

The next priority for preloading boards to reduce buffering would be the additional board segments between the two users, as they are likely to continue navigating together in this way.

Real-Time Closed Captions

A programmed VR application of the invention could have real-time closed captions happening, so while the teacher is speaking, the captions are below them. This is possible via Google Pixel Bugs, Microsoft Azure Speech Translation, AWS Elastic Transcoder, etc. All are available via plug-and-play API, and offer AI-based learning.

- it may be for ALL students to see, or a programmed VR application of the invention can let each student turn off and on the captions.
- the captions may be in different languages for each kid.
- the teacher would not want to see their own captions. That is, whoever is speaking, the captions are not showing to that person but are showing to everyone else that has captions turned on.
- so the person may have 'show me captions' toggled ON, but the system is smart and knows that even if the user have that on, the user do not want to see the user's own captions.
- the captions may show up right under the avatar of who is talking, or may show up under the board, so when the user are looking at the board, the user see the captions under the board as the user hear them, or, may be at bottom of the user's screen, so as the user look at the teacher or move around to look at the board, the captions stay at the bottom of the user's view, no matter where all the user decide to look around In terms of how this process would occur, the following takes place:

The audio is captured by the microphone in the user's device in real time, as they are speaking This audio is immediately transcribed using a natural language processing engine that already exists This transcription is transferred over the internet to the other uses headset, in text format This text is displayed in the other user's visual field in their headset Real-time sign-language translation Through natural language processing integrations, a programmed VR application of the invention is able to generate real time sign language translations which would be delivered via an avatar that is next to the user in VR. For example, in a pre-recorded module, a user could turn on real-time sign language in their user palette which would make the avatar delivering the pre-recorded content begin also translating the audio into sign language.

In real-time interactions, immediate language processing may also be used to generate avatar sign language as two people interact with each other in VR in real time. If someone was hearing impaired, they could use hand tracking on their device to sign to the other user, who could respond in audio which would be translated into sign language in real time.

Handwriting Recognition

Executing in the VR application is handwriting recognition, where two things occur:

The user's handwriting on the board is corrected into text as they write. So that if the user writes with messy writing, this is smoothed into nice, readable text for the user's students or the other people in the room with the user. This may be a setting turned off or on in the user palette, or it may be a special pen in the VR app which automatically turns handwriting into text as the user write.

All writing is transformed to text with handwriting recognition, and is all held in the server, whether the user has this setting turned on or not. That is, even if the user has their regular handwriting on the board, a programmed VR application of the invention is running handwriting recognition in the background ONLY, for search capabilities. This means the user may search "physics" in their user palette, and every time they have written "physics", even if they just wrote it with their own handwriting, the board will be able to highlight these areas for them.

That is, a programmed VR application of the invention is decoupling the functionality of the handwriting recognition for search capabilities with actually fixing the handwriting for someone on the board. The search functionality always occurs in the background, but the user has the option to turn off or on the fixing on the board, the user facing side of this feature.

From the users' perspective, they can select if they want handwriting recognition on or off, but really, that is not what they are selecting, a programmed VR application of the invention has it ON all the time, no matter what the user tells us. The user thinks they are turning it off but really they are just turning off the functionality of turning their writing into text. A programmed VR application of the invention is still translating and keeping on the recognition, no matter what, so it can be used for the following functions:

i. Tagging sessions by subject/content automatically ii. Letting the user search and find things in their own room Input/Sensors/User Tracking & Monitoring Multiuser Feedback from Users Background information: Quite unique to tutoring, when compared to other multiuser VR games or applications, is that it is very important for the tutor to understand how the student is getting on during the lesson; how much they are understanding, if they are confused or bored or distracted or stressed out. This is something that was discussed by many teachers as a key difficulty with moving online for teaching; they couldn't read the body language of the students, or watch their eyes to see what they were looking at. One way to deal with this is that the tutor has to ask the students repeatedly, "Does this make sense?"; but students often won't tell tutors that they are struggling anyway. There are several methods for collecting user feedback in virtual reality that a programmed VR application of the invention captures and make available to tutors while they are tutoring in the VR application in real time, but also for them to see retrospectively to reflect on the lesson and plan for their next lessons.

Head Movements and Eye Tracking for Multiuser Feedback

A programmed VR application of the invention detects head movements through the VR headset that the users are both wearing. Some of the key head movements that will be useful for this feedback are:

The user is nodding their head ever so slightly, showing that they are starting to understand Unless they have some neurological disorder (tremor, etc.), however it is possible to distinguish between them with an AI application.

If a student is often looking back to the left or to the West, which is in the direction of the previous material, then this shows that they are confused or not keeping up.

The tutor cannot be watching for these movements in real time while also tutoring, especially if they have several students at once, so instead a programmed VR application of the invention can aggregate all of this information and a programmed VR application of the invention can let the tutor know that this student has been spending too high of a percentage of their time looking back.

There are several ways that this information can be presented to the tutor:

A virtual reality marker above the student's head, which could be a slowdown sign A traffic light system either beside or above the student's avatar, or even on their t-shirt, which shows a change in the color from green (when they understand), to yellow (when they are starting to look back quite regularly), to red (when they are looking back very frequently, or are completely distracted and looking the other way)

On the tutor's tools palette, or their in-app device, they get a little notification or a feedback tracker across the bottom of the screen, which shows them the status of each of their students and how they're responding.

There will be default thresholds for head movements which correlate to levels of understanding, which the tutor can change depending on how closely they want their students to be following. Some examples of how this threshold may be set are as follows:

Number of glances back to the left per minute: for example, 3-5 glances to the left in 1 minute=yellow, 5 or more glances to the left in a minute=red.

Percentage of time: for example more than 20% of the time not looking at the tutor=yellow, more than 40% of the time not looking at the tutor=red.

A similar feedback system may also be applied for eye tracking, where a programmed VR application of the invention can capture the movement of a user's eyes in their headset, and aggregate this feedback into emotional cues that a programmed VR application of the invention can deliver to the tutor. Some of these cues could be:

The student's eyes are shrinking or squinting ever so slightly, to show that they are focusing intently, or that they may be confused;

Eyes are moving back and forth a little bit, showing that they don't understand

Eyes are drifting away from the board or aren't focused on the tutor or the work, showing they are bored, distracted or disheartened.

This information is presented to tutors in a similar way as described in previously, but it may also be displayed in unique ways to show where student's eyes are resting too. Some examples include:

i. Lasers, or non-distracting lines, such as gray dashed lines or similar, coming from the eyes of the avatar of the student (which a tutor could choose to turn on or off) that show whenever a student starts looking back at old material.

The tutor can follow the line of sight of the student to the board to see what they are looking at.

ii. Another embodiment of this is that the tutor could see where the student is in space: for example if the student teleported back to an earlier board, and the tutor is teaching multiple students at one time, so they can't keep track of where all the students are at once. This lights up a little gray number in the tutors admin panel showing which students are in front of which board segments.

iii. Another embodiment is that the user's line of sight shows on the board like an outlined circle, or a highlighted circle around the content that the student is looking at. So instead of a laser coming out of the eye, the area that they are reading from is slightly brighter on the board so that the tutor can see if further down the board is brighter, that that's where the student is looking. And that can be color coded, so there's a circle around the student and a circle around the board segment. That they are looking up, it's both blue, or red, or purple, and each student would be given a different color, etc.

iv. Adding onto that, there is also a setting that the tutor turns on or off, where if a tutor pointed at a student with two fingers or three fingers or some kind of gesture, it could turn on the ability for the tutor to see where everybody's eyes are looking or just where their head is facing. Particularly beneficial for a tutor who is more advanced, who is likely to want a little gray, very faint, gray ray of light, connecting each avatar to exactly where they're looking on the board segment, or on previous board segments.

v. In Google docs, for example, the user can see where everyone else in the document is based on their color-coded cursor icon; or how the user can see the color-coded outline when people are hovering in a cell in Google sheets. This same system may be used in combination with the head or eye tracking system: The tutor sees a color-coded outline around the boards that each student is standing in front of or reading from, with a pink, a red, blue, different circles for each person, and a little name floating with the circle to show exactly what they're looking at. So the user say, "Okay guys, I put 10 problems on one board segment. I want the user to walk up to the one that looks easiest to the user and start working on it." And the user would have little circles on what exactly they're looking at.

A key in the embodiment is that the students would not see this, but the tutor could turn this on for the tutor to be able to see where all the students are looking.

EEG or fNIR, fMRI, PET, MEG, TMS, CT Scan, Eye-Tracking Sensors for User Engagement and Cognitive Load Feedback (using Neuralink technology):

One of the key ideas in the education field is that of the "Goldilocks Zone" of brain activity (alpha and theta waves) where the student is challenged enough that they are learning effectively, but not so much that they are confused. Students learn most effectively when they are engaged, but not when their brain gets too overloaded; if cognitive load is too high so they won't learn anything, but it also can't be too low because then the user is not engaged. The research is so incomplete and new that at a minimum, the best guess currently is that everybody has a different Goldilocks zone.

In one embodiment, EEF or fNIR sensors are worn with the VR headset to measure brain activity and oxygen levels in the user's brain. This information is then broadcast from the students to the tutor, not between the students, but just to the tutor. A programmed VR application of the invention can very quickly build that feedback loop. The system constantly keeps track of each student's engagement and different brain activities, alpha waves and theta waves being the big ones, and also aggregating this information with eye tracking and head tracking information too. For example, when students are confused, the moment before they look back means they're probably confused, so a programmed VR application of the invention can track this head movement and eye movement and the associated brain waves. This provides real time feedback for the tutor on each student's brain activity and also engagement, and connections between eye/head movement and brain activity could be drawn, to assist the tutor in keeping each student highly engaged and recognizing their confusion or distraction before it kicked in.

Another feature that a programmed VR application of the invention can incorporate is verbal cues from students too, for example when the student says: "Oh, I got it." The functionality implements either through natural language processing or the tutor themselves presses a button or clicks something, to say, "Okay. Mark that time right there because that student got it." Other information that is capture includes the tutor marking times when students seem like they were learning, they were engaged, they seem like they were learning and it led to the "aha" moment because the "aha" moment probably has a whole different brain signature than the learning part that leads up to it. All of this information is later aggregated with the EEg, fNIR, fMRI and eye/head tracking data to draw a clear picture regarding each individual student's learning patterns, preferences & Goldilocks Zone.

Another way that EEG and fNIR data is used, is that sensors are used for automatic VR settings, for example setting the in-app brightness level, a programmed VR application of the invention can auto measure brightness that works for each individual's eyes based on their brain response. If they're feeling pain in the brain and the brain is not happy, then the brightness is too high.

Figure 31:
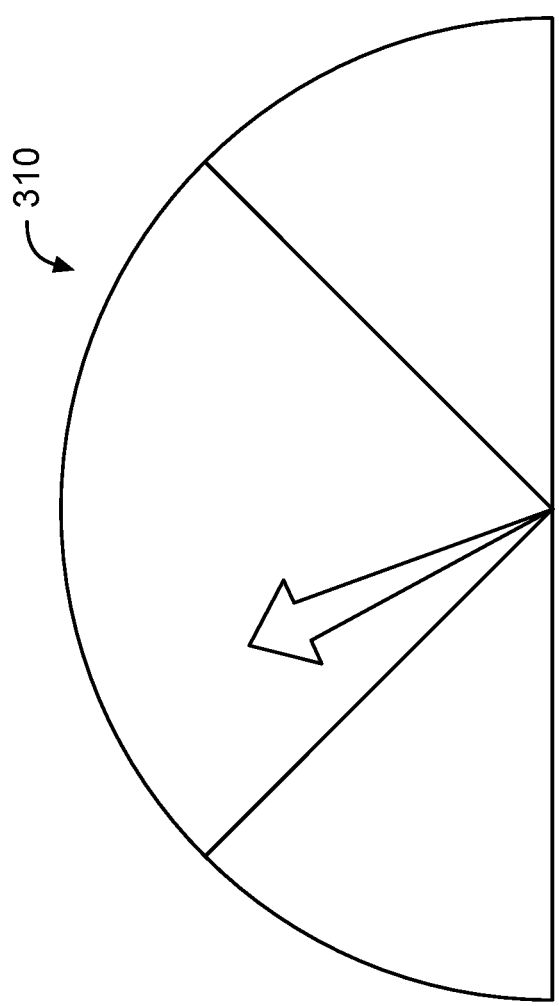
FIG. 31 is a schematic diagram illustrating a display to a user of an information board in a virtual reality environment of a meter showing engagement of other users of the information board in an embodiment of the invention.
Figure 32:
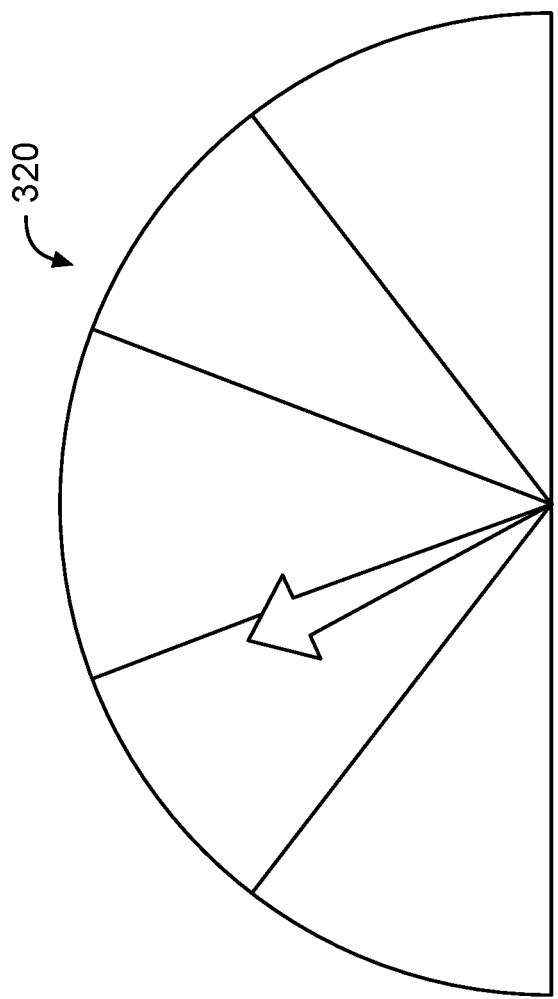
FIG. 32 is a schematic diagram illustrating a display to a user of an information board in a virtual reality environment of a meter showing cognitive load of other users of the information board in an embodiment of the invention.

Engagement measurement display 310 (see FIG. 31) and cognitive load measurement display 320 (see FIG. 32) are the two key metrics that a programmed VR application of the invention can share with tutors. Different inputs will provide information for both; but this will be combined to give a simple, user-friendly output for tutors in their user palette admin panel. A programmed VR application of the invention can present the data such that it can be quickly interpreted so they can improve the tutoring session for the student in real-time. What is new and tutoring specific is that for cognitive load, after a certain "bliss point" going further higher in load becomes worse for learning, compared to engagement, where higher measurements are better for learning. Therefore there are several different ways a programmed VR application of the invention can communicate this information: 1-5 scale of the cognitive load/engagement. −2, −1, 0 (Goldilocks Zone), 1, 2 (too much cognitive load)

A traffic light system for both of these metrics. Cognitive load goes in both directions, as there is a Goldilocks zone, so the barometer will be green in the middle Graphs, numbers, diagrams, traffic light systems to make it easy for the tutor to digest and act as a result of, regardless of the input it comes from.

Figure 33:
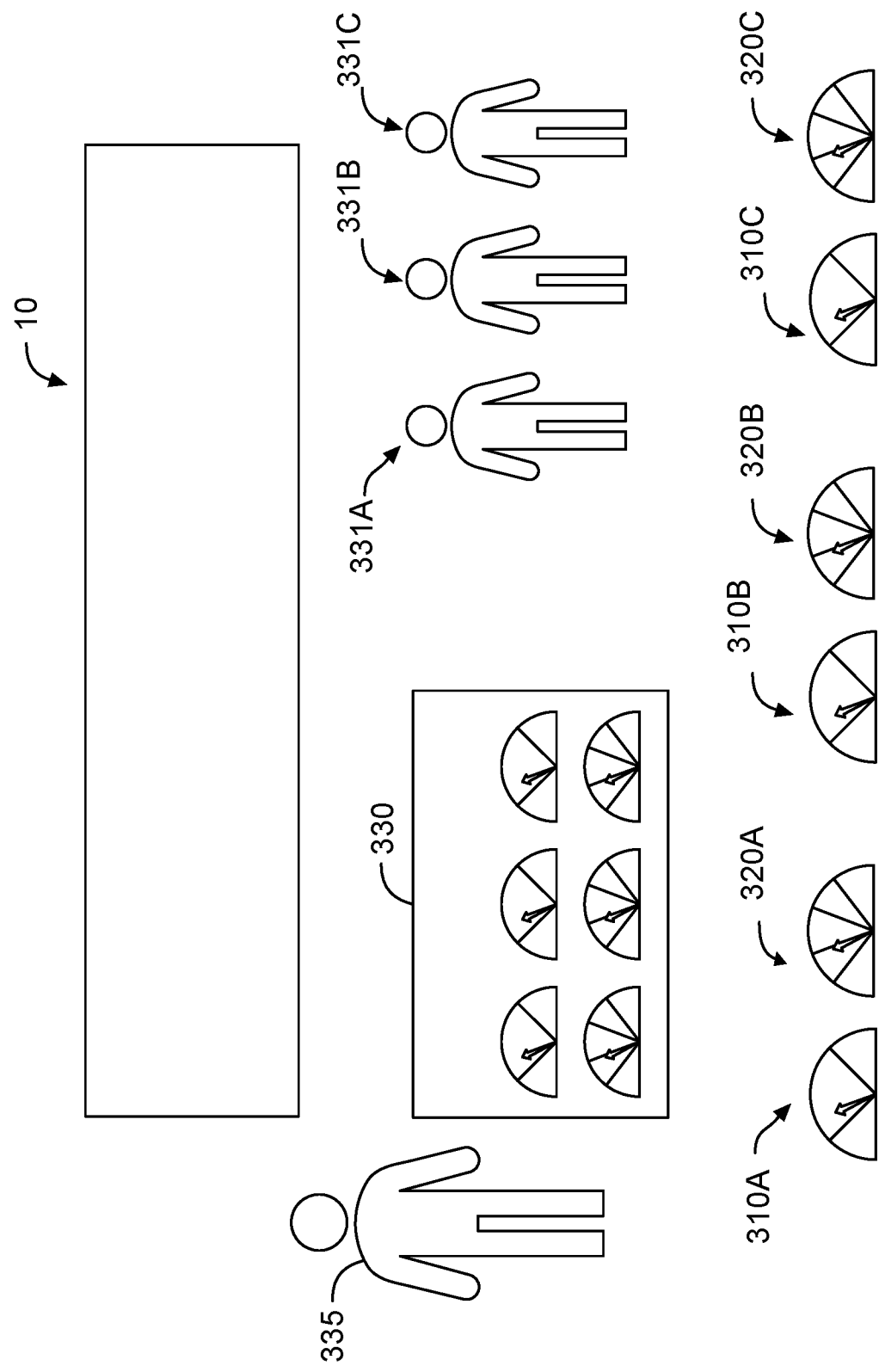
FIG. 33 is a schematic diagram illustrating a display to a user of an information board in a virtual reality environment of a meter showing engagement and cognitive load of different respective users of the information board in an embodiment of the invention.
Figure 34:
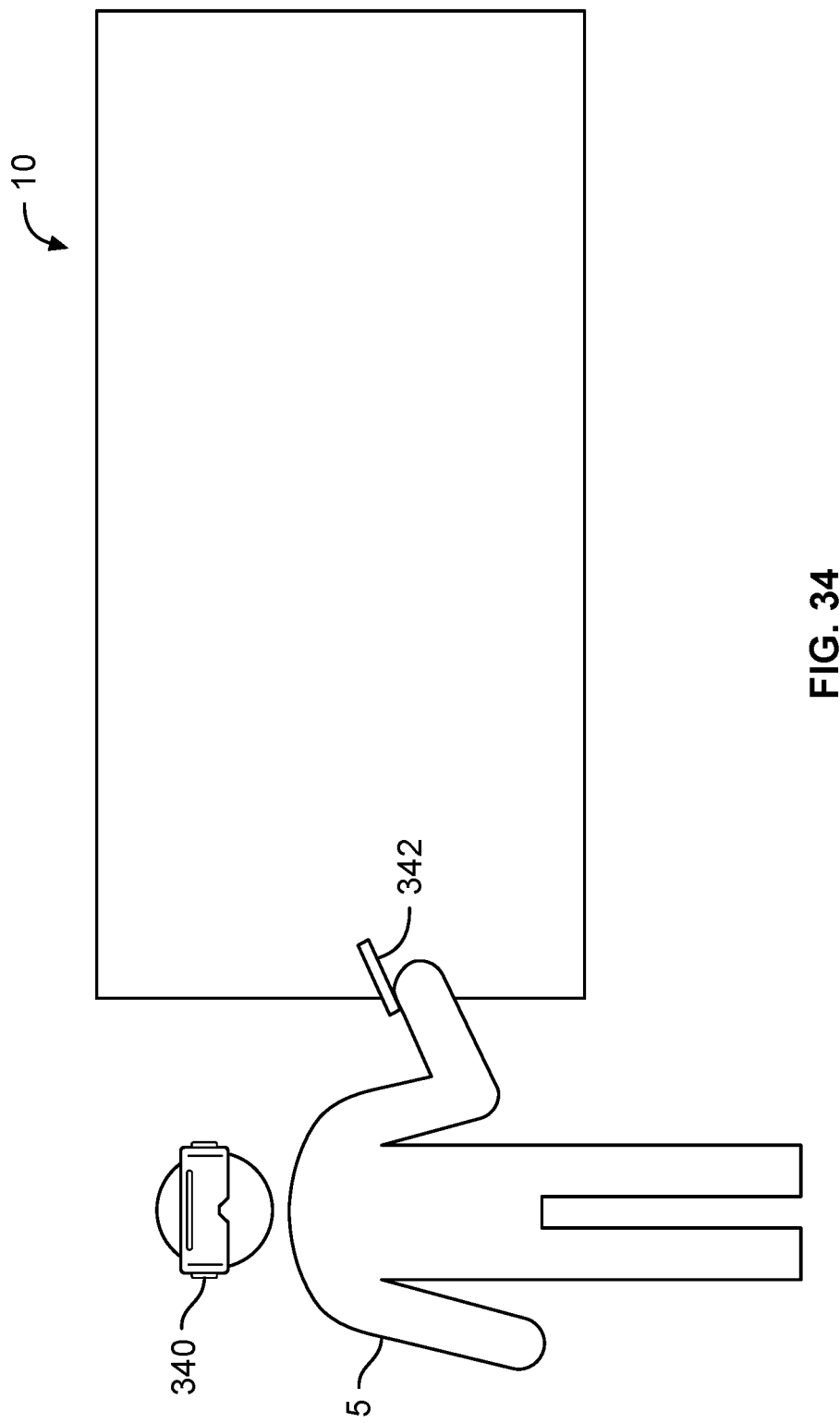
FIG. 34 is a schematic diagram illustrating a user of an information board in a virtual reality environment with a device connecting to a VR headset that provides writing and drawing input to the information board in an embodiment of the invention.

In terms of how this is displayed: Either in the user palette or just at the bottom of the screen at all times, or both (see FIG. 33). As shown in FIG. 33, tutor 335 can view each respective students' (331A, 331B and 333C) measurements with respect to the information board 10 on the tutor palette 330. Measurements for student 331A correspond to engagement measurement display 310A and cognitive load measurement display 320A (shown on tutor palette 330). Measurements for student 331B correspond to engagement measurement display 310B and cognitive load measurement display 320B (shown on tutor palette 330). Measurements for student 331C correspond to engagement measurement display 310C and cognitive load measurement display 320C (shown on tutor palette 330). Tutors can also customize settings as to when they are notified about the status of the engagement data Some of the technologies a programmed VR application of the invention can use to measure brain stimulation, engagement and cognitive load are the following:

Computerized Tomography (CT)
Magnetic Resonance Imaging (MRI)
Transcranial Magnetic Stimulation (TMS)
Electroencephalography (EEG)
Functional Magnetic Resonance Imaging (fMRI)
Positron Emission Tomography (PET)
Magnetoencephalography (MEG)
Pen/Stylus tracking and hardware:

It is known that Bluetooth pens & styluses are used extensively with other tutoring technologies, but these devices are yet to be brought effectively into Virtual Reality information sharing environments. Referring to FIG. 34, there are several different embodiments for a user 5 to use a Bluetooth pen 340 in connection with a VR headset 342 in a VR environment programmed for use with such devices.

Figure 35:
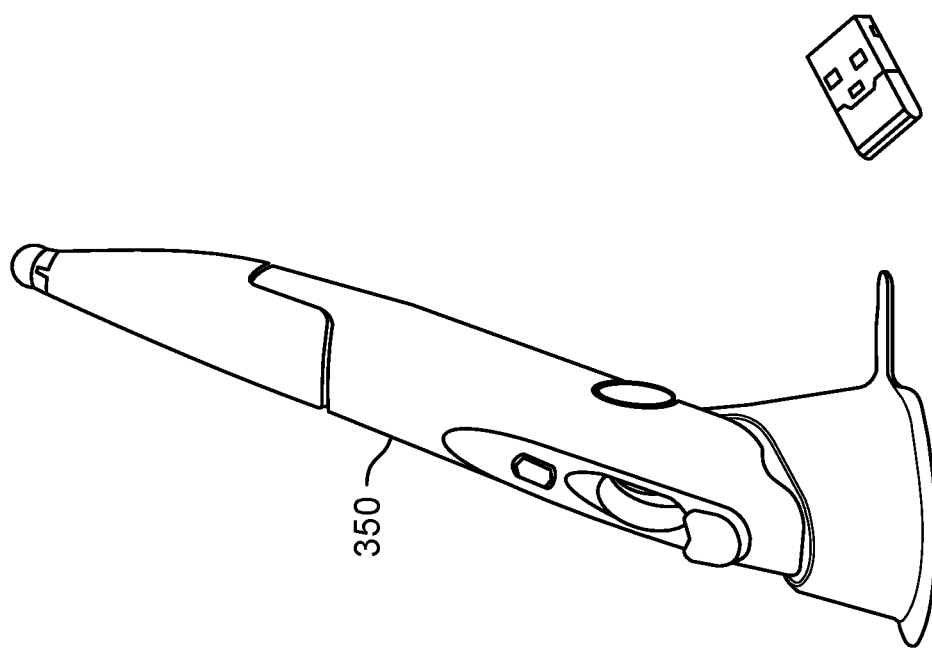
FIG. 35 is a perspective view of a wireless pen mouse device connecting to a VR headset that provides writing and drawing input to the information board in an embodiment of the invention.

VR Compatible Pen Hardware:

Existing Bluetooth pen mouse 350, as shown in FIG. 35, is used for computers but not used in current VR environments.

In one embodiment a Bluetooth pen is designed specifically for functionality in our VR app, but is also compatible with other VR apps. BLE, accelerometers and LIDAR being the currently available hardware, which are integrated relatively easily.

The question is how many external (stationary) sensors are permissible for a room—this will allow for lesser or greater accuracy.

The Bluetooth pen connects to the Oculus Quest headset directly through Bluetooth, and has convenient functionality such as the following:

Clicker on the end of the pen used to choose different tools (pen, laser pointer, eraser, 3D pen); in VR the user can watch the user's pen actually changing to be those other tools, so the user can see what tool the user have at any time as the user click through the options.

Scrolly-roller on the side to zoom in and out, like a magnification tool.

Secondary click button; another button on the side of the pen, to use for things like activating the teleporting function when the user has the pen set to be the laser pointer, or to activate the select tool when the user has the pen set to any other too In this case, the pen click is JUST for functionality (to use specific features of a tool), and instead of changing tools, and instead, to change tools the user ROTATE the end of the pen (like a pen that the user rotates to get the pen tip to come out in different colors, but with more rotations for more tools)

A slider down the side of the pen which is used to change the width of the pen/eraser/whatever tool is being used at that time from bigger to smaller A built-in microphone which can automatically transcribe anything the user say to notes on the board Able to access settings with the pen for different tools (essentially the customization section), so potentially a second rotating section (or potentially rotate the other direction) to change colors. OR a button to open customizations (like the color wheel for the pen) which the user can then just select with the pen in space In addition to all of the above: the functionality is able to be customized in the VR application in an embodiment of the invention so different parts of the pen which can be scrolled or clicked or twisted can be coordinated in the VR application in an embodiment of the invention to change the color of the ink, for example, by clicking on the pen or using a scrollbar to zoom in and out on the board and make the content on the board bigger or smaller, or activating a laser pointer by using a slider on the side of the pen so that all of the functionality that the user could use in the VR application in an embodiment of the invention can also be built into the pen as a sort of very specific controller.

The external cameras on the VR headset are able to 'see' the pen, or the pen could also be connected through Bluetooth or Wi-Fi. And the Quest knows the size of it and shape. There are two transmitters in the pen. Or one in the middle with an orientation signal too. Now, AI and hand tracking in Quest can be used to know where hands are. No need to track the whole pen if there are two transmitters on the edge tips of the pen. So now the device knows it's not missing the hands. In fact it knows where the hands are based on how the pen is being held; so the VR hands are just generated around this pen, so the physical pen is used to aid the accuracy of hand tracking in VR.

Note: The Bluetooth sensors would only track the hand which is holding the Bluetooth pen; which means that the other hand (if not also holding a Bluetooth tracking pen) will be tracked by the external cameras on the VR headset which already exist and are the primary tool for hand tracking at this stage.

Another way that a programmed VR application of the invention can track the pen orientation and movement is with a gyroscope. Based on the slope between sensors and the orientation from the gyroscope, the user knows exactly how the pen is oriented in three-dimensional space. That would help make the drawing really, really accurate on the board. It would also make it more comfortable for the user because they'd be holding a pen, in particular, a pen that's the exact same size as what they're seeing inside of virtual reality. It looks the same so they would not have cognitive dissonance.

Another embodiment is to put a special cap, or a special sleeve on an existing pen. This sleeve or cap would have two sensors to achieve the same outcome as explained above. This means that people literally use the exact pen they're used to using, but bring it into virtual reality.

Now the other benefit here is that, again, the user doesn't have to track the hands, or the pen will correct for errors in hand tracking, which happen quite frequently. The user doesn't have to use the front facing cameras, which requires a particular level of lighting to be able to work correctly. If the user has a Bluetooth or Wi-Fi enabled pen, the user can literally do this in the dark. So if the user is in a dark library for some reason, where there's a library where no one has the lights on, the user could still pull up tutoring VR. Anyway, so the pen is brought into virtual reality and the user use the user's hand. It makes it more comfortable for the user because drawing in virtual reality with nothing in the user's hand in the physical world is very strange. And then when the user picks up a pen or a marker in the physical world, but then in virtual reality, it looks different from what the user is holding and the width is different and the weight is different than the user expects, then the user get a sense of cognitive dissonance.

2B. In-App Pen/Stylus Tracking and Matching the Physical World to the Virtual World for Writing Utensils.

When the user brings a pen into VR, the user may change the look and feel of the pen in VR, because it has got an animation on. This means the user may customize the pen in VR to look exactly the way it looks in the physical world so that they know, "Oh my God, I just brought a pen into virtual reality with me. I brought my own physical pen into virtual reality." Users may customize different settings such as the ink color and ink width, pen width and length, and they may choose whether they were using these settings to make their VR pen more realistic, or just to make something fun and obscure like a 2 foot long pink twirly wizard-staff pen.

Another option is that if a user is using a pen from their house, they may use the cameras on the front of the Oculus and snap a photo of it, and actually generate that pen into VR through the image of the pen.

This includes a process to take a picture, or a set of pictures of an entire structure to make sense of the real (3D object)—E.G. a pen is cylindrical and may have text all the way around the structure, so this is all be captured in the image when its brought into VR.

This is beneficial to reduce cognitive dissonance, because for example, if the users don't have an Expo marker at home, then the VR Expo marker is not going to make a lot of sense if they pick up a pen and the weight of it will feel really good. The user can change the look of the user's pen or marker based on what the user is holding at the user's house in the physical world, either through the cameras or through unique customization in-app through a library of customizations options, which is another embodiment. Another embodiment is that the user may search for the name of the user's pen, and a programmed VR application of the invention can have a library of different popular pen options ready to be selected from. A programmed VR application of the invention can have the name of the pen that the user is looking for pre-saved and then it comes up without having to take a photo and that way a programmed VR application of the invention can match the pen.

Physical Tablet with QR Markers Projected into VR

This idea is that of using a physical tablet instead of a virtual one. This tablet has special QR markers placed on the edges or a special frame with tracked pucks which will help us bring in the physical tablet into VR as a tracked object. The QR markers will allow the external cameras on the VR headset to recognize the tablet.

The tablet will be projected into VR as it is. This means that the user will be able to see a one-one replica of a physical tablet in VR as a virtual tablet. This tablet could be a technical piece of hardware with a user control interface app built into it, or it could be as simple as a legal office pad of paper which has contrasting colored stickers stuck to the corners of it to act as QR markers.

If the technical version of the external tablet/palette, an app on the tablet will help us control various aspects of the VR world including the whiteboard in VR. The VR application in an embodiment of the invention can have students and teachers mode where both project to the whiteboard. However the teacher can choose what can be projected and what not to be projected and even control the scaling ability of the whiteboard. They are able to design their entire teaching session (lesson plan) on this app entirely in the tablet and bring it into VR and directly project it on the VR whiteboard or if they choose to in a regular physical projector. The VR system simply augments and enhances their existing capability. The metaphor is that of an Overhead Projector where the VR whiteboard is the screen where things are projected Whether technical or just a pad of paper, a programmed VR application of the invention is are able to project what is written/drawn on the tablet onto the VR whiteboard, by using the external cameras on the headset and hand tracking recognition paired with the QR markers to recognize the writing on the pad and translate this to the whiteboard. This aids users because they would not have to strain to hold their arm up to write in virtual space for long periods of time, which would be much more comfortable for them.

Movement

In virtual reality there are different ways to generate movement depending on whether the user is using controllers or hand tracking. Our unique embodiments for movement in VR are listed below:

Laser Pointer Triple Functionality

Figure 36:
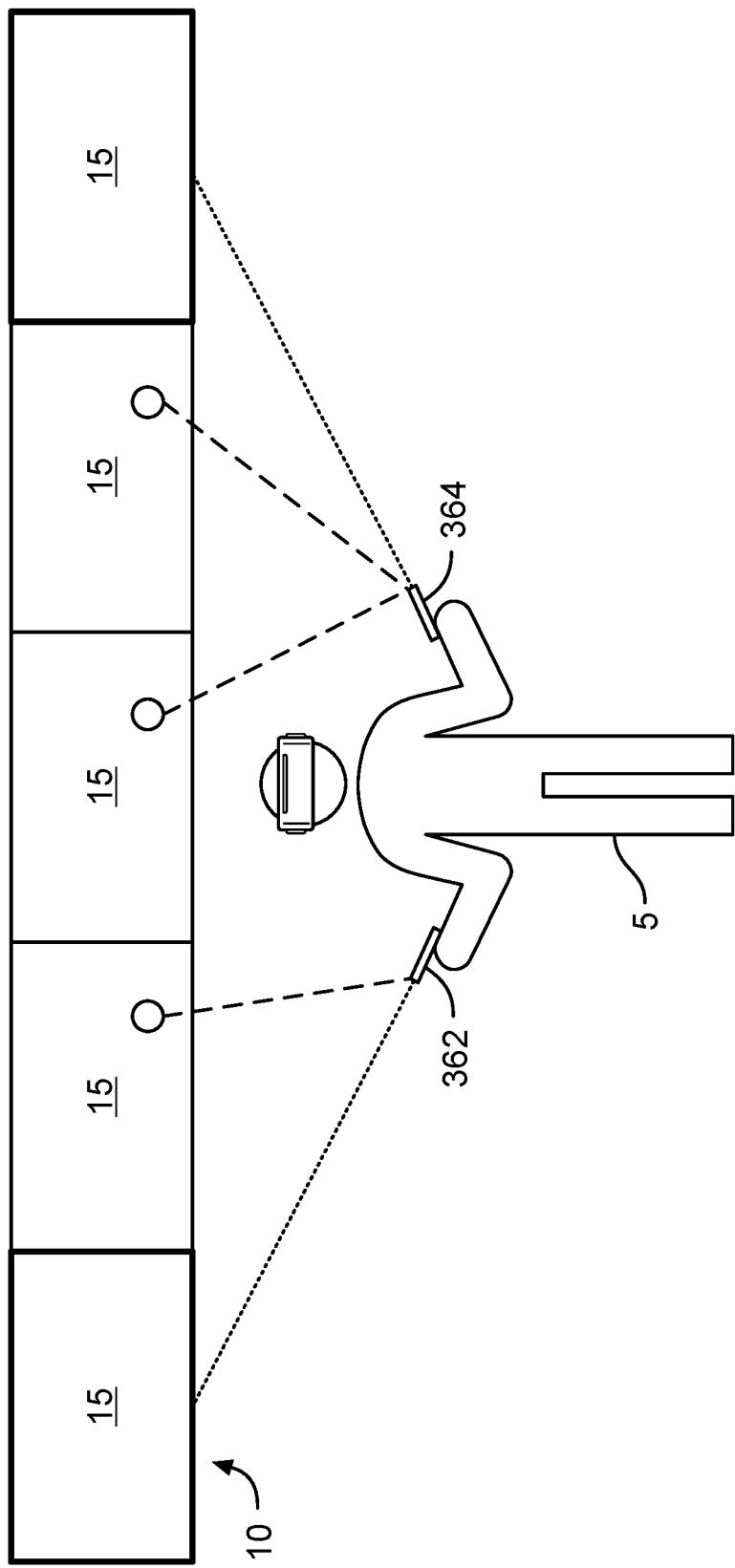
FIG. 36 is a schematic diagram illustrating a user of an information board in a virtual reality using a triple functionality gesture of laser pointer, viewing screen, and teleporting in an embodiment of the invention.

Because tutors often need a laser pointer, and teleporting is one of the most common motions needed in VR, a programmed VR application of the invention can include a unique, three-part gesture which combines the functionality of these features, with the additional feature of a "viewing screen". The triple functionality gesture, illustrated in FIG. 36, is as follows: 1) laser pointer 2) viewing-screen 3) teleporting.

Each user will have one laser for each hand; a green laser 364 in their right hand, and a red laser 362 in their left hand. These lasers will shoot out at a trajectory from the user's index finger, in a straight line to the board, so that the user can intuitively point with their index finger and the laser will shoot out. The triple gesture functionality is the idea that when the user turn on and off the lasers coming out of the user's fingers, the user can then use those lasers to point something out to someone, either up close, by shining the laser on the board, but also for pointing out or identifying something further away, by highlighting another, further away board segment (more than 2 boards either side of where the user are standing), and then the user can use an alternation of the same gesture to teleport to that board segment, or to any other point on the floor in the VR room.

The three ways that this tool is likely to be used are outlined below:

i. If the user are shining the lasers on the board in front of the user or either side of it, a programmed VR application of the invention determines that the user are likely aiming to point out content on the board (As the user are pointing at it with the user's index finger, to bring it to the other user's attention), so the laser pointer is activated, with a small focus point dot at the end of the laser beam to show users what the laser-yielding user is pointing at.

ii. If the user is shining the lasers on the board further than one board segment either side of the user, then the user won't be able to read the content on the board effectively, so there is little value in the laser pointer being used at this distance in the way described in (i) above. Therefore, when users shine the laser at boards further than one board segment either side of them, this highlights the board segment, by putting a glowing border around it, to show the user which board is selected. An additional setting here which the user can choose to turn on or off, is that when a distant board segment is highlighted, this then automatically brings up a viewing window, (think of this as similar to a scope in a shooter video game). When this viewing window pops up, it basically just brings the board to the user, so that the user can read the content clearly without having to teleport all the way to the board, which is useful for a tutor who might be referencing an old piece of work briefly, for example. When this viewing window appears, there's a left and right button so the user can scroll to board segments either side; the user can touch or the user can tap or the user can shoot and it just kind of cycles through the different board segments that are either side of the segment the user had initially highlighted with the laser pointer. If, when looking through the viewing window, the user decides the user do actually want to teleport in front of that board segment, then the user can just hit a button or complete the gesture to activate teleporting. When the user teleports, this is different to sliding down the board as the user would do in the subsequently described "Jedi Hands" embodiment. When teleporting, the user moves their position relative to the entire room, which is primarily the board, but also may include other objects and 3D modules. The user moves as if teleporting to a totally different space in this room.

iii. Because there is no content on the ground, users would not use the laser pointer to point anything out on the ground. Therefore, if the user is pointing towards the ground, the user is indicating that the user wants to move to a different point on the ground, so the laser automatically becomes a teleporting arc with a teleporting circle at the end of it, to show the user where they can teleport to. The user can move this around just by pointing, until they find the spot they want to teleport to, then they just activate the tool to teleport.

As for the gesture itself to activate this, there are several different gestures that work for this triple functionality, all of which are recognized with hand tracking through the external cameras in the VR headset:

i. One way is to use a gun gesture with the user's pointer finger, the user's index finger pointing out and the user's thumb pointing up. In this version, the user turns on and off the laser/teleport tool by "shooting" the gun with the user's thumb trigger by pressing the user's thumb down to the user's hand; that would toggle on and off the laser pointer. The same gesture, if the lasers are already turned on, is used to toggle teleporting to the highlighted board segment or teleporting or going to the identified teleportation spot.

ii. Another embodiment is to pinch the user's thumb and the user's index finger together once or maybe twice, and that toggles the laser feature on or off. When using this embodiment, then pointing the user's laser at a board segment or at the ground automatically loads the viewing window (for when the user is pointing at the board), or the teleporting circle (when pointing at the ground). When these features appear, the user holds their laser pointer steady for 2-seconds to activate the "GO" teleporting button, which will appear about 3 inches in front of the user's finger. This button will appear after two seconds, and when the button is pressed it will immediately teleport the user in front of the associated board segment, or to the point on the ground that they have specified.

iii. Another embodiment is that if the user is pointing in any way, shape, or form, even if the laser tool is turned off, if the user point for a while at a specific spot on the ground or in a board segment for a while, a little "GO" button pops up about three inches in front of the user's finger and the user just move the user's finger forward to press the go button or click the user's controller and it brings the user there.

Jedi-Hands as a Mode of Movement without Teleporting

The idea of the Jedi-hands gesture is to make moving short distances in VR quick and efficient by grabbing the "room" around with the user with two hands and using the user's hands to move the room relative to the user's avatar: therefore moving the user's avatar through space (used for teleporting short distances primarily, as it takes a while to move s long distance by this method).

The unique gesture a programmed VR application of the invention may use is that the user first holds their two hands up in front of them. They look at the back of their hands, make a fist as if to "grab" space in the room, and then they can pull the room around. As the user move their clenched hands around, it moves the entire room around, either left and right or forward and backwards. As if the user had grabbed the room/world around the user, and the user are moving the entire room/world relative to the user, in proportion to the user's movement. For example, if the user grab in front of the user and pull the user's clenched fists just slightly towards the user, then the room will move just slightly towards the user. If the user pulls further, the room moves closer. If the user pulls the user's clenched fists slightly to the left, then the room moves slightly to the left. When the user releases the user's clenched fists, the room snaps into position where the user has positioned it. Another embodiment of this is that if the user moves the user's hands away from each other or closer to each other, it changes the scale or the zoom of the room.

VR Camera Movement

Third option is that the user can take a camcorder in VR and the user can move wherever the user want, while the user watch. Instead of being "inside" the eyes of someone, the user can instead just move a camera around at all times, while the user is watching a video. This means the user can watch, in 3D, in the user's headset, from anywhere the user want in the environment that was being recorded. This is analogous to choosing to be like the skycam in National Football League (NFL) games, or the user can pretend the user are sitting on the ground, looking up at the tutor tutoring the student, or whatever the user wants.

Cheating Prevention with VR a. Headset movement detection: If the user is taking a test, with a VR headset on, a programmed VR application of the invention can detect whether or not that the user has taken the user's headset off, because of the gyroscope in the headset. If the user is meant to be taking a test in VR the user will be informed to keep the user's headset on for the duration of the test. If a student takes their headset off, this motion will be detected, so a programmed VR application of the invention can tell that they have removed their headset to look at their notes or to cheat.

b. Passthrough mode on a VR headsets: Passthrough mode allows users to use the external cameras on their VR headset to see the room around them (this already exists). If a student is taking a test in VR and they turn on passthrough mode, a programmed VR application of the invention determines that they are looking into the real-world, outside of their headset. This could be because they are cheating, but it also could be because someone has walked into the room to talk to them, for example. Therefore, a programmed VR application of the invention can store all of the data that they view while in passthrough mode. This could just be temporary, deleted afterwards for privacy purposes. When a student goes to turn on passthrough, a programmed VR application of the invention can notify them "The user is in test-mode; we will store the user's passthrough view data when the user turns this feature on" so that the student knows that they are being recorded so they can't cheat.

c. Teacher set environments, tools and resources: the teacher can decide which tools the user get and don't get, for the purpose of the test. For example, teachers can select from a menu of calculators for the ones that have the appropriate tools that don't enable cheating. Another feature with calculators is that a programmed VR application of the invention could clear all previous memory/settings, as many calculators have memory in the VR application in an embodiment of the invention. If a student is in a teacher-set test environment (which they might access through an access code) then they don't have access to their usual user palette with their stored personal notes, they instead just have the clean slate test environment as set up by their teacher.

d. Access codes & integrations: For doing the user's homework, (because VR is better as it removes all distractions) the user have a code from Clever (see clever.com) or ClassLink (see classlink.com) or another school API. The user enters a code which puts the user into "homework mode" and puts restrictions on the environment with tools and resources that a student has access to. Teachers set this up for students, with exactly the tools that they need for that week's homework and nothing else.

e. Audio detection: A programmed VR application of the invention can detect the audio through built-in headset microphone so that if a student is asking someone for help (for example asking their older brother the answer to their test question), then the headset records this. Usually while sitting a test a student shouldn't be using audio at all, so any time speech is detected this audio clip is recorded and stored. This is sent to the teacher in a report, broken down per each student in each class. The teacher can listen to each audio file to see if the student had cheated. Further, natural language processing can look for typical speech for cheating; for example "What's the answer to? . . . " or "Do the user know? . . . "; these types of speech will be recognized and red flagged immediately for the teacher to review.

f. Eye tracking: Eye tracking can be used to measure a student's distraction by tracking where in the headset the student's eyes are focused and for how long, and can also determine if the student has pulled the headset forward to look at something in the real-world outside of their platform. If a student is looking down, up, side to side, then this is suspicious as they should be focused inside the platform; this implies they are likely trying to look outside the edges of the headset. In this case, external camera data can also be triggered (passthrough feature) and take a snapshot of what the student is looking at, at that very moment when the eye tracking detects that they were focused outside of the headset. Further, a programmed VR application of the invention is able to blur the user's periphery while in the headset, as a programmed VR application of the invention can track where their eyes are looking at any time. A programmed VR application of the invention can do this by muting/blurring the pixels around the edge of their visual field, to ensure that the user is focusing their eyes in the center of the visual plane at all times. If the majority of the visual field are blurred, then A programmed VR application of the invention knows that the user is trying to look into the edges of their headset to try and look into the real-world.

g. Light detection: Some headsets detect light coming in through the lenses of the headset, so if light is detected by the headset then a programmed VR application of the invention knows that the headset has been pulled down: i.e. the student is looking out of the headset. This is recorded too and sent to the teacher in a report.

h. More importantly is that the work inside VR just before and after the student pulling their headset down or looking side to side (out the edges of the headset), or looking with passthrough, is recorded. This means that the teacher can deduce that the student was clearly confused (erasing and trying again, looking blankly at the question, attempting it with incorrect steps) before they do the potential cheating action (removing their headset etc.). If the student is then seen to be confident in executing the correct working/answer, then the teacher can expect that the student looked at their real-world notes or cheated in some other way by removing their headset.

i. Students staying in VR but leaving the VR application: If the user leaves the VR application, then no data would be collected, so a programmed VR application of the invention can easily track whether a student has left the VR application to browse the internet, or to use social media where they might be cheating.

j. Contact lists: If one student gets the exact same answers as another kid; then a programmed VR application of the invention can detect that they might have cheated. A programmed VR application of the invention can compare student's contact lists to see who they might have cheated with. Oculus logs in through Facebook, so a programmed VR application of the invention can compare the class list and the student's friend's list, which gives more information on suspicious cheating activity.

k. Timestamps: When a test or homework session is started and ended, a programmed VR application of the invention can record the timestamp of each of those actions. Two students are unlikely to be in VR at the exact same time, so timestamps for starting and stopping doing their homework would also detect and prevent cheating. If two students are frequently going in at the exact same time, or immediately one after the other over time, this could indicate cheating.

l. Scratch paper: Currently in the real-world, when students sit online tests, teachers often request that students take a photo of their scratch paper to send in after their test. The issue with this is that there is no way to monitor it or to ensure that it is actually the scratch paper that was used by the student; a lot of students do this inaccurately or send in fake scratch paper. The teacher would never know who's scratch paper it is. In VR, the scratch paper is in the VR application, so that the scratch paper can't be faked; the use of the scratch paper is recorded, so the teacher watches the student working through the scratch paper.

m. Students currently use an app called PhotoMath (see photomath.com) on their phone, which gives them the full answers to math questions when they take a photo of it. Instead, a non-cheating version for in VR, where the user can scan the user's physical homework (from the real-world) with the user's phone or with passthrough on the user's headset to bring it into VR to work on it. There are options here, that just the homework can be brought into VR, or a programmed VR application of the invention can also have a feature like "request a hint" where the first step of the math equation, or a helpful tip about the process or theory or steps is shared. This can also be disabled completely for test or homework mode if the teacher or the parents prefer.

n. Casting in VR: Teachers or parents are able to disable the casting feature (which allows people to screen share what they are looking at in VR into a computer or mobile device in the real-world). This would prevent students from sharing info from in the VR application in an embodiment of the invention to other students, for example the test questions as they work through them. This feature is set by the API into Clever or another schooling system, so the teachers could control when the casting feature is enabled or disabled. A programmed VR application of the invention can also monitor when the casting feature is being used through bandwidth measurements. If the bandwidth is too high then a programmed VR application of the invention can determine that the student is casting their content to another device, which could imply cheating. A programmed VR application of the invention can also then monitor what content exactly is being casted, which helps when teachers are uncertain about whether or not cheating is taking place.

o. Biometrics for cheating prevention: to prevent someone else from using the user's headset for the user to complete a test.

i. Using eye tracking, a programmed VR application of the invention can track the unique eye movements of users. Some HMD have eye tracking built in already (one HMD made by HP is for sale for $600 which includes eye tracking currently).

ii. Using lenses already built into the headset, a programmed VR application of the invention can take a screenshot of the user's eyes to provide an ID shot of the users' eyes. Alternatively, a retina scan is completed with this eye tracking/lens, to match the user.

iii. A programmed VR application of the invention can also implement fingerprinting, which requires external hardware, but is added to the device with software that prompts the user to scan their fingerprint at a certain point.

iv. Distance between the user's hands and their headset at maximum extension, and also at their regular drawing length. Also their dominant hand will be an indication of who is using the headset.

v. Questions (similar to a credit history questionnaire) are asked at the beginning of the session to identify users.

vi. The easiest method is using a retina scan. This is also the most secure (e.g., with fingerprint detection, there are ways to thwart the scan—one user can put on the headset, while another user authenticates it. This may be defeated by not accepting the fingerprint if another body is nearby.)

Virtual Keyboard

Hand Tracking

If our device knows where the hands are, right, and the user put the user's hands on the keyboard, and the user and the system says, "Okay, I'm going to count down from five, put the user's hands to keyboard." Okay. Now it remembers where the user's keyboard is, right? As the user move the user's head, it knows where the keyboard is. As the user put the user's finger on each key, just to configure it, set it up in the beginning. The user can configure it by just whatever keyboard the user has. So the user would teach it where the user's keys are. Then it shows the user's keyboard in VR, right, and the user can put the user's hands down, but when the user looks down in VR, the user see a model or a representation of what the user's real-world keyboard looks like, except it is in VR. It's exactly where the user's keys would be, so the user can look down at the keyboard now. The user has to train it to know where the user's keys are going to be.

Once the user has configured the keyboard once, this configuration is saved in the VR headset local drive and associated to the user's user account, so that later, the user are able to use the keyboard with hand tracking no matter where the user are. This means a user is able to use the VR keyboard on their desk, or in space, or anywhere they like.

The user is also able to choose the configuration as they like, so the keyboard doesn't need to be a traditional keyboard shape. It could instead be a bowl like keyboard for each hand, or it could be set on an angle at 45 degrees if the user prefers. The hands could be kept separate or together, the key distance could be extended; the user is able to configure this however they prefer.

The keyboard can also be configured so that it never occludes what the user is working on. So if the text is dropping down towards where the keyboard is, the keyboard is either moved, or the text is adjusted upwards to keep the keyboard clear for the user.

Key Recognition with External Cameras

Use the external cameras on the headset to just read the letters off the keyboard, with optical character recognition. The cameras can see the keyboard, they can read letters. It can see exactly where the user's keyboard is. Then it copies that keyboard into VR at the same coordinates of where the keyboard is currently. If the user bumped the user's keyboard forward, the cameras still see where the keyboard is. The VR keyboard is positioned in the same place as the physical keyboard is. This means that the user types on their physical keyboard and gets the same tactile response as if they were using that keyboard on their computer, but the VR keyboard picks up the movements with hand tracking to type in VR.

The VR keyboard is hidden in VR until the user start typing (that is, until hand tracking recognizes the user's hands are moving).

The user can also choose where to set their keyboard in VR; once the physical keyboard has been configured once, then the physical keyboard isn't actually necessary for typing in VR; the user uses hand tracking without a physical keyboard which still works (as the head tracking would register movements against the configured physical keyboard), but the user just wouldn't get a tactile response without the physical keyboard. If the user is traveling and the user is in the user's hotel room and the user has got the user's headset, but no keyboard; the user draw with the user's finger, using hand tracking, a square where the user wants the user's VR keyboard to appear on the user's table (using passthrough feature to view the user's physical table through the external cameras on the VR headset). If I want to rest my hands on just a blank table, I draw where I want the keys to be. I can make a book or something, or a calculator, or whatever the user has or want to use to make/give a tactile response.

VR Configuration, Hand Tracking Configuration with No Physical Keyboard

One embodiment: The user has the user's hands where the user wants them, and the VR system just creates the keys where the user want them, using hand tracking. Then, the user can have a little slider that says how far apart the user want the keys. The user can just slide it with the user's fingers to set the correct VR keyboard.

Another one is that the VR system just says something like, "Put the user's hands down on the keys, where they would be." It sees how far apart the user's fingers are. It says, "Okay, well that's A-S-D-F-J-K-L, semi-colon. Now, tell us where the user wants Z-X-C-V-B and M whatever. The user's hands are here." Now, the user moves the user's fingers back a little bit. Now, occlusion could be a slight issue, but the cameras will still see the user's knuckles and they see the user's knuckles move up and down a little bit, which will be sufficient to control the hand tracking on the keyboard. Actually, the system not only is learning where the keyboard is, but it's also learning what the user's hands do when the user is trying to get down to a specific key. For example, when the user gets down to the M key, the user move the user's whole hand a little bit and move the user's finger up too. The knuckle tracking on Oculus is already good enough to pick up this movement, but as a user, the user could train the user's own controls to improve over time; as a user, the user can always overdo it a little bit. If the user had to learn to overdo a little bit so the cameras could pick it up.

If the external cameras are inconsistent in detecting hand movement in VR for a user, then the keyboard could be adjusted in several ways to improve the accuracy of the hand tracking control:

The keyboard is adjusted to have the keys farther apart, which would increase the distance that a user would have to move their hand to hit a key, and therefore this would improve the hand tracking accuracy The keyboard is staggered or staged, like a staircase, so that the top row of keys (QWERTYUIOP) is slightly up, and the bottom row of keys (ZXCVBNM) is slightly down, from the middle row (ASDFGHJKL). This would increase the angle the user would have to move their hand, and therefore improve accuracy.

The keyboard is slanted upward at 45 degrees, which would mean the user had to elevate their hand slightly to hit each higher row of keys, again making hand tracking movements more clear and detectable.

The keys in the VR keyboard are made thicker (i.e. they stick out further in 3D, they are taller), which means that the motion of depressing a key has to be more exaggerated, again improving hand tracking accuracy The VR keyboard is positioned one inch ahead of the user's hands at all times. When the user moves their hands, the keyboard also moves, so that it is always one inch further than the user's hand. This means that, while keeping their palm stable, the user has to extend their fingers more, making the movement more exaggerated and thus more able to be detected on hand tracking. Even one centimeter would make a substantial difference to hand tracking accuracy.

A user may choose to put a black dot on each of their fingers or fingernails which would improve the hand tracking detection accuracy.

Touch Pad

Another way to incorporate a VR keyboard which doesn't rely on the external cameras to accurately track a user's fingers is a programmed VR application of the invention can have a blank mat that has some wires going through it; like a game pad or a touchpad. When the user taps the touchpad, it senses where the user is tapping, like a sensor in the physical world, without buttons, just a trackpad with full sensors. This is connected to the user's VR headset through Bluetooth or Wi-Fi. This still needs to be configured to set where the keys would be (which the user would do once, in VR, by using passthrough and setting each key one at a time.

Device on Fingers

Another option to reduce the need for the external cameras is a device that the user wrap around the user's fingers. It's a sensor wrapped around all 10 fingers (one sensor kit on each hand) and the user train the device that way, whereas the user moves the user's fingers around, the user train it where exactly the user want the keys. This may also be customized by each user; if someone consistently got slightly the wrong key, a programmed VR application of the invention can train the system to know where an individual would use their hands instead, so that the user may have a slightly custom keyboard. If someone preferred to move things even so slightly, or put the enter button up higher or whatever, the user have a customized keyboard.

Using an Additional Camera (Smart Phone):

Another option to improve the accuracy of the external headset cameras for hand tracking is to add an additional external camera. With the new technologies and respective APIs available for the new breed of phones, the possibility of enhancing the system significantly is very high. Many devices have available SDKs or hardware level APIs to access these functions. This is done with a complimentary smart phone app (for Android and iOS) where the user just sets up their phone on their desk with the camera pointing towards where they want their hands to go. This immediately solved the occlusion issue as the phone camera is set up from the opposite direction as the VR headset cameras, therefore collecting visual data from both sides and improving the hand tracking accuracy. The VR application in an embodiment of the invention communicates with the user's VR headset through Bluetooth, Wi-Fi and/or a user sign-in to link to the user's VR account.

Customize Virtual Environment for Student

As mentioned above, a first aspect of the present invention is able to customize the virtual environment from the student's point of view in order to make the student more comfortable during learning. In general, features of the environment may be changed by the student but the actual content that the instructor presents may not be. Features of the virtual environment that by default may be changed by the student include: the background of the virtual-reality environment; the appearance of the instructor, student or any associated avatar; any room in which the instruction takes place; any objects that the instructor or student created places in the virtual environment.

Regarding the background, this refers to the color, pattern or image that the student sees in the background when he or she or she puts on the head-mounted display. For example, by default, the entire background in whichever direction the student looks (straight ahead, left, right, up, down, etc.) may be black. Or, the student may select a background of "outer space," giving the impression that he or she or she is standing in outer space with stars all around. Other backgrounds may include other colors, patterns, images from the real-world such as being underwater, etc. By default, any background feature in a virtual-reality environment has the characteristic that will appear "behind" any writing, drawing, room or object that is created in that environment. For example, should an instructor place a virtual blackboard into the environment and start writing upon it, that blackboard and the writing will obscure a corresponding portion of the background.

The appearance of the instructor or student within the virtual environment may also be customized by the student. For example, the instructor may be visible, invisible, transparent, of a different size, or the student may simply choose from a selection of avatars, cartoon characters, etc., to represent the instructor. Given a particular lifelike representation of the instructor, the student may also change how old the instructor looks, skin color, facial features, etc.

The student or instructor may also select a virtual room in which instruction takes place which is placed "in front of" any background as described above. For example, if the background is outer space, and the student selects a wooden floor and a single wall with a virtual blackboard, then the student would see a wooden floor when looking down, a wall with a blackboard when looking forward, but outer space was looking to the other sides and upwards. Even if the instructor selects a particular room, the student may change that room by selecting a different floor, fewer or greater walls, etc.

Any object capable of being rendered within a virtual-reality environment may also be placed into that environment by the instructor or student. For example, a student may place a table, artwork on the walls, etc.

In contrast to the above features that may be placed or changed a student within the virtual environment, there is the concept of educational content that is placed into the environment by the instructor or created by the instructor during session. In a simple example, the instructor may choose a virtual blackboard to be placed into the virtual environment, and may then write upon the blackboard using the stylus 24 or controller 28. Because the invention pertains to a collaborative learning environment, one of the individuals in the environment will be the lead individual (typically the instructor) and will have the capability to designate which content is static content, and which are the dynamic features that a student may change. For example, a formula written on the blackboard by the instructor using the controller is static content that may not be changed by the student, whereas the background is a feature set by the student that may be changed by the student. Or, a student may create a table in the environment, but a molecule drawn by the instructor placed upon the table may not be changed by the student.

By default, features such as the background, appearances, etc., may be created and changed by the student, but any content created by the instructor may not be changed by the student. In addition, the instructor may designate certain content able to be changed by the student, or, after writing a formula on the board, the instructor may allow that particular content to be changed by the student (to allow the student to rewrite a formula, for example).

A virtual environment may be customized by a student. In this embodiment, the instructor and student are in different locations, but are able to view the same virtual environment (that each the student may change) via their respective HMD, making use of either computer located with the instructor, or computer located on a cloud computing platform.

In a first step, the classroom virtual reality environment is displayed to both instructor and student. In a second step, by default, all classroom features or a subset are tagged as being dynamic features, meaning that each feature may be changed by the student. These features are typically tagged when the virtual reality software executes, using a database, for instance. Or, the instructor may manually tag each feature when he or she or she interacts with the classroom environment using an input device such as controller 3728. In this example, the classroom features tag is being dynamic are the background and the virtual blackboard.

In step three, by default, any potential instructor input is tag is being static, meaning that any such input may not be changed by the student. Any instructor content that exists when the virtual reality software begins execution may be tagged as being static (such as a list of homework that the instructor has added at the end of the last session or before execution of this session), or, by default, any input created by the instructor using his or her or her controller will be tagged as static.

In step four, the student, using his or her or her controller 3768 changes a classroom feature such as the background, or size, location or color of the virtual blackboard using his or her or her controller. Both the student and instructor are able to view this change. In one embodiment, this change only lasts the duration of the session and if a new session is begun, or if the virtual-reality software is stopped and then restarted, the classroom feature will appear as if the student had not changed. In another embodiment, any change to a dynamic feature made by a student is saved into a database and that change will be present in any subsequent session or after restarting of the virtual-reality software.

In step five, the instructor draws a molecule within the classroom environment using his or her or her controller 3728. Or, the instructor makes use of an interface using the controller to select a particular molecule that has already been created. Or, the molecule may already exist within the classroom environment (because it had been created and saved before, or because it is part of the virtual-reality software). In any case, this molecule is tagged as being static content because it was drawn, selected, created etc., by the instructor. This molecule is able to be viewed by both instructor and students in the classroom environment.

In step six, the student is unable to change the molecule because it is static content and the student does not have permission. Attempts by the student to use any of his or her input devices to change the molecule are unsuccessful and the molecule will always be visible via the student HMD 3762. In one embodiment, the student will be able to draw our place another object in front of the molecule so that it is obscured. In another embodiment, the student is prevented from drawing or placing any object in front of the molecule. In step seven, the instructor, using his or her or her controller 3728, changes the molecule tag from static to dynamic. Once changed, the student is then able to change the molecule using his or her or her controller 3768. This step is useful if, for example, the instructor now desires that the student modify the molecule to produce a different compound. In step eight, the student changes the molecule using his or her or her controller 68 to produce a different molecule under the direction of the instructor.

First Hardware and Software Embodiment

Figure 37:
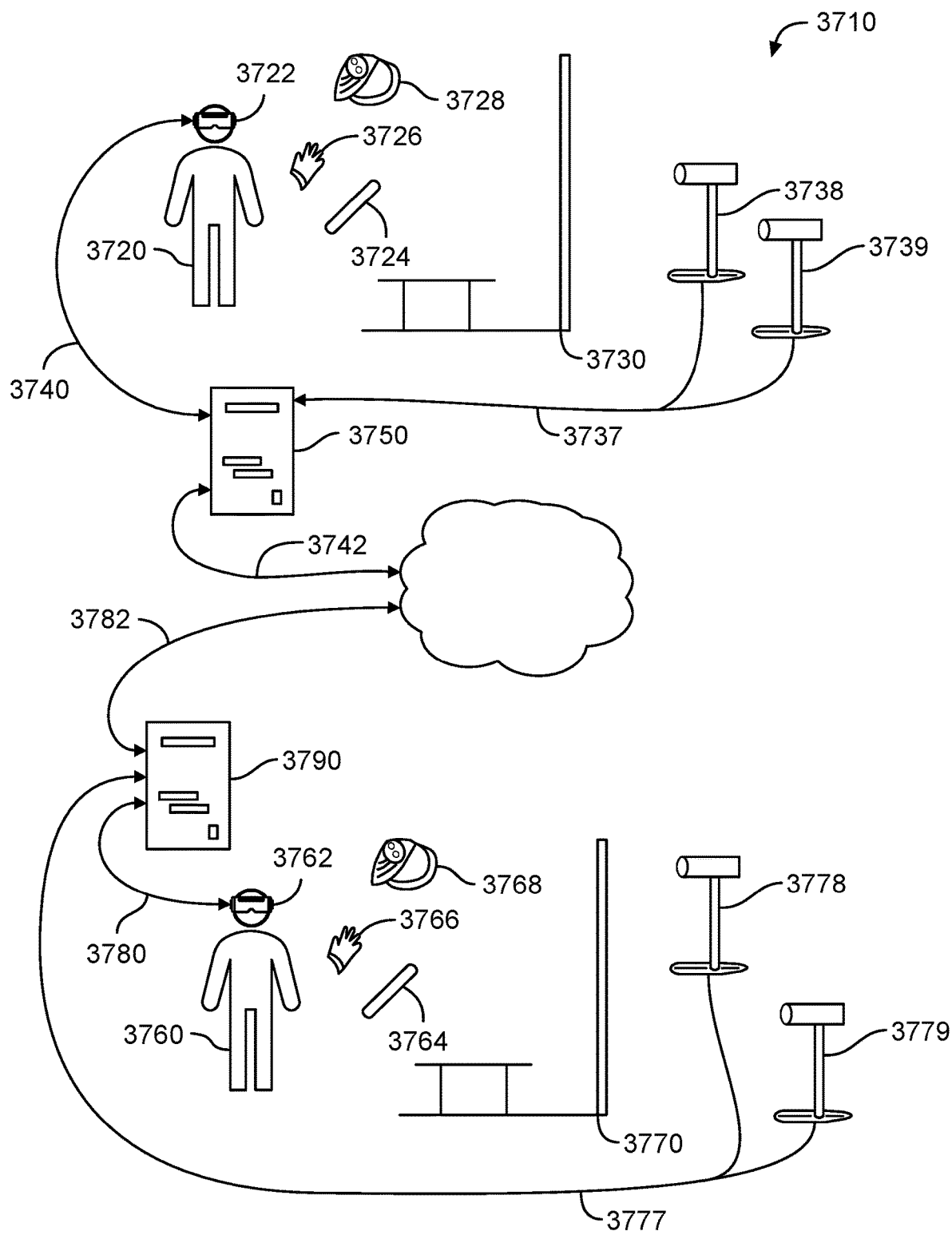
FIG. 37 is a schematic diagram of a remote information sharing system for users in a shared virtual reality environment in which each user uses a respective locally available computer running virtual reality application software to share viewable information in the virtual reality environment in an embodiment of the invention.

FIG. 37 illustrates a collaboration system 3710 in which each individual makes use of a locally available computer. Shown is an instructor 3720 wearing a virtual-reality head-mounted display (HMD) 3722, holding an electronic stylus 3724, wearing a virtual-reality glove 3726 or holding a controller 3728, in a physical environment such as a room 3730 which may also include positional tracking devices 3738, 3739. Student 3760 is located in a remote location, such as in a different state or country, although it is possible that both instructor and student are in the same building or even within the same room. Student 3760 also wears an HMD 3762, holds an electronic stylus 3764, wears a virtual-reality glove 3766 or holds a controller 3728, and is in a room 3770 that also may include positional tracking devices 3778, 3779.

Depending upon the technology used, the stylus or glove may be used to write or draw in the air, their movements being tracked by the positional tracking device 3728 or 3768. Or, if containing suitable sensors such as a gyroscope and accelerometer, stylus 3724 or 3764 may be used to write or draw in the air without the need for a tracking device 3728 or 68.

Computers 3750 and 3790 are any suitably powerful desktop or laptop computers arranged to execute virtual-reality software, render a virtual-reality environment, and display that environment to each individual via HMDs 3722 or 3762. For instance, each computer executes the latest Microsoft operating system, uses a suitably powerful CPU (such as the Intel Core i3-6190), has at least 8 GB of RAM, and has a suitably powerful GPU (such as the Nvidia GeForce GTX 960).

The wired connection 3740 or 3780 between the HMD and the computer uses, for example, an HDMI cable, a USB 2.0 cable and a power cable, in the case of the Oculus Rift HMD. Internet connections 3742 and 3782 utilize any suitable Internet protocol and Internet Service Provider so that computers 3750 and 3790 may communicate and pass data back and forth at suitable speeds.

Second Hardware and Software Embodiment

Figure 38:
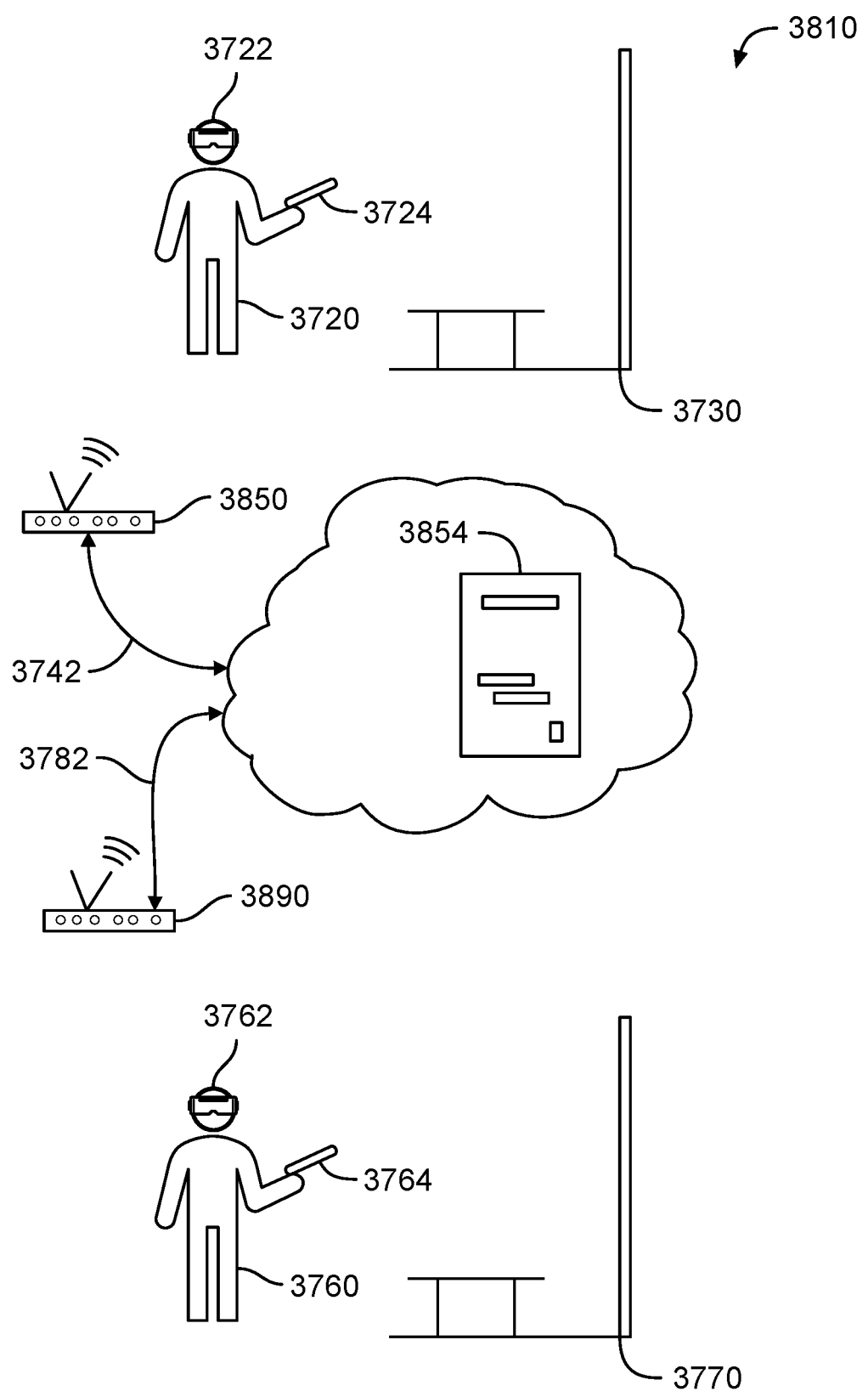
FIG. 38 is a schematic diagram of a remote information sharing system for users in a shared virtual reality environment in which each user uses a remote server computer running virtual reality application software to share viewable information in the virtual reality environment in an embodiment of the invention.

FIG. 38 illustrates a collaboration system 3810 in which each individual makes use of a remotely located computer. Similar to the collaboration system of FIG. 37, instructor 3720 and student 3760 each may make use of a stylus or glove or a controller to write or draw in the air. Each also wears an HMD 3722 or 3762 capable of wireless communication with a local wireless router 3850 or 3890. Some elements of the embodiment shown in FIG. 37 that are also used in FIG. 38 are not labeled or shown in order to reduce the complexity of FIG. 2.

Instead of computers 3750 and 3790 rendering a virtual-reality environment, cloud-based server computer 3854 is used to execute the virtual-reality software and to render the virtual-reality environment for both HMD 3722 and HMD 3762. Data is transmitted between this computer and the HMDs via connections 3742 and 3782 and the wireless connections at each location.

HMD 3722 or 3762 may be any suitable virtual-reality headset that is off-the-shelf or custom-made, and may include additional cameras, sensors, displays or output. For example, the Oculus Rift, HTC-VIVE, or Sony PlayStation VR may be used. Controllers 28 and 68 may be the wireless controllers "Touch" that are used in conjunction with infrared camera sensors 3738, 3739, 3778 and 3779, all of which are available from Oculus VR, LLC.

Electronic stylus 3724 or 6374 may be any suitable passive or electronic stylus capable of producing writing that can be transmitted to computer 3750, 3790 or 3854, capable of itself transmitting writing or drawings when used in the air, or capable of a writing or drawing in the air being detected by one of devices 3738, 3739, 3778 or 3779. This stylus may also be an electronic stylus in that it includes an electronic component in its tip. Another stylus may also include an electronic component such as an infrared light in its tip, the infrared light being detected in motion by one of devices 3778, 3739, 3778 or 3779. The device is thus able to detect the writing or drawing in the air by tracking the movement of the infrared light in the tip of the stylus.

Yet another electronic stylus may also include three-dimensional position sensors such as an accelerometer, a gyroscope, etc. These sensors allow the electronic stylus to be held in the hand and moved in the air in order to write or draw in two dimensions or in three dimensions. A wireless or a wired connection allows the movements of the electronic stylus to be transmitted to one of computers 3750, 3790 or 3854. Virtual-reality glove 3726 or 3766 may be any suitable glove or hand covering that is suitable for writing upon a reactive surface or that is able to be tracked by device 3728 or 68.

A variety of virtual-reality software programs may be used to provide the individual virtual-reality environment available in the prior art, and these programs may be modified, or custom programs may be created using the information provided herein, in order to produce the collaboration system of the present invention.

For instance, the virtual-reality software program "Tilt Brush" available from Google, Inc., may execute upon computer 3750, in conjunction with the HMD Oculus Rift, controller Touch, and camera sensors all available from Oculus VR, LLC. These components provide the individual virtual-reality environment in which instructor 3720 may write, draw, paint, etc., in space upon a virtual blackboard. Embodiments of the invention provide the ability for student 3760 to view via his or her or her HMD 3762 the same virtual environment that the instructor is creating in real time, and to modify in real time what the instructor has written in the virtual environment.

As mentioned above, a second aspect of the present invention allows a single virtual environment to be displayed in real time to both the instructor and student, and allows a change made to that environment by one to be viewed in that environment by the other. For example, an instructor chooses a virtual environment which is simply a black background with a rectangular virtual whiteboard in the middle. Both put on their head mounted displays and both see the same virtual environment. When the instructor begins to draw upon the virtual whiteboard using his or her or her controller, the student immediately sees that same drawing within his or her or her head mounted display. Similarly, if the student also draws upon the whiteboard, the instructor will also immediately see that drawing.

A single virtual environment may be shared between instructor and student. In this embodiment, the instructor and student are in different locations, but are able to view the same virtual environment (that each may change) via their respective HMD, making use of either computer 50 located with the instructor, or computer 3854 located on a cloud computing platform.

In a first step, suitable virtual-reality software executes on the instructor computer, such as, for example, educational virtual-reality software that simply displays a uniform background and a virtual blackboard, termed the "classroom" environment. In step two, the instructor is able to view this background and virtual blackboard using HMD 3722. In step three, student 3760 establishes a connection between his or her or her HMD 3762 and the instructor computer. In step four, the student is able to view the classroom environment that the instructor is also viewing at the same time.

In step five, the instructor writes a particular formula on the virtual blackboard using, for example, controller 3728. Of course, any other suitable virtual-reality input device such as stylus 3724 or glove 3726 may also be used. The instructor is able to view this formula in the classroom environment via his or her or her HMD 3722. At the same time, in step six, the student is also able to view this formula in the classroom environment using his or her or her HMD 3762. In step seven, while viewing the classroom environment with the formula, the student writes a solution on the virtual blackboard below the formula using controller 3768, for example. In step eight, at the same time, the instructor is also able to view this solution in the classroom environment using his or her or her HMD 3722.

Various embodiments of the invention have been described. It will, however, be evident that various modifications and changes may be made thereto, and additional embodiments may be implemented, without departing from the broader scope of the invention as set forth by the claims. This specification is to be regarded in an illustrative rather than a restrictive sense.

What is claimed:

1. A method for providing an information board in a virtual reality environment comprising:

displaying, at a virtual reality display device and by a processor in communication with a memory and the virtual reality display device, a graphical user interface for a user to select a first control input to add a face of a plurality of faces to a discrete segment of a plurality of discrete segments of an information board in a three-dimensional virtual reality environment;

displaying, at the virtual reality display device and by the processor, a graphical user interface for the user to select a second control input corresponding to a type of information board segment when adding the face to the plurality of faces of the discrete segment;

receiving, by the processor, a plurality of first control inputs to add a plurality of faces to the discrete segment, each respective face being connected with another face of the plurality of faces of the discrete segment;

receiving, by the processor, a plurality of second control inputs selecting a type of information board segment for each respective face of the plurality of faces of the discrete segment; and displaying, at the virtual reality display device and by the processor, a face of the plurality of faces of the discrete segment in the three-dimensional virtual reality environment in response to receiving a first control input of the plurality of first control inputs and a second control input of the plurality of second control inputs.

2. The method of claim 1, further comprising:

storing, at a database in communication with the processor, sequential ordering information indicative of a sequential order for display of the plurality of faces of the discrete segment of the information board; and displaying, at the virtual reality display device and by the processor, a face of the plurality of faces of the discrete segment in the three-dimensional virtual reality environment following receipt of a third control input requesting retrieval of the information board after a user has left and returned to the three-dimensional virtual reality environment.

3. The method of claim 1, further comprising:

receiving, at the processor, a fourth control input selecting a viewing arrangement of the plurality of faces of the discrete segment; and displaying, at the virtual reality display device and by the processor, the plurality of faces according to the viewing arrangement.

4. The method of claim 1, further comprising:

receiving, at the processor, a manipulating control input to manipulate a rotational position of the discrete segment within the three-dimensional virtual reality environment, the manipulating control input including data indicative of a grab-and-pull motion in a scrolling direction of a hand of a user; and displaying, at the virtual reality display device, by the processor and based on the manipulating control input, an animation of the discrete segment of the information board rotating in a first direction about a horizontal axis or a vertical axis such that a first face of the plurality of faces rotates away from a perspective of a user and a second face of the plurality of faces rotates towards the perspective of the user, the first direction corresponding to the scrolling direction of the hand of the user.

5. The method of claim 4, further comprising:

determining, by the processor and based on the manipulating control input, a completeness of the grab-and-pull motion; and displaying at the virtual reality display device, by the processor and based on the manipulating control input and based on the completeness of the grab-and-pull motion, an animation of the discrete segment of the information board rotating in a second direction opposite to the first direction about the horizontal axis or the vertical axis such that the first face rotates away from the perspective of the user and the second rotates towards the perspective of the user or such that the second rotates away from the perspective of the user and the first face rotates towards the perspective of the user.

6. The method of claim 1, further comprising:

displaying, at the virtual reality display device and by the processor, a thumbnail icon associated with the discrete segment of the information board in the virtual reality environment, the thumbnail icon being indicative of a quantity of faces of the plurality of faces of the discrete segment of the information board.

7. The method of claim 1, further comprising:

displaying, at the virtual reality display device and by the processor, the discrete segment of the information board within the three-dimensional virtual reality environment such that a first face of the plurality of faces of the discrete segment is present along a front portion of the information board and a second face of the plurality of faces of the discrete segment is present along a rear portion of the information board.

\* \* \* \* \*